United States Patent
Tsuji et al.

(10) Patent No.: US 7,211,625 B2
(45) Date of Patent: *May 1, 2007

(54) THERMOPLASTIC RESIN COMPOSITION AND ELASTOMER COMPOSITION

(75) Inventors: Ryotaro Tsuji, Settsu (JP); Tomoki Hiiro, Settsu (JP)

(73) Assignee: Kaneka Corporation, Osaka (JP)

( * ) Notice: Subject to any disclaimer, the term of this patent is extended or adjusted under 35 U.S.C. 154(b) by 218 days.

This patent is subject to a terminal disclaimer.

(21) Appl. No.: 10/472,141

(22) PCT Filed: Mar. 20, 2002

(86) PCT No.: PCT/JP02/02725

§ 371 (c)(1),
(2), (4) Date: Sep. 22, 2003

(87) PCT Pub. No.: WO02/081561

PCT Pub. Date: Oct. 17, 2002

(65) Prior Publication Data

US 2004/0106732 A1    Jun. 3, 2004

(30) Foreign Application Priority Data

| Apr. 4, 2001 | (JP) | ............................ P2001-106217 |
| May 14, 2001 | (JP) | ............................ P2001-143905 |
| May 31, 2001 | (JP) | ............................ P2001-165025 |

(51) Int. Cl.
    *C08L 53/00* (2006.01)
(52) U.S. Cl. .................... 525/93; 525/330.5; 525/330.3
(58) Field of Classification Search .................. 525/93, 525/330.3, 330.5
    See application file for complete search history.

(56) References Cited

U.S. PATENT DOCUMENTS

| 6,596,899 B1 * | 7/2003 | Lai ............................. 562/426 |
| 6,914,110 B2 * | 7/2005 | Tsuji et al. .................. 526/222 |
| 6,992,138 B2 * | 1/2006 | Tsuji et al. .................. 525/131 |
| 2004/0171777 A1 * | 9/2004 | Le et al. ...................... 526/286 |
| 2004/0236020 A1 * | 11/2004 | Tsuji et al. .................... 525/99 |
| 2004/0249026 A1 * | 12/2004 | Tsuji et al. .................... 524/81 |
| 2005/0004318 A1 * | 1/2005 | Ohshiro et al. ........... 525/329.1 |

FOREIGN PATENT DOCUMENTS

| JP | 4-23817 | 1/1992 |
| WO | WO 98/01478 | 1/1998 |
| WO | WO 99/31144 | 6/1999 |

* cited by examiner

*Primary Examiner*—Jeffrey Mullis
(74) *Attorney, Agent, or Firm*—Kenyon & Kenyon LLP

(57) ABSTRACT

Provided are a thermoplastic resin composition which is excellent in oil resistance, heat resistance, weatherability, impact resistance, transparency, and moldability, and which can be produced economically, an elastomer composition with low hardness and high tensile strength which is excellent in oil resistance and compression set, and a molded object produced by molding the thermoplastic resin composition or elastomer composition. The composition is produced by compounding a thermoplastic resin or an elastomer with a block copolymer having at least one methacrylic ester polymer block and at least one acrylic ester polymer block. Also provided are a process for producing a methacrylic ester-acrylic ester-methacrylic ester block copolymer which requires hardly any purification, which is excellent in heat resistance and weatherability, and in which the molecular weight and the molecular-weight distribution are controlled, and a methacrylic ester-acrylic ester-methacrylic ester block copolymer produced by the process.

21 Claims, No Drawings

THERMOPLASTIC RESIN COMPOSITION AND ELASTOMER COMPOSITION

This application is a 371 application of PCT/JP02/02725 filed on Mar. 20, 2002, claiming priority to Japanese Application No. 2001-106217 filed on Apr. 4, 2001, No. 2001-143905 filed on May 14, 2001, and No. 2001-165025 filed on May 31, 2001, the entire contents of which are incorparated herein by reference.

TECHNICAL FIELD

The present invention relates to a thermoplastic resin composition or elastomer composition containing an acrylic block copolymer, a process for producing the acrylic block copolymer, and an acrylic block copolymer produced by the process. More particularly, the invention relates to a thermoplastic resin composition or elastomer composition containing a thermoplastic resin or rubber and a block copolymer including at least one methacrylic ester polymer block and at least one acrylic ester polymer block, and a molded object composed of the composition. Furthermore, the invention relates to a process for producing a methacrylic ester-acrylic ester-methacrylic ester block copolymer, and a methacrylic ester-acrylic ester-methacrylic ester block copolymer produced by the process.

BACKGROUND ART

In general, thermoplastic resins are widely used in a variety of fields. Single thermoplastic resins alone do not always exhibit sufficient properties, and attempts have been made to combine thermoplastic resins with other resins or rubbers. However, it has been difficult to produce thermoplastic resin compositions which are excellent in oil resistance, heat resistance, weatherability, impact resistance, transparency, and moldability.

In order to solve the problems described above, there are methods in which methacrylic ester-acrylic ester block copolymers having excellent oil resistance, heat resistance, and weatherability are combined with thermoplastic resins. However, a technique has not been known yet in which such methacrylic ester-acrylic ester block copolymers are economically synthesized. Examples of methods for synthesizing such block copolymers include atom transfer radical polymerization (ATRP) methods disclosed in Japanese Unexamined Patent Application Publication No. 10-509475, Japanese Unexamined Patent Application Publication No. 10-81706, Japanese Patent No. 2946497, Japanese Patent No. 2866635, and Japanese Patent No. 2975967, etc. In these methods, since metal compounds are used as catalysts, the resultant polymers may be contaminated with the metal compounds. In order to remove the metal compounds, complicated purification steps are required, resulting in a decrease in productivity and an increase in equipment cost, and thus the methods are not economical.

Examples of known thermoplastic elastomers having excellent weatherability and oil resistance include an acrylic block copolymer including a methacrylic ester polymer block, such as a poly(methyl methacrylate) block, serving as a hard segment, and an acrylic ester polymer block, such as a poly(butyl acrylate) block, serving as a soft segment. However, it is difficult to industrially produce such an acrylic block copolymer, and in particular, hardly any processes for producing an acrylic block copolymer in which the structures of the hard segment and the soft segment are controlled are known.

Examples of known methods for producing acrylic block copolymers in which the structures are controlled without using metal catalysts include reversible addition-fragmentation chain transfer (RAFT) polymerization methods disclosed in PCT Publication No. WO98/01478; PCT Publication No. WO99/05099; PCT Publication No. WO99/31144; Macromolecules, 1998, 31, page 5559; Macromolecules, 1999, 32, page 2071; Macromolecules, 1999, 32, page 6977; Macromolecules, 2000, 33, page 243; etc. According to these methods, it is possible to produce acrylic block copolymers in which the structures are controlled. With respect to the acrylic block copolymers synthesized by such methods, a process for improving properties by incorporation of a thermoplastic resin or rubber component has not been known, and development thereof has been in strong demand. Moreover, when a methacrylic ester-acrylic ester-methacrylic ester triblock copolymer is synthesized, trithiocarbonate groups originating from the chain transfer agent used remain in the main chain, resulting in poor heat resistance and weatherability.

DISCLOSURE OF INVENTION

The present invention has been achieved to overcome the problems described above. It is an object of the present invention to provide 1) a thermoplastic resin composition which is excellent in oil resistance, heat resistance, weatherability, impact resistance, transparency, and moldability, and which can be produced economically; 2) an elastomer composition with low hardness and high tensile strength which is excellent in oil resistance and compression set; 3) a molded object produced by molding the thermoplastic resin composition or the elastomer composition; 4) a process for producing a methacrylic ester-acrylic ester-methacrylic ester block copolymer which requires hardly any purification, which is excellent in heat resistance and weatherability, and in which the molecular weight and the molecular-weight distribution are controlled; and 5) a methacrylic ester-acrylic ester-methacrylic ester block copolymer produced by the process.

The present inventors have conducted intensive research to overcome the problems and have achieved the present invention. That is, in one aspect of the present invention, a thermoplastic resin composition or elastomer composition includes the following two components (A) and (B):

(A) a block copolymer including a methacrylic ester polymer block and an acrylic ester polymer block, the block copolymer being formed by radical polymerization in the presence of a thiocarbonylthio group-containing compound, the thiocarbonylthio group-containing compound being at least one compound selected from the group consisting of a compound represented by general formula (1):

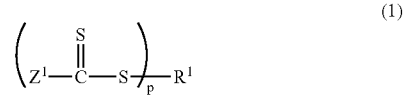

(wherein $R^1$ is a p-valent organic group of 1 or more carbon atoms which may contain one of nitrogen, oxygen, sulfur, halogen, silicon, phosphorus, and metal atoms, and which may be a polymer; $Z^1$ is a hydrogen atom, halogen atom, or monovalent organic group of 1 or more carbon atoms which may contain one of nitrogen, oxygen, sulfur, halogen, silicon, and phosphorus atoms, and which may be a polymer; when plural $Z^1$'s are present, the plural $Z^1$'s may be the same or different; and p is an integer of 1 or more), and a compound represented by general formula (2):

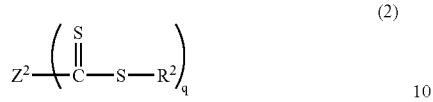

(wherein $R^2$ is a monovalent organic group of 1 or more carbon atoms which may contain one of nitrogen, oxygen, sulfur, halogen, silicon, phosphorus, and metal atoms, and which may be a polymer; $Z^2$ is an oxygen atom (when q=2), sulfur atom (when q=2), nitrogen atom (when q=3), or q-valent organic group of 1 or more carbon atoms which may contain one of nitrogen, oxygen, sulfur, halogen, silicon, and phosphorus atoms, and which may be a polymer; plural $R^2$'s may be the same or different; and q is an integer of 2 or more); and (B) at least one resin or rubber selected from the group consisting of thermoplastic resins, acrylic polymer rubbers, olefinic polymer rubbers, diene polymer rubbers, and natural rubber.

The component (A) of the present invention, i.e., the block copolymer including at least one methacrylic ester polymer block and at least one acrylic ester polymer block, is prepared by a reversible addition-fragmentation chain transfer (RAFT) polymerization method using at least one compound selected from the group consisting of the thiocarbonylthio group-containing compound represented by general formula (1) and the thiocarbonylthio group-containing compound represented by general formula (2) as a chain transfer agent.

In the thiocarbonylthio group-containing compound represented by general formula (1), $R^1$: is not particularly limited. In view of availability of the compound, preferably, $R^1$ has 1 to 20 carbon atoms, and p is 6 or less. Examples of $R^1$ include alkyl, substituted alkyl, aralkyl, substituted aralkyl, a polyvalent aliphatic hydrocarbon group, a polyvalent aromatic hydrocarbon group, a polyvalent aliphatic hydrocarbon group with an aromatic ring, a polyvalent aromatic hydrocarbon group with an aliphatic group, a polyvalent aliphatic hydrocarbon group containing a heteroatom, and a polyvalent aromatic substituted hydrocarbon group containing a heteroatom. In view of availability of the compound, $R^1$ is preferably benzyl, 1-phenylethyl, 2-(2-phenyl)propyl, 1-acetoxyethyl, 1-(4-methoxyphenyl)ethyl, ethoxycarbonylmethyl, 2-(2-ethoxycarbonyl)propyl, 2-(2-cyano)propyl, tert-butyl, 1,1,3,3-tetramethylbutyl, 2-[2-(p-chlorophenyl)]propyl, vinylbenzyl, tert-butylthio, 2-carboxylethyl, carboxylmethyl, cyanomethyl, 1-cyanoethyl, 2-(2-cyano)butyl, or any one of organic groups represented by general formulae below, (wherein r is an integer of 0 or more, and s is an integer of 1 or more).

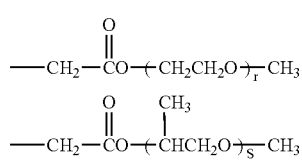

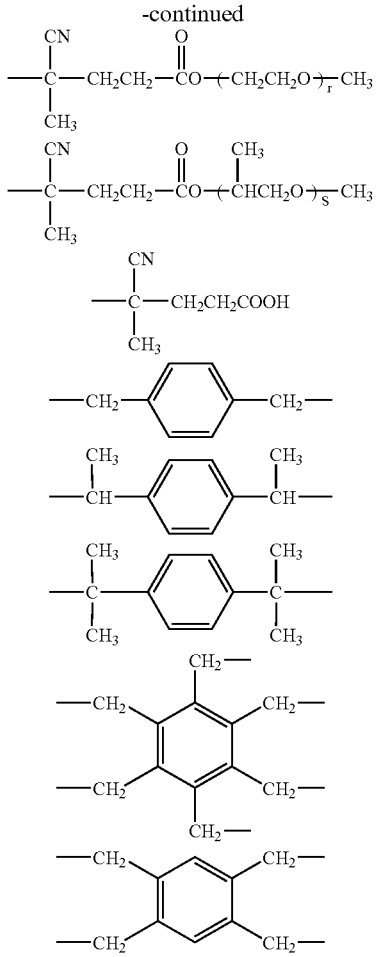

In the above formulae, each of r and s is preferably 500 or less in view of availability of the compound.

Furthermore, as described above, $R^1$ may be a polymer. Examples thereof include a hydrocarbon group having a poly(ethylene oxide) structure, a hydrocarbon group having a poly(propylene oxide) structure, a hydrocarbon group having a poly(tetramethylene oxide) structure, a hydrocarbon group having a poly(ethylene terephthalate) structure, a hydrocarbon group having a poly(butylene terephthalate) structure, a hydrocarbon group having a polysiloxane structure, a hydrocarbon group having a polycarbonate structure, a hydrocarbon group having a polyethylene structure, a hydrocarbon group having a polypropylene structure, and a hydrocarbon group having a polyacrylonitrile structure. These hydrocarbon groups may contain one of oxygen, nitrogen, and sulfur atoms, and may contain a cyano group, an alkoxy group, or the like. The molecular weight thereof is usually 500 or more. Hereinafter, any one of the groups described above is referred to as the polymeric group of the present invention.

In the thiocarbonylthio group-containing compound represented by general formula (2), $R^2$ is not particularly limited. In view of availability of the compound, preferably, $R^2$ has 1 to 20 carbon atoms. Examples of $R^2$ include alkyl, substituted alkyl, aralkyl, and substituted aralkyl. In view of availability of the compound, $R^2$ is preferably benzyl, 1-phenylethyl, 2-(2-phenyl)propyl, 1-acetoxyethyl, 1-(4-methoxyphenyl)ethyl, ethoxycarbonylmethyl, 2-(2-ethoxycarbonyl)

propyl, 2-(2-cyano)propyl, tert-butyl, 1,1,3,3-tetramethylbutyl, 2-[2-(p-chlorophenyl)]propyl, vinylbenzyl, tert-butylthio, 2-carboxylethyl, carboxylmethyl, cyanomethyl, 1-cyanoethyl, 2-(2-cyano)butyl, or any one of organic groups represented by general formulae below, (wherein r is an integer of 0 or more, and s is an integer of 1 or more).

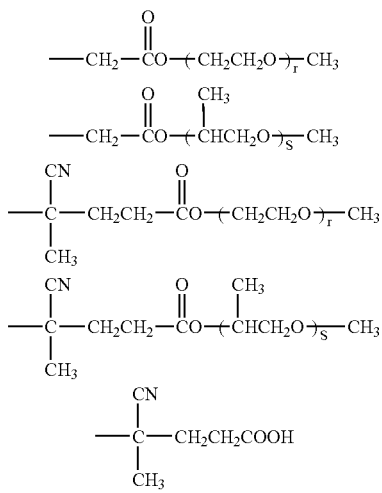

In the above formulae, each of r and s is preferably 500 or less in view of availability of the compound.

In the thiocarbonylthio group-containing compound represented by general formula (1), $Z^1$ is not particularly limited. When $Z^1$ is an organic group, preferably, the organic group has 1 to 20 carbon atoms in view of availability of the compound. Examples of $Z^1$ include alkyl, substituted alkyl, alkoxy, aryloxy, aryl, substituted aryl, aralkyl, substituted aralkyl, heterocyclic, N-aryl-N-alkylamino, N,N-diarylamino, N,N-dialkylamino, alkylthio, and dialkylphosphinyl. In view of availability of the compound, $Z^1$ is preferably phenyl, methyl, ethyl, benzyl, 4-chlorophenyl, 1-naphthyl, 2-naphthyl, diethoxyphosphinyl, n-butyl, tert-butyl, methoxy, ethoxy, methylthio, phenoxy, phenylthio, N,N-dimethylamino, N,N-diethylamino, N-phenyl-N-methylamino, N-phenyl-N-ethylamino, benzylthio, pentafluorophenoxy, or any one of organic groups represented by formulae below.

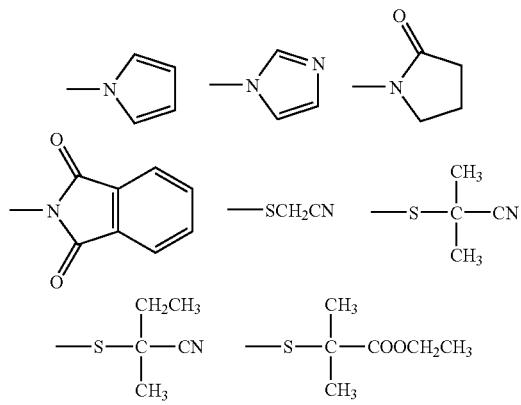

In the thiocarbonylthio group-containing compound represented by general formula (2), $Z^2$ is not particularly limited. When $Z^2$ is an organic group, preferably, the organic group has 1 to 20 carbon atoms and q is 6 or less in view of availability of the compound. Examples of $Z^2$ include a polyvalent aliphatic hydrocarbon group, a polyvalent aromatic hydrocarbon group, a polyvalent aliphatic hydrocarbon group with an aromatic ring, a polyvalent aromatic hydrocarbon group with an aliphatic group, a polyvalent aliphatic hydrocarbon group containing a heteroatom, and a polyvalent aromatic substituted hydrocarbon group containing a heteroatom. In view of availability of the compound, $Z^2$ is preferably any one of the organic groups represented by formulae below, (wherein r is an integer of 0 or more, and s is an integer of 1 or more).

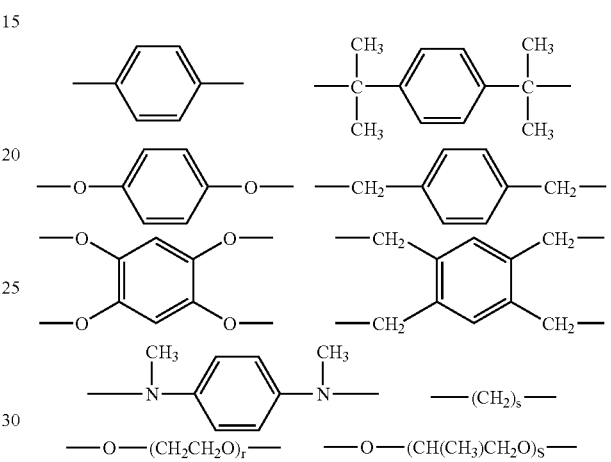

In the above formulae, each of r and s is preferably 500 or less in view of availability of the compound.

In order to synthesize the methacrylic ester-acrylic ester block copolymer as an A-B-A or B-A-B triblock copolymer, one of the following two methods may be employed, i.e., a method in which RAFT polymerization is carried out with a compound having two thiocarbonylthio groups, and a method in which polymers having thiocarbonylthio groups are coupled to each other. In the former method, although productivity is high, heat resistance may be impaired because the thiocarbonylthio group remains in the main chain of the polymer. In the latter method, productivity may be decreased due to an increased number of production steps although it is possible to obtain a polymer which does not include a thiocarbonylthio group. Therefore, either one of the methods may be selected depending on the physical properties required or the production cost.

In the method in which RAFT polymerization is carried out using a compound having two thiocarbonylthio groups, the compound may be at least one compound selected from the group consisting of a compound represented by general formula (3), a compound represented by general formula (4), and a compound represented by general formula (5) as follows:

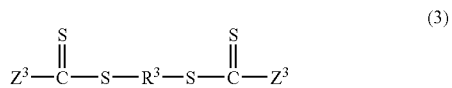

(3)

(wherein $R^3$ is a divalent organic group of 1 or more carbon atoms which may contain one of nitrogen, oxygen, sulfur, halogen, silicon, phosphorus, and metal atoms, and which may be a polymer; each $Z^3$ is a hydrogen atom, halogen atom, or monovalent organic group of 1 or more carbon atoms which may contain one of nitrogen, oxygen, sulfur, halogen, silicon, and phosphorus atoms, and which may be a polymer; and $Z^3$'s may be the same or different);

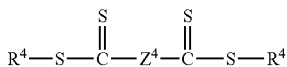
(4)

(wherein each $R^4$ is a monovalent organic group of 1 or more carbon atoms which may contain one of nitrogen, oxygen, sulfur, halogen, silicon, phosphorus, and metal atoms, and which may be a polymer; $R^4$'s may be the same or different; and $Z^4$ is a sulfur atom, oxygen atom, tertiary nitrogen atom, or divalent organic group of 1 or more carbon atoms which may contain one of nitrogen, oxygen, sulfur, halogen, silicon, and phosphorus atoms, and which may be a polymer); and

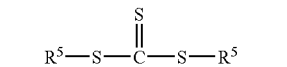
(5)

(wherein each $R^5$ is a monovalent organic group of 1 or more carbon atoms which may contain one of nitrogen, oxygen, sulfur, halogen, silicon, phosphorus, and metal atoms, and which may be a polymer; and $R^5$'s may be the same or different). In this case, a method is employed in which the methacrylic ester monomer and the acrylic ester monomer are continuously polymerized in the presence of the compound. By using the compound having two thiocarbonylthio groups, productivity can be improved in the production of the triblock copolymer.

In the structure of the thiocarbonylthio group-containing compound represented by general formula (3), $R^3$ is not particularly limited. In view of availability of the compound, preferably, $R^3$ has 1 to 20 carbon atoms. In view of availability, preferably, $R^3$ is any one of the groups represented by formulae below.

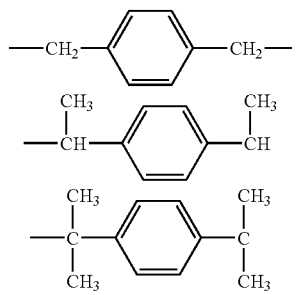

In the structure of the thiocarbonylthio group-containing compound represented by general formula (3), $Z^3$ is not particularly limited, and is the same as $Z^1$ in general formula (1).

In the structure of the thiocarbonylthio group-containing compound represented by general formula (4), $R^4$ is not particularly limited, and is the same as $R^2$ in general formula (2).

In the structure of the thiocarbonylthio group-containing compound represented by general formula (4), $Z^4$ is not particularly limited. In view of availability of the compound, when $Z^4$ is an organic group, the organic group preferably has 1 to 20 carbon atoms. In view of availability and reactivity, $Z^4$ is preferably any one of the organic groups represented by formulae below, (wherein r is an integer of 0 or more, and s is an integer of 1 or more).

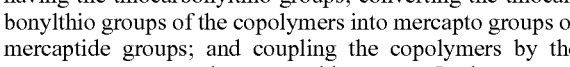
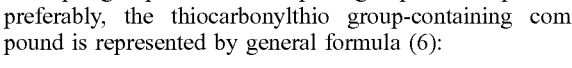
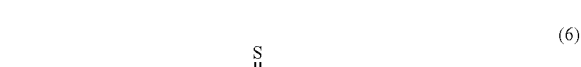
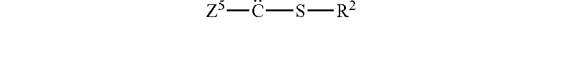
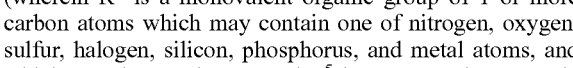
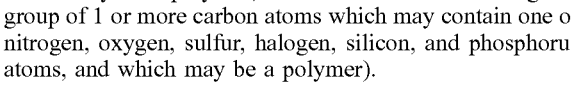
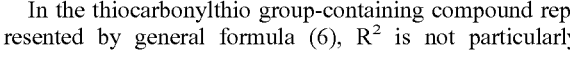

In the above formulae, each of r and s is preferably 500 or less in view of availability of the compound.

In the structure of the thiocarbonylthio group-containing compound represented by general formula (5), $R^5$ is not particularly limited, and is the same as $R^2$ in general formula (2).

In another aspect of the present invention, a process for producing a methacrylic ester-acrylic ester-methacrylic ester block copolymer includes the steps of radically polymerizing monomers containing a methacrylic ester monomer as a principal constituent in the presence of at least one thiocarbonylthio group-containing compound selected from the group consisting of the compounds represented by general formulae (1) and (2); adding monomers containing an acrylic ester monomer as a principal constituent to the mixture and further performing radical polymerization to produce methacrylic ester-acrylic ester block copolymers having the thiocarbonylthio groups; converting the thiocarbonylthio groups of the copolymers into mercapto groups or mercaptide groups; and coupling the copolymers by the mercapto groups or the mercaptide groups. In the process, preferably, the thiocarbonylthio group-containing compound is represented by general formula (6):

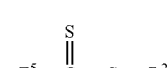
(6)

(wherein $R^2$ is a monovalent organic group of 1 or more carbon atoms which may contain one of nitrogen, oxygen, sulfur, halogen, silicon, phosphorus, and metal atoms, and which may be a polymer; and $Z^5$ is a monovalent organic group of 1 or more carbon atoms which may contain one of nitrogen, oxygen, sulfur, halogen, silicon, and phosphorus atoms, and which may be a polymer).

In the thiocarbonylthio group-containing compound represented by general formula (6), $R^2$ is not particularly limited. In view of availability of the compound, preferably, $R^2$ has 1 to 20 carbon atoms. Examples of $R^2$ include the groups described as examples with reference to general formula (2).

In the thiocarbonylthio group-containing compound represented by general formula (6), $Z^5$ is not particularly limited. In view of availability of the compound, preferably, $Z^5$ has 1 to 20 carbon atoms. Examples of $Z^5$ include the organic groups of 1 or more carbon atoms among the groups described as examples with reference to $Z^1$ in general formula (1).

Specific examples of thiocarbonylthio group-containing compounds used in the present invention include, but not limited to, compounds represented by formulae below, (wherein Me, Et, Ph, and Ac represent methyl, ethyl, phenyl, and acetyl, respectively; r is an integer of 0 or more; and s is an integer of 1 or more).

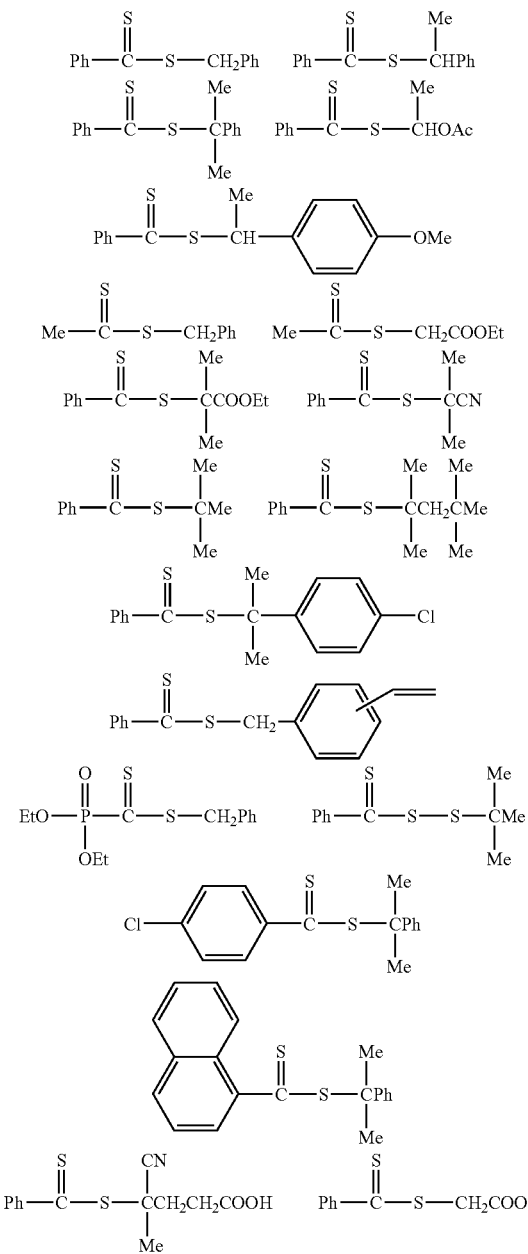

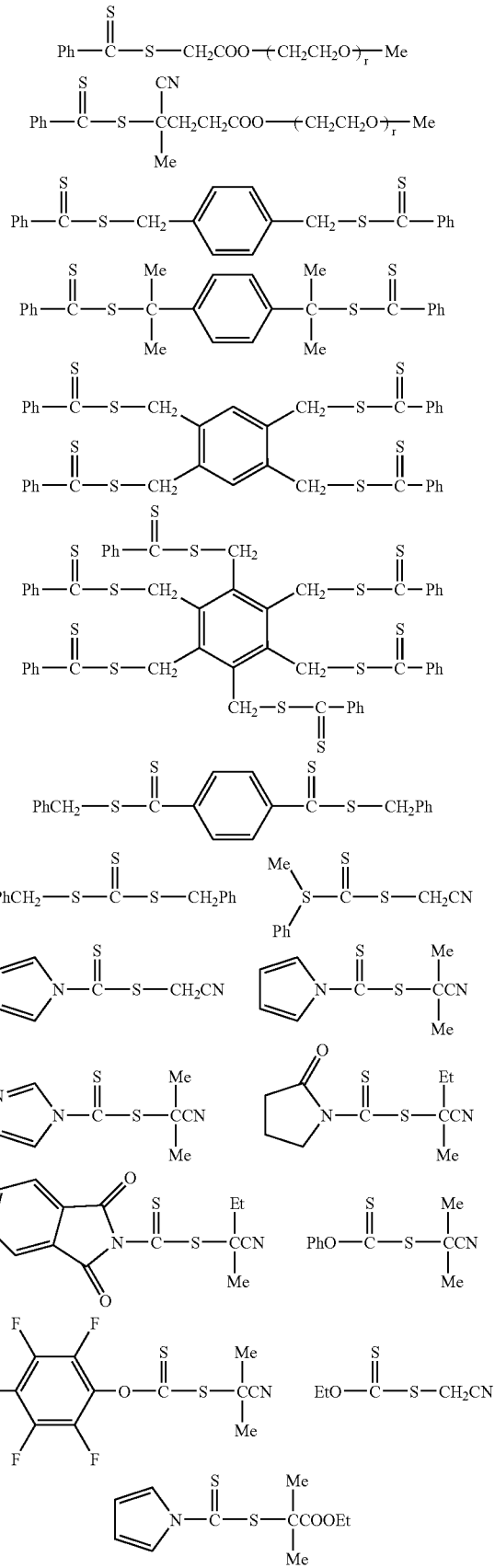

-continued

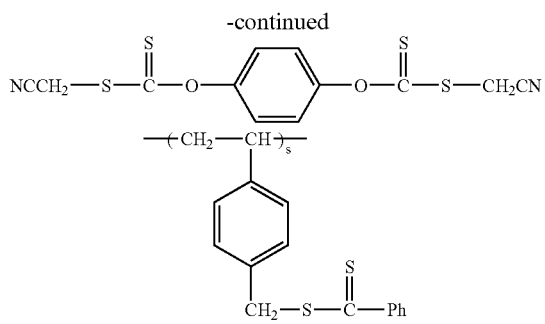

In the above formulae, each of r and s is preferably 500 or less in view of availability of the compound.

The amount of the thiocarbonylthio group-containing compound used in the present invention is not particularly limited and can be stoichiometrically calculated based on the methacrylic ester monomer, the acrylic ester monomer, the vinyl monomer copolymerizable therewith, and the polymerization initiator which are used. In general, since the number of moles of the resultant polymer is substantially equal to the number of moles of the thiocarbonylthio group-containing compound, the molecular weight of the polymer can be controlled by adjusting the molar ratio of the monomers to the thiocarbonylthio group-containing compound. When the rate of reaction of the monomers is 100%, the theoretical molecular weight of the resultant polymer is represented by $(x/y) \times Mm + Mr$, wherein Mm is the molecular weight of the monomers used, x is the number of moles of the monomers used, Mr is the molecular weight of the thiocarbonylthio group-containing compound, and y is the number of moles of the thiocarbonylthio group-containing compound used.

In order to prepare the block copolymer, which is the component (A) of the composition of the present invention, in the presence of the thiocarbonylthio group-containing compound, radical polymerization is performed using the methacrylic ester monomer, the acrylic ester monomer, and as necessary, a vinyl monomer copolymerizable therewith in a desired order. The radical reaction may be carried out by any method commonly used in the art, such as bulk polymerization, solution polymerization, emulsion polymerization, suspension polymerization, or microsuspension polymerization. Among them, in view of cost and safety, water-based polymerization, such as emulsion polymerization, is preferred.

In the present invention, when the monomers are polymerized in the presence of the thiocarbonylthio group-containing compound, the addition method for the thiocarbonylthio group-containing compound is not particularly limited. In order to easily control the polymerization behavior and the structure of the polymer, in the case of solution polymerization, preferably, the compound having the thiocarbonylthio group is dissolved in the solution before polymerization is initiated. In the case of water-based polymerization, preferably, the thiocarbonylthio group-containing compound is mixed into a water-based dispersion or water-based emulsion along with a small amount of organic solvent and the monomers to be polymerized before polymerization is initiated, and stirring may be performed with a homogenizer.

In the case of solution polymerization of the monomers, examples of solvents which may be used include, but not limited to, hydrocarbon solvents, such as heptane, hexane, octane, and mineral spirit; ester solvents, such as ethyl acetate, n-butyl acetate, isobutyl acetate, ethylene glycol monomethyl ether acetate, and diethylene glycol monobutyl ether acetate; ketone solvents, such as acetone, methyl ethyl ketone, methyl isobutyl ketone, diisobutyl ketone, and cyclohexanone; alcohol solvents, such as methanol, ethanol, isopropanol, n-butanol, sec-butanol, and isobutanol; ether solvents, such as tetrahydrofuran, diethyl ether, di-n-butyl ether, dioxane, ethylene glycol dimethyl ether, and ethylene glycol diethyl ether; and aromatic petroleum solvents, such as toluene, xylene, Swasol 310 (manufactured by Cosmo Oil Co., Ltd.), Swasol 1000 (manufactured by Cosmo Oil Co., Ltd.), and Swasol 1500 (manufactured by Cosmo Oil Co., Ltd.). These solvents may be used alone or in combination. The types and amounts of solvent used may be determined in consideration of the solubility of the monomers used, the solubility of the resultant polymer, the polymerization initiator concentration and the monomer concentration suitable for achieving a satisfactory reaction rate, the solubility of the thiocarbonylthio group-containing compound, effects on human body and environment, availability, cost, etc., and are not particularly limited. Above all, industrially, toluene is preferred in view of availability and cost.

In the case of emulsion polymerization or microsuspension polymerization of the monomers, examples of emulsifiers which may be used include, but not limited to, anionic surfactants, such as fatty acid soap, rosin acid soap, sodium naphthalenesulfonate-formalin condensates, sodium alkylbenzene sulfonate, sodium alkylsulfate (e.g., sodium dodecyl sulfate), ammonium alkylsulfate, triethanolamine alkylsulfate, sodium dialkylsulfosuccinate, sodium alkyldiphenylether disulfonate, sodium polyoxyethylene alkyl ether sulfate, and sodium polyoxyethylene alkylphenyl ether sulfate; nonionic surfactants, such as polyoxyethylene alkyl ether, polyoxyethylene higher alcohol ether, sorbitan fatty acid ester, polyoxyethylene sorbitan fatty acid ester, polyoxyethylene sorbitol fatty acid ester, glycerin fatty acid ester, polyoxyethylene fatty acid ester, polyoxyethylene aklylamine, and alkyl alkanolamide; and cationic surfactants, such as alkyltrimethylammonium chloride. These emulsifiers may be used alone or in combination. As necessary, a dispersant for suspension polymerization which will be described below may also be added. The amount of the emulsifier used is usually 0.1 to 20 parts by weight based on 100 parts by weight of the monomers used, but not limited thereto.

In the case of suspension polymerization of the monomers, any dispersant commonly used may be used. Examples of dispersants include, but not limited to, partially saponified poly(vinyl acetate), poly(vinyl alcohol), methyl cellulose, carboxymethyl cellulose, gelatin, poly(alkylene oxide), and combinations of anionic surfactants and dispersing agents. These may be used alone or in combination. The emulsifier used for emulsion polymerization described above may also be used as necessary. The amount of the dispersant used is usually 0.1 to 20 parts by weight based on 100 parts by weight of the monomers, but not limited thereto.

The polymerization initiator or polymerization initiation method used in the radical polymerization are not particularly limited, and any polymerization initiator or polymerization initiation method commonly used may be used. Examples of polymerization initiators include, but not limited to, peroxide polymerization initiators, such as methyl ethyl ketone peroxide, methyl isobutyl ketone peroxide, cyclohexanone peroxide, methyl cyclohexanone peroxide, isobutyryl peroxide, 3,5,5-trimethylhexanoyl peroxide, lauroyl peroxide, benzoyl peroxide, tert-butyl hydroperoxide, cumene hydroperoxide, diisopropylbenzene hydroperoxide, p-menthane hydroperoxide, 1,1,3,3-tetramethylbutyl hydroperoxide, di-tert-butyl peroxide, tert-butyl-α-cumyl peroxide, di-α-cumyl peroxide, 1,4-bis[(tert-butylperoxy)isopropyl]benzene, 1,3-bis[(tert-butylperoxy)isopropyl]benzene, 2,5-dimethyl-2,5-bis(tert-butylperoxy)hexane, 2,5-dimethyl-2,5-bis(tert-butylperoxy)-3-hexyne, 1,1-bis(tert-butylperoxy)-3,3,5-trimethylcyclohexane, n-butyl-4,4-bis(tert-butylperoxy)valerate, 2,2-bis(tert-butylperoxy)butane, tert-butylperoxy acetate, tert-butylperoxy isobutylate, tert-butylperoxy octoate, tert-butylperoxy pivalate, tert-butylperoxy neodecanoate, tert-butylperoxy-3,5,5-trimethyl hexanoate, tert-butylperoxy benzoate, tert-butylperoxy laurate, 2,5-dimethyl-2,5-bis(benzoylperoxy)hexane, bis(2-ethylhexyl)peroxy dicarbonate, diisopropylperoxy dicarbonate, di-sec-butylperoxy dicarbonate, di-n-propylperoxy dicarbonate, bis(3-methoxybutyl)peroxy dicarbonate, bis(2-ethoxyethyl)peroxy dicarbonate, bis(4-tert-butylcyclohexyl) peroxy dicarbonate, O-tert-butyl-O-isopropylperoxy carbonate, and succinic acid peroxide; azo polymerization initiators, such as 2,2'-azobis-(2-amidinopropane)dihydrochloride, dimethyl 2,2'-azobis(isobutyrate), 2,2'-azobis-(4-methoxy-2,4-dimethylvaleronitrile), 2,2'-azobis(isobutyronitrile), 1,1'-azobis(cyclohexane-1-carbonitrile), azocumene, 2,2'-azobis(2-methylbutyronitrile), 2,2'-azobis-(2,4-dimethylvaleronitrile, 4,4'-azobis(4-cyanovaleric acid), 2-(tert-butylazo)-2-cyanopropane, 2,2'-azobis(2,4,4-trimethylpentane), and 2,2'-azobis(2-methylpropane); inorganic peroxides, such as potassium persulfate and sodium persulfate; vinyl monomers which thermally generate radical species, such as styrene; compounds which generate radical species by light, such as benzoine derivatives, benzophenone, acylphosphine oxide, and photo-redox systems; and redox polymerization initiators including sodium sulfite, sodium thiosulfate, sodium formaldehyde sulfoxylate, ascorbic acid, ferrous sulfate, or the like, as a reducing agent, and potassium peroxydisulfate, hydrogen peroxide, tert-butyl hydroperoxide, or the like, as an oxidizing agent. These polymerization initiators may be used alone or in combination. It may also be possible to use a polymerization initiation system by electron irradiation, X-ray irradiation, radiation irradiation, or the like. With respect to polymerization initiation methods, the methods described in Moad and Solomon "The Chemistry of Free Radical Polymerization", Pergamon, London, 1995, pp. 53–95 may be employed.

In the present invention, the amount of polymerization initiator used is not particularly limited. In order to produce a polymer with a narrow molecular-weight distribution, the amount of radical species generated during polymerization is preferably 1 mole or less, and more preferably 0.5 moles or less, relative to 1 mole of the compound having the thiocarbonylthio group. In order to control the amount of radical species generated during polymerization, in addition to the control of the amount of the polymerization initiator, preferably, temperature is controlled in the case of the polymerization initiator which causes thermal dissociation, or the amount of energy is controlled in the case of the polymerization initiation system which generates radicals by light or electron beams. Because of ease of control of polymerization, using a polymerization initiator which causes thermal dissociation, the polymerization reaction is carried out preferably at temperatures which allow the polymerization initiator to have a half-time of 0.5 to 50 hours, and more preferably at temperatures which allow the polymerization initiator to have a half-time of 1 to 20 hours.

A thiocarbonylthio group-containing block copolymer is produced by the polymerization reaction described above.

The thiocarbonylthio group-containing block copolymer is treated with a processing agent, as required, so that the thiocarbonylthio groups are converted into mercapto groups or mercaptide groups. The processing agent used in the process is not particularly limited. As the processing agent, preferably, at least one compound selected from the group consisting of bases, acids, ammonia, hydrazine, and amine compounds is used because of high reaction efficiency. When a base, an acid, or a tertiary amine compound is used in the presence of water, the thiocarbonylthio groups are converted into the mercapto groups by hydrolysis. When a base is used in the absence of water, the thiocarbonylthio groups are converted into the mercaptide groups. When ammonia, hydrazine, a primary amine compound, or a secondary amine compound is used, the thiocarbonylthio groups are converted into the mercapto groups.

Examples of bases which may be used as processing agents include, but not limited to, alkali metal hydroxides, such as sodium hydroxide, potassium hydroxide, and lithium hydroxide; alkaline-earth metal hydroxides, such as calcium hydroxide, magnesium hydroxide, barium hydroxide, and cesium hydroxide; transition metal hydroxides, such as aluminum hydroxide and zinc hydroxide; alkali metal alcoholates, such as sodium methylate, sodium ethylate, sodium phenylate, lithium ethylate, and lithium butylate; alkaline-earth metal alcoholates, such as magnesium methylate and magnesium ethylate; metal hydrides, such as sodium hydride, lithium hydride, calcium hydride, lithium aluminum hydride, and aluminum borohydride; and organometallic reagents, such as hydrosulfite, n-butyl lithium, tert-butyl lithium, ethylmagnesium bromide, and phenylmagnesium bromide. Furthermore, alkali metals, such as metallic lithium, metallic sodium, and metallic potassium; and alkaline-earth metals, such as metallic magnesium and metallic calcium may also be used. These bases may be used alone or in combination. Among them, in view of availability, cost, and reactivity, preferred are sodium hydroxide, potassium hydroxide, lithium hydroxide, calcium hydroxide, magnesium hydroxide, sodium methylate, sodium ethylate, sodium hydride, lithium hydride, metallic lithium, metallic sodium, and metallic potassium. Because of ease of handling, more preferred are sodium hydroxide, potassium hydroxide, lithium hydroxide, calcium hydroxide, magnesium hydroxide, sodium methylate, and sodium ethylate.

Examples of acids which may be used as processing agents include, but not limited to, inorganic acids, such as hydrochloric acid, nitric acid, sulfuric acid, phosphoric acid, hydrofluoric acid, hydrobromic acid, fluoroboric acid, chlorosulfonic acid, hydriodic acid, arsenic acid, and silicofluoric acid; organic acids, such as p-toluenesulfonic acid, trifluoromethyl sulfonic acid, acetic acid, trifluoroacetic acid, methylphosphoric acid, ethylphosphoric acid, n-propylphosphoric acid, isopropylphosphoric acid, n-butylphosphoric acid, laurylphosphoric acid, stearylphosphoric acid, 2-ethylhexylphosphoric acid, isodecylphosphoric acid, dimethyldithiophosphoric acid, diethyldithiophosphoric acid, diisopropyldithiophosphoric acid, and phenylphosphonic acid; and acid ion exchange resins, such as strong acid ion exchange resins and weak acid ion exchange resins. Furthermore, compounds which show acidity in reaction with a small amount of water may also be used. Examples of such compounds include acid anhydrides, such as acetic anhydride, propionic anhydride, trifluoroacetic anhydride, phthalic anhydride, and succinic anhydride; acyl halides; and metal halides, such as titanium tetrachloride, aluminum chloride, and silicon chloride. These acids may be used alone or in combination. Among them, in view of availability, cost, and reactivity, preferred are hydrochloric acid, nitric acid, sulfuric acid, phosphoric acid, aluminum chloride, titanium tetrachloride, chlorosulfonic acid, p-toluenesulfonic acid, trifluoromethyl sulfonic acid, acetic acid, and trifluoroacetic acid.

The amine compounds used as processing agents include amines and their analogues. The amine compounds of the present invention also include amides and nitrogen-containing aromatic compounds which are analogous to amines. Examples of such amine compounds include, but not limited to, hydroxylamine sulfate, hydroxylamine, N-(2-aminoethyl)ethanolamine, N-methylethanolamine, 12-aminododecanoic acid, 3-amino-1-propanol, amine-modified acrylic polymers, allylamine, diallylamine, isopropylamine, diisopropylamine, 3,3'-iminobis(propylamine), ethylamine, diethylamine, triethylamine, 2-ethylhexylamine, 3-(2-ethylhexyloxy)propylamine, 3-ethoxypropylamine, diisobutylamine, 3-(diethylamino)propylamine, di-2-ethylhexylamine, 3-(dibutylamino)propylamine, tert-butylamine, sec-butylamine, n-butylamine, n-propylamine, isopropylamine, 3-(methylamino)propylamine, 3-(dimethylamino)propylamine, N-methyl-3,3'-iminobis(propylamine), 3-methoxypropylamine, isopropanolamine, N-isopropylacrylamide, iminodiacetic acid, 3,3'-iminodipropionitrile, monoethanolamine, diethanolamine, N-ethylethylenediamine, ethyleneimine, ethylenediamine, diethylenetriamine, triethylenetetramine, tetraethylenepentamine, pentaethylenehexamine, N-carboxy-4,4'-methylenebiscyclohexylamine, carbohydrazides, guanidine hydrochloride, guanidine nitrate, guanidine carbonate, guanidine phosphate, guanidine sulfamate, aminoguanidine hydrochloride, aminoguanidine bicarbonate, guanylthiourea, guanylurea phosphate, guanylurea sulfate, glycylglycine, 2-chloroethylamine, 1,4-diaminobutane, 1,2-diaminopropane, 1,3-diaminopropane, diaminomaleonitrile, cyclohexylamine, cyclopentylamine, dicyandiamide, dicyclohexylamine, N-(3-(dimethylamino)propyl)acrylamide, N-(3-(dimethylamino)propyl)methacrylamide, dimethylamineborane, dimethylhydrazine, N,N'-ethylenebis(stearoamide), amide oleate, amide stearate, N,N'-methylenebis(stearoamide), methylol stearoamide, 3,9-bis(3-aminopropyl)-2,4,8,10-tetraoxaspiro[5,5]undecane, CTU guanamine, thiocarbohydrazide, thiosemicarbazide, thiourea, dihydrazide dodecanedioate, trans-1,2-cyclohexanediamine, dihydrazide adipate, dihydrazide sebacate, dihydrazide isophthalate, thiourea dioxide, 2-hydroxyethylaminopropylamine, isobutylamine, 2-bromoethylamine, hexamethylenediamine, 1,6-hexamethylenebis(N,N-dimethylsemicarbazide), n-hexylamine, polyethyleneimine, formamidine, formamidine acetate, formamide, methacrylamide, monomethylamine, dimethylamine, trimethylamine, N,N'-methylenebis(acrylamide), N-methylolacrylamide, monomethylhydrazine, 3-(lauryloxy)propylamine, acetanilide, acetoacet-o-anisidide, acetoacetanilide, acetoacet-m-xylidide, acetoacet-o-chloroanilide, acetoacet-2,5,-dimethoxyanilide, acetoacet-2,5-dimethoxy-4-chloroanilide, acetoacet-o-toluidide, acetoacet-p-toluidide, o-anisidine, p-anisidine, aniline, p-aminoacetanilide, p-aminobenzoic acid, ethyl p-aminobenzoate ester, 2-amino-4-chlorophenol, 2-aminothiazole, 2-aminothiophenol, 2-amino-5-nitrobenzonitrile, o-aminophenol, m-aminophenol, p-aminophenol, p-aminobenzaldehyde, 4-aminobenzonitrile, anthranilic acid, 3-isopropoxyaniline, N-ethylaniline, N-ethylene toluene sulfonamide, 2,4-xylidine, 3,4-xylidine, m-xylylenediamine, p-cresidine, dianisidine, 4,4'-diaminostilbene-2,2'-disulfonic acid, 1,4-diaminoanthraquinone, 4,4'-diamino-3,3'-diethyldiphenylmethane, 4,4'-diaminobenzanilide, N,N-diethylaniline, diaminodiphenyl ether, diaminonaphthalene, diaminoanthracene, diphenylamine, dibenzylamine, N,N-dimethylaniline, 3,3'-dimethyl-4,4'-diaminodiphenylmethane, sulfanilic acid, 1,1,1',1'-tetramethyl-4,4'-(methylenedi-p-phenylene)disemicarbazide, tobias acid, 2,4,5-trichloroaniline, o-tolidine, o-toluidine, m-toluidine, p-toluidine, m-toluylenediamine, sodium naphthionate, o-nitroaniline, m-nitroaniline, p-nitroaniline, o-nitro-p-chloroaniline, m-nitro-p-toluidine, o-chloro-p-toluidine-m-sulfonic acid, p-hydroxyphenylacetamide, 7-anilino-4-hydroxy-2-naphthalenesulfonic acid, phenylhydrazine, o-phenylenediamine, m-phenylenediamine, p-phenylenediamine, p-phenetidine, phenethylamine, benzylamine, benzophenone hydrazine, mesidine, metanilic acid, N-methylaniline, 2-methyl-4-nitroaniline, 2-methyl-4-methoxydiphenylamine, 2-amino-5-methylbenzenesulfonic acid, leuco-1,4-diaminoanthraquinone, paramine, p-hydroxyphenylglycine, acetaldehyde ammonia, acetoguanamine, 3-amino-1,2,4-triazole, 2-aminopyridine, 3-aminopyridine, 4-aminopyridine, 1-(2-aminoethyl)piperazine, N-(3-aminopropyl)morpholine, 1-amino-4-methylpiperazine, isocyanuric acid, imidazole, 2-methylimidazole, 2-ethyl-4-methylimidazole, 2-phenylimidazole, 2-undecylimidazole, 2-heptadecylimidazole, 2-phenyl-4-methylimidazole, 1-aminoethyl-2-methylimidazole, 1-(cyanoethylaminoethyl)-2-methylimidazole, N-(2-(2-methyl-1-imidazolyl)ethyl)urea, 2,4-diamino-6-(2-methyl-1-imidazolylethyl)-1,3,5-triazine, 2,4-diamino-6-(2-undecyl-1-imidazolylethyl)-1,3,5-tiazine, 2,4-diamino-6-(2-ethyl-4-methyl-1-imidazolylethyl)-1,3,5-tiazine, 2-phenyl-4-methyl-5-hydroxymethylimidazole, 2-phenyl-4,5-bis(hydroxymethyl)imidazole, an adduct of 2-methylimidazole and isocyanuric acid, an adduct of 2-phenylimidazole and isocyanuric acid, an adduct of 2,4-diamino-6-(2-methyl-1-imidazolylethyl)-1,3,5-triazine and isocyanuric acid, 2-methyl-4-formylimidazole, 2-phenyl-4-formylimidazole, 4-formylimidazole, 2,4-dimethyl-5-formylimidazole, 2,4-diphenyl-5-formylimidazole, 4-methylimidazole, 4-methyl-5-(hydroxymethyl)imidazole, 2-amino-4,5-dicyanoimdazole, imidazole-4,5-dicarboxylic acid, 3-carbamoyl-2-pyrazine carboxylic acid, imide succinate, quinaldine, quinoline, 1,3-di(4-piperidyl)propane, 2-imidazolidinone, 5,5-dimethylhydantoin, 2,5-dimethylpiperazine, cis-2,6-dimethylpiperazine, 3,5-dimethylpyrazole, 2-methyl-4-pyrazolone, 5,5'-bi-1H-tetrazole, 5-phenyl-1H-tetrazole, 5-methyl-1H-tetrazole, 1,2,3,4-tetrahydroquinoline, bis(aminopropyl)piperazine, 1,3-bis(hydrazinocarboethyl)-5-isopropylhydantoin, hydantoin, (hydroxyethyl)piperazine, 2-pipecoline, 3-pipecoline, 4-pipecoline, 2-(1-piperazinyl)pyrimidine, piperazine, piperidine, pyrrolidine, pyrrole, phenylpyrazolidone, benzoguanamine, N-methylpiperazine, 2-methylpiperazine, 3-methyl-5-pyrazolone, 1-methylol-5,5-dimethylhydantoin, melamine, and morpholine. In addition, hindered amine light stabilizers (HALSs) may also be used. Examples of HALSs include bis(2,2,6,6,-tetramethyl-4-piperidyl)sebacate, Sanol LS-770 (manufactured by Sankyo Co., Ltd.), Adekasutabu LA-77 (manufactured by Asahi Denka Co., Ltd.), Sumisorb 577 (manufactured by Sumitomo Chemical Co., Ltd.), Biosorb 04 (manufactured by Kyodo Chemical Co., Ltd.), Chimassorb 944LD (manufactured by Ciba Specialty Chemicals), Tinuvin 144 (manufactured by Ciba Specialty Chemicals), Adekasutabu LA-52 (manufactured by Asahi Denka Co., Ltd.), Adekasutabu LA-57 (manufactured by Asahi Denka Co., Ltd.), Adekasutabu LA-67 (manufactured by Asahi Denka Co., Ltd.), Adekasutabu LA-68

(manufactured by Asahi Denka Co., Ltd.), Adekasutabu LA-77 (manufactured by Asahi Denka Co., Ltd.), Adekasutabu LA-87 (manufactured by Asahi Denka Co., Ltd.), and Goodrite UV-3034 (manufactured by Goodrich Corporation).

The amine compounds described above may be used alone or in combination. When reactions are carried out with the amine compounds, in the case of primary amine compounds and secondary amine compounds, water is not required, and in the case of tertiary amine compounds, water is required as a proton source. Among them, preferred are primary amine compounds with a boiling point of 100° C. or less, such as methylamine and ethylamine; secondary amine compounds with a boiling point of 100° C. or less, such as dimethylamine and diethylamine; and HALSs, in view of the fact that the purification step can be simplified. When amine compounds with a boiling point of 100° C. or less are used, excess compounds can be easily removed by distillation under reduced pressure. When HALSs are used, it is not necessary to remove excess HALSs because they function as stabilizers and the resultant polymers have improved weatherability and light resistance.

Ammonia is also preferred because excess ammonia can be easily removed by distillation under reduced pressure as in the primary or secondary amine compounds with a boiling point of 100° C. or less, thus simplifying the purification step.

As described above, among the processing agents, preferred are ammonia, hydrazine, primary amine compounds, secondary amine compounds, and HALSs, and particularly preferred are ammonia, primary amine compounds with a boiling point of 100° C. or less, secondary amine compounds with a boiling point of 100° C. or less, and HALSs, in view of the fact that the purification step can be simplified.

In the reaction for converting the thiocarbonylthio groups into the mercapto groups or mercaptide groups, the amount of the processing agent used is not particularly limited. When a base or acid is used as the processing agent, in view of ease of handling and reactivity, the amount of use is preferably 0.01 to 100 parts by weight, more preferably 0.05 to 50 parts by weight, and most preferably 0.1 to 30 parts by weight based on 100 parts by weight of the thiocarbonylthio group-containing block copolymer. When ammonia, hydrazine, a primary amine compound, or a secondary amine compound is used in the conversion reaction, because of a high introduction rate of the mercapto group, the amount of ammonia, hydrazine, primary amine compound, or secondary amine compound is preferably 0.5 to 1,000 moles, and more preferably 1 to 500 moles, based on 1 mole of the thiocarbonylthio group of the block copolymer.

In the present invention, when the thiocarbonylthio group-containing block copolymer is treated with the processing agent, the reaction conditions are not particularly limited. For example, the copolymer may be dissolved in an organic solvent, and the processing agent may be added thereto. The processing agent may be added to a water-based dispersion or emulsion. Alternatively, the processing agent may be directly added to the solid or molten copolymer itself. The treatment temperature is not particularly limited. In view of reactivity, the treatment temperature is preferably −50° C. to 200° C., more preferably 10° C. to 150° C., and most preferably 0° C. to 120° C.

A mercapto group or mercaptide group-containing block copolymer is thereby produced. As described above, the mercapto group or mercaptide group-containing block copolymer can be used as the block copolymer which is the component (A) of the composition of the present invention.

After the thiocarbonylthio groups of the thiocarbonylthio group-containing block copolymers are converted into the mercapto groups or mercaptide groups, the block copolymers are coupled by using the mercapto groups or mercaptide groups, and a desired block copolymer, e.g., a methacrylic ester-acrylic ester-methacrylic ester triblock copolymer, is thereby produced. Examples of coupling methods include, but not limited to, methods (i) to (x) for block copolymers having mercapto groups, and methods (xi) to (xiii) for block copolymers having mercaptide groups.

Examples of coupling methods for block copolymers having mercapto groups include (i) a method in which disulfide bonds are formed between block copolymers in the presence of an oxidizing agent, and thereby the block copolymers are coupled; (ii) a method in which a compound having at least two isocyanato groups in each molecule is allowed to react with the block copolymers, and thereby the block copolymers are coupled by thiourethane bonds (—NHCOS—); (iii) a method in which a compound having at least two unsaturated bonds in each molecule is added to block copolymers, and thereby the block copolymers are coupled; (iv) a method in which block copolymers are coupled by dehydrocondensation between a polyvalent carboxylic acid and the block copolymers; (v) a method in which block copolymers are coupled by transesterification between a polyvalent carboxylate ester and the block copolymers; (vi) a method in which block copolymers are coupled by esterification between a polyvalent carboxylic anhydride and the block copolymers; (vii) a method in which block copolymers are coupled by dehydrohalogenation (acylation) between a polyvalent acyl halide and the block copolymers; (viii) a method in which block copolymers are coupled by transesterification between a carbonate compound and the block copolymers; (ix) a method in which a ketone is allowed to react with the block copolymers to form thioketal bonds, and thereby the block copolymers are coupled; and (x) a method in which block copolymers are coupled by dehydrocondensation between a compound having at least two hydroxyl groups in each molecule and the block copolymers.

Examples of coupling methods for block copolymers having mercaptide groups include (xi) a method in which a compound having at least two halogen atoms in each molecule is allowed to react with the block copolymers to form sulfide bonds (Williamson reaction), and thereby the block copolymers are coupled; (xii) a method in which block copolymers are coupled by a reaction between a polyvalent acyl halide and the block copolymers; and (xiii) a method in which block copolymers are coupled by a reaction between a polyvalent carboxylic acid and the block copolymers.

Among these methods, in view of ease of reaction and coupling efficiency, methods (i), (ii), (vii), (xi), and (xii) are preferred.

Among the coupling methods for block copolymers having mercapto groups, when method (i), in which disulfide bonds are formed between block copolymers in the presence of an oxidizing agent, is employed, examples of oxidizing agents which may be used include, but not limited to, chlorates, such as sodium chlorate, potassium chlorate, ammonium chlorate, barium chlorate, and calcium chlorate; perchlorates, such as sodium perchlorate, potassium perchlorate, and ammonium perchlorate; inorganic peroxides, such as lithium peroxide, sodium peroxide, potassium peroxide, rubidium peroxide, cesium peroxide, magnesium peroxide, calcium peroxide, strontium peroxide, and barium peroxide; chlorites, such as sodium chlorite, potassium chlorite, copper chlorite, and lead chlorite; bromates, such as sodium bromate, potassium bromate, magnesium bromate, and barium bromate; nitrates, such as sodium nitrate, potassium nitrate, ammonium nitrate, barium nitrate, and silver nitrate; iodates, such as sodium iodate, potassium iodate, calcium iodate, and zinc iodate; permanganates, such as potassium permanganate, sodium permanganate, and ammonium permanganate; bichromates, such as sodium bichromate, potassium bichromate, and ammonium bichromate; periodates, such as sodium periodate; periodic acids, such as metaperiodic acid; chromium oxides, such as chromic anhydride (chromium trioxide); lead oxides, such as lead dioxde; iodine oxides, such as diiodine pentaoxide; nitrites, such as sodium nitrite and potassium nitrite; hypochlorites, such as calcium hypochlorite; chloroisocyanuric acids, such as trichloroisocyanuric acid; peroxodisulfates, such as ammonium peroxodisulfates; peroxoborates, such as ammonium peroxoborate; perchloric acid; hydrogen peroxide; nitric acid; halides, such as chlorine fluoride, bromine trifluoride, bromine pentafluoride, and iodine pentafluoride; and oxygen. As the oxygen source, air may also be used. These may be used alone or in combination as long as no danger is involved. Among them, because of ease of reaction and high efficiency, preferred are sodium chlorate, sodium perchlorate, sodium peroxide, sodium chlorite, lead dioxide, hydrogen peroxide, and oxygen.

When method (ii), in which a compound having at least two isocyanato groups in each molecule is allowed to react with block copolymers having mercapto groups, and thereby coupling of the block copolymers is performed via thiourethane bonds (—NHCOS—), is employed, examples of the compound having at least two isocyanato groups in each molecule which may be used include, but not limited to, diisocyanate compounds, such as hexamethylene diisocyanate, 2,4-tolylene diisocyanate, diphenylmethane diisocyanate, isophorone diisocyanate, xylylene diisocyanate, methylenebis(cyclohexylisocyanate), bis(isocyanatemethyl)cyclohexane, 1,5-naphthylene diisocyanate, ethylene diisocyanate, methylene diisocyanate, propylene diisocyanate, and tetramethylene diisocyanate; triisocyanate compounds, such as 1,6,11-undecane triisocyanate and triphenylmethane triisocyanate; polyvalent isocyanate compounds formed by reaction of these compounds with polyhydric alcohols; isocyanurate-modifications of these compounds; and polyvalent isocyanate compounds formed by reaction of these compounds with polyvalent amine compounds. These may be used alone or in combination. Among them, in view of availability and reactivity, preferred are hexamethylene diisocyanate, 2,4-tolylene diisocyanate, diphenylmethane diisocyanate, isophorone diisocyanate, xylylene diisocyanate, methylenebis(cyclohexylisocyanate), and bis(isocyanatemethyl)cyclohexane.

In the reaction described above, a catalyst (urethane formation catalyst) may be used as necessary. For example, the catalysts cited in Polyurethanes: Chemistry and Technology, Part I, Table 30, Chapter 4, Saunders and Frisch, Interscience Publishers, New York, 1963 may be used, but usable catalysts are not limited thereto. As the urethane formation reaction catalysts which may be used in the reaction described above, tin catalysts are preferred because of their high activity. Examples of tin catalysts include tin octylate, tin stearate, dibutyltin dioctoate, dibutyltin dioleylmaleate, dibutyltin dibutylmaleate, dibutyltin dilaurate, 1,1,3,3-tetrabutyl-1,3-dilauryloxycarbonyldistannoxane, dibutyltindiacetate, dibutyltin diacetylacetonate, dibutyltin bis(o-phenylphenoxide), dibutyltin oxide, dibutyltin bis(triethoxysilicate), dibutyltin distearate, dibutyltin bis(isononyl-3-mercaptopropionate), dibutyltin bis(isooctyl thioglycolate), dioctyltin oxide, dioctyltin dilaurate, dioctyltin diacetate, and dioctyltin diversatate.

The amount of the urethane formation catalyst is not particularly limited, but is preferably 0.0001 to 3 parts by weight, more preferably 0.001 to 0.5 parts by weight, and most preferably 0.003 to 0.1 parts by weight, based on 100 parts by weight of the block copolymer having the mercapto group. If the amount is less than 0.0001 parts by weight, sufficient reactivity may not be obtained. If the amount exceeds 3 parts by weight, the properties of the block copolymer, such as heat resistance, weatherability, and hydrolysis resistance, may be degraded.

In method (iii) in which a compound having at least two unsaturated bonds in each molecule is added to block copolymers having mercapto groups, and thereby coupling of the copolymers is performed, examples of compounds having at least two unsaturated bonds in each molecule include, but not limited to, butadiene, isoprene, chloroprene, 1,4-heptadiene, 1,5-hexadiene, 1,6-heptadiene, 1,7-octadiene, divinyl ether, diallyl ether, vinyl acrylate, vinyl methacrylate, allyl acrylate, allyl methacrylate, 1,2-divinylbenzene, 1,4-divinylbenzene, 1,3,5-trivinylbenzene, bisphenol A divinyl ether, bisphenol A diallyl ether, trimethylolpropane divinyl ether, trimethylolpropane trivinyl ether, trimethylolpropane diallyl ether, trimethylolpropane triallyl ether, acrylate of alkyl-modified dipentaerythritol, ethylene oxide-modified bisphenol A diacrylate, acrylate of ε-caprolactone-modified dipentaerythritol, diacrylate of caprolactone-modified neopentyl glycol hydroxypivalate, ditrimethylolpropane tetraacrylate, dipentaerythritol hexaacrylate, dipentaerythritol pentaacrylate, tetraethylene glycol diacrylate, tripropylene glycol diacrylate, trimethylolpropane ethylene oxide-modified triacrylate, trimethylolpropane triacrylate, neopentyl glycol diacrylate, diacrylate of neopentyl glycol hydroxypivalate, 1,9-nonanediol diacrylate, 1,4-butanediol diacrylate, 2-propenoic acid [2-[1,1-dimethyl-2-[(1-oxo-2-propenyl)oxy]ethyl]-5-ethyl-1,3-dioxane-5-yl] methyl ester, 1,6-hexanediol diacrylate, pentaerythritol triacrylate, ethylene glycol dimethacrylate, tetraethylene glycol dimethacrylate, triethylene glycol dimethacrylate, 1,3-butylene glycol dimethacrylate, trimethylolpropane trimethacrylate, pentaerythritol divinyl ether, pentaerythritol trivinyl ether, pentaerythritol diallyl ether, pentaerythritol triallyl ether, 1,4-butanediol vinyl ether, 1,4-butanediol diallyl ether, 1,5-pentanediol divinyl ether, 1,5-pentanediol diallyl ether, 1,6-hexanediol divinyl ether, 1,6-hexanediol diallyl ether, diethylene glycol divinyl ether, diethylene glycol diallyl ether, tripropylene glycol divinyl ether, tripropylene glycol diallyl ether, tetraethylene glycol divinyl ether, tetraethylene glycol diallyl ether, poly(ethylene oxide) divinyl ether, poly(ethylene oxide) diallyl ether, poly(propylene oxide) divinyl ether, poly(propylene oxide) diallyl ether, neopentyl glycol divinyl ether, neopentyl glycol diallyl ether, divinyl trimellitate, trivinyl trimellitate, diallyl trimellitate, triallyl trimellitate, divinyl succinate, diallyl succinate, divinyl phthalate, diallyl phthalate, divinyl maleate, diallyl maleate, divinyl terephthalate, diallyl terephthalate, divinyl carbonate, diallyl carbonate, triacrylformal, triallyl isocyanurate, triallyl cyanurate, trimethallyl isocyanurate, furan, cyclopentadiene, dicyclopentadiene, and a maleimide compound represented by formula below, (wherein R' is a divalent organic group of 1 or more carbon atoms).

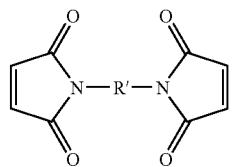

These compounds may be used alone or in combination. In view of availability, preferably, R' has 1 to 20 carbon atoms.

In methods (iv), (v), and (vii), which will be described below, a compound represented by general formula (7) or (9) is preferably used, and in method (viii), which will be describe below, a compound represented by general formula (8) in which X is alkoxy is preferably used:

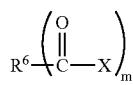

(7)

(wherein $R^6$ is an m-valent organic group of 1 or more carbon atoms which may contain one of nitrogen, oxygen, sulfur, halogen, silicon, phosphorus, and metal atoms, and which may be a polymer; X is a halogen atom, hydroxyl group, or alkoxyl group; m is an integer of 2 or more; and X's may be the same or different);

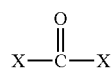

(8)

(wherein X is a halogen atom, hydroxyl group, or alkoxyl group; and X's may be the same or different); and

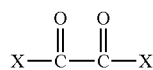

(9)

(wherein X is a halogen atom, hydroxyl group, or alkoxyl group; and X's may be the same or different).

In method (iv) in which block copolymers having mercapto groups are coupled by dehydrocondensation between a polyvalent carboxylic acid and the block copolymers, examples of polyvalent carboxylic acids which may be used include, but not limited to, adipic acid, itaconic acid, iminodiacetic acid, ethylenediaminetetraacetic acid, glutaric acid, citraconic acid, oxalic acid, tartaric acid, diparatoluoyltartaric acid, dibenzoyltartaric acid, sebacic acid, 3,3'-thiodipropionic acid, thiomaleic acid, dodecanedioic acid, 1,2-cyclohexanediaminetetraacetic acid, brassylic acid, malonic acid, phthalic acid, isophthalic acid, terephthalic acid, naphthalenedicarboxylic acid, 5-hydroxyisophthalic acid, 1-cyanoethyl-2-methylimidazole trimellitate, 1-cyanoethyl-2-phenylimidazole trimellitate, 1-cyanoethyl-2-ethyl-4-methylimidazole trimellitate, 1-cyanoethyl-2-undecylimidazole trimellitate, imidazole-4,5-dicarboxylic acid, chelidamic acid, 2,3-pyrazinedicarboxylic acid, folic acid, citric acid, succinic acid, fumaric acid, malic acid, glutamic acid, aspartic acid, cystine, chlorendic acid, and trimellitic acid. These may be used alone or in combination. When block copolymers with mercapto groups are allowed to react with these polyvalent carboxylic acids, any esterification catalyst commonly used may be used. By removing water produced during reaction, the reaction can be carried out effectively. For example, a method in which the resultant water is removed with a dehydrator, such as molecular sieves, a method in which the resultant water is removed by reaction with an orthocarboxylate ester or the like, or a method in which the resultant water is removed with an azeotropic solvent, such as toluene, is appropriately employed.

In method (v) in which block copolymers having mercapto groups are coupled by transesterification between a polyvalent carboxylate ester and the block copolymers, as the polyvalent carboxylate ester, esters of the polyvalent carboxylic acids described above may be used. Examples of carboxylate esters include, but not limited to, methyl esters, ethyl esters, n-propyl esters, isopropyl esters, n-butyl esters, isobutyl esters, sec-butyl esters, tert-butyl esters, decyl esters, isodecyl esters, lauryl esters, vinyl esters, allyl esters, phenyl esters, benzyl esters, naphthyl esters, (4-hydroxyphenyl)esters, (4-methoxyphenyl)esters, and (4-vinylphenyl)esters. These esters may be used alone or in combination. When mercapto groups are allowed to react with the polyvalent carboxylate esters, any transesterification catalyst commonly used may be used. In order to carry out the reaction efficiently, by-product alcohol is preferably removed by distillation under normal or reduced pressures.

In method (vi) in which block copolymers having mercapto groups are coupled by esterification between a polyvalent carboxylic anhydride and the block copolymers, as the polyvalent carboxylic anhydride, anhydrides of the polyvalent carboxylic acids described above may be used, but the anhydride which may be used is not limited thereto. These polyvalent carboxylic anhydrides may be used alone or in combination. In the reaction, any transesterification catalyst commonly used may be used. In this method, by removing water produced during reaction, the reaction can also be carried out effectively. As in the case described above, a method in which the resultant water is removed with a dehydrator, such as molecular sieves, a method in which the resultant water is removed by reaction with an orthocarboxylate ester or the like, or a method in which the resultant water is removed with an azeotropic solvent, such as toluene, is appropriately employed.

In method (vii) in which block copolymers having mercapto groups are coupled by dehydrohalogenation (acylation) between a polyvalent acyl halide and the block copolymers, as the polyvalent acyl halide, halides of the polyvalent carboxylic acids described above may be used. Specific examples of polyvalent acyl halides include, but not limited to, chlorinated compounds, such as dichloride succinate, dichloride adipate, dichloride itaconate, dichloride oxalate, dichloride tartrate, dichloride malonate, dichloride phthalate, dichloride isophthalate, dichloride terephthalate, dichloride fumarate, and dichloride malate; compounds formed by replacing the chlorine atoms in the above-mentioned chlorinated compounds by bromine atoms; and compounds formed by replacing the chlorine atoms in the above-mentioned chlorinated compounds by iodine atoms. Among them, in view of availability and reactivity, preferred are chlorinated compounds, such as dichloride succinate, dichloride malonate, and dichloride fumarate. These may be used alone or in combination. After the reaction, preferably, acids present in the system are removed by neutralization or distillation under reduced pressure. If the acids are not removed, durability of the composition or the molded object may be degraded, or corrosion may occur.

In method (viii) in which block copolymers having mercapto groups are coupled by transesterification between a carbonate compound and the block copolymers, examples of carbonate compounds which may be used include, but not limited to, dimethyl carbonate, diethyl carbonate, di-n-propyl carbonate, diisopropyl carbonate, di-n-butyl carbonate, diisobutyl carbonate, di-sec-butyl carbonate, di-tert-butyl carbonate, divinyl carbonate, diallyl carbonate, diphenyl carbonate, ethylene carbonate, and propylene carbonate. These may be used alone or in combination. In the reaction between the block copolymers having mercapto groups and the carbonate compounds, any transesterification catalyst commonly used may be used. In order to carry out the reaction efficiently, by-product alcohol is preferably removed by distillation under normal or reduced pressures.

In method (ix) in which a ketone is allowed to react with block copolymers having mercapto groups to form thioketal bonds, and thereby the block copolymers are coupled, examples of ketones which may be used include, but not limited to, acetylacetone, acetone, isophorone, diisobutyl ketone, diisopropyl ketone, cyclohexanone, cyclopentanone, 1,3-dihydroxyacetone, 1,3-dihydroxyacetone dimethyl ether, 4,4-dimethoxy-2-butanone, diacetone acrylamide, diacetone alcohol, 4-hydroxy-2-butanone, methyl isobutyl ketone, methyl isopropyl ketone, methyl ethyl ketone, methylcyclohexanone, 3-methylpentenone, anthraquinone, chloranil, 1,4-diaminoanthraquinone, 1,4-dihydroanthraquinone, 4,4'-dimethoxybenzophenone, 2,3,4-trihydroxybenzophenone, 1,4-naphthoquinone, quinone, propiophenone, benzil, o-benzoylbenzoic acid, methyl o-benzoylbenzoate, benzoin, benzoin isopropyl ether, benzoin isobutyl ether, benzoin ethyl ether, benzophenone, 3,3',4,4'-benzophenonetetracarboxylic dianhydride, kojic acid, diketene, methyl 4-chloroacetoacetate, chloroacetophenone, 2,3-dichloro-5,6-dicyano-1,4-benzoquinone, 2,3-dichloro-1,4-naphthoquinone, and hexafluoroacetone. These may be used alone or in combination. In view of reactivity, the reaction is preferably carried out in acidic conditions. The acid used for creating the acidic conditions is not particularly limited and any acid commonly used may be used. In view of stability and corrosion resistance of the product, the acid is preferably neutralized after the reaction.

In method (x) in which block copolymers having mercapto groups are coupled by dehydrocondensation between a compound having at least two hydroxyl groups in each molecule and the block copolymers, examples of compounds having at least two hydroxyl groups in each molecule which may be used include, but not limited to, 3,6-dimethyl-4-octyne-3,6-diol, 2,4,7,9-tetramethyl-5-decyne-4,7-diol, 2,5-dimethyl-3-hexyne-2,5-diol, 2,5-dimethyl-2,5-hexanediol, isopropylene glycol, diisopropanolamine, triisopropanolamine, diethanolamine, triethanolamine, ethylene glycol, diethylene glycol, triethylene glycol, 2-ethyl-1,3-hexanediol, sodium gluconate, glycerol α-monochlorohydrin, 1,4-cyclohexanediol, 1,3-dihydroxyacetone, 1,4-dihydroxy-1,4-butanedisulfonic acid disodium salt, tartaric acid, diisopropyl tartrate, 1-thioglycerol, thiodiglycol, trimethylolethane, trimethylolpropane, trimethylolpropane monoallyl ether, neopentyl glycol, 1,3-butanediol, 1,4-butanediol, 2-butyl-2-ethyl-1,3-propanediol, propylene glycol, dipropylene glycol, tripropylene glycol, 1,6-hexanediol, 1,2,6-hexanetriol, hexylene glycol, pentaerythritol, 1,5-pentanediol, polyethylene glycol, polytetramethylene ether glycol, polypropylene glycol, 3-methyl-1,5-pentanediol, catechol, 1,4-dihydroxyanthraquinone, 1,4-dihydroxynaphthalene, 2,3,4-trihydroxybenzophenone, 2,3,5-trimethylhydroquinone, hydroquinone, bis(2-hydroxyethyl)terephthalate, bis(4-hydroxyphenyl)sulfone, bisphenol A, p-hydroxyphenethyl alcohol, 4-tert-butylcatechol, 2-tert-butylhydroquinone, protocatechuic acid, phloroglucinol, lauryl gallate, resorcin, leuco-1,4-dihydroxyanthraquinone, 1,1'-bi-2-naphthol, kojic acid, and citrazinic acid. These may be used alone or in combination. When the block copolymers having mercapto groups are allowed to react with the compound having at least two hydroxyl groups in each molecule, any esterification catalyst commonly used may be used. In this method, by removing water produced during reaction, the reaction can be also carried out effectively. As in the case described above, a method in which the resultant water is removed with a dehydrator, such as molecular sieves, a method in which the resultant water is removed by reaction with an orthocarboxylate ester or the like, or a method in which the resultant water is removed with an azeotropic solvent, such as toluene, is appropriately employed.

Among the coupling methods for coupling block copolymers having mercaptide groups, in method (xi) in which a compound having at least two halogen atoms in each molecule is allowed to react with the block copolymers to form sulfide bonds (Williamson reaction), and thereby coupling of the block copolymers is performed, examples of compounds having at least two halogen atoms in each molecule which may be used include, but not limited to, methylene chloride, 1,1,1-trichloroethane, 1,2-dichlroethane, chloroform, trichloroethylene, tetrachloroethylene, 1,3,5-trichlorobenzene, 2,5-dichloroaniline, 3,4-dichloroaniline, 3,5-dichloroaniline, 2,4-dichlorobenzoic acid, 2,3-dichlorotoluene, 2,4-dichlorotoluene, 2,6-dichlorotoluene, 3,4-dichlorotoluene, 2,6-dichloro-4-nitroaniline, 1,4-dichloro-2-nitrobenzene, 2,4-dichloro-1-nitrobenzene, o-chlorobenzyl chloride, p-chlorobenzyl chloride, 2,6-dichlorobenzyl chloride, 3,4-dichlorobenzyl chloride, 2,3-dichlorobenzaldehyde, 2,4-dichlorobenzaldehyde, 2,6-dichlorobenzaldehyde, o-dichlorobenzene, m-dichlorobenzene, p-dichlorobenzene, 2,3-dichlorobenzoyl chloride, 2,4-dichlorobenzoyl chloride, 2,6-dichlorobenzoyl chloride, carbon tetrachloride, 3,3'-dichloro-4,4'-diaminodiphenylmethane, 3,3'-dichloro-4,4'-diaminobiphenyl, 2,3-dichloro-5,6-dicyano-1,4-benzoquinone, 2,3-dichloro-1,4-naphthoquinone, 2,6-dichlorobenzal chloride, 2,6-dichlorobenzonitrile, octabromodiphenyl ether, 1,1,2,2-tetrabromoethane, 1,2-dibromo-4-(1,2-dibromoethyl)cyclohexane, 1,4-dibromobutane, 1,3-dibromopropane, 2,3-dibromo-1-propanol, 1,5-dibromopentane, decabromodiphenyl ether, tetradecabromop-diphenoxybenzene, tetrabromocyclooctane, tetramethylene chlorobromide, 2-(2-hydroxyethoxy)ethyl-2-hydroxypropyltetrabromophthalate, 1-bromo-2-chloroethane, 1-bromo-3-chloropropane, 1-bromo-6-chlorohexane, bromochloromethane, hexabromobenzene, pentamethylene chlorobromide, methylene dibromide, dichloropentafluoropropane, 2,4-difluoroaniline, 2,6-difluorobenzonitrile, 2,6-difluorobenzamide, 2,2,3,3-tetrafluoropropanol, 2,2,2-trifluoroacetamide, trifluoroacetaldehyde hydrate, trifluoroethanol, trifluoroacetic acid, trifluoroacetic anhydride, trifluoroacetic acid ethyl ester, trifluoromethanesulfonic acid, trifluoromethanesulfonic acid anhydride, lithium trifluoromethanesulfonate, 2-(trifluoromethyl)benzaldehyde, 4-(trifluoromethyl)benzaldehyde, 2-(trifluoromethyl)benzoyl chloride, perfluorooctyl iodide, 2-perfluoroalkylethanol, perfluoroalkylethyl acrylate, perfluoropropyl vinyl ether, perfluoropolyalkenyl vinyl ether, 1,3-bis(trifluoromethyl)benzene, 1,4-bis(trifluoromethyl)benzene, 2,2-bis (4-hydroxyphenyl)hexafluoropropane, vinylidene fluoride, hexafluoroacetone trihydrate, hexafluoro-2-propanol, hexafluoropropylene, hexafluoropropylene oxide, 1,2-diiodoethane, and 1,4-diiodobenzene. These may be used alone or in combination. When transparency is required, produced salts are preferably removed by filtration or water washing.

In method (xii) in which block copolymers having mercaptide groups are coupled by a reaction between a polyvalent acyl halide and the block copolymers, as the polyvalent acyl halide, the same polyvalent acyl halides as those used in method (vii) may be used.

In method (xiii) in which block copolymers having mercaptide groups are coupled by a neutralization reaction between a polyvalent carboxylic acid and the block copolymers, as the polyvalent carboxylic acid, the same polyvalent carboxylic acids as those used in method (iv) may be used, but not limited thereto. These may be used alone or in combination. In order to improve durability, after the reaction, by-produced bases may be neutralized.

When the block copolymers are coupled by the mercapto groups or mercaptide groups, the methods described above may be combined. In such a case, for example, compounds having carboxyl groups (method (iv)) and hydroxyl groups (method (x)), such as salicylic acid, lactic acid, and tartaric acid; and compounds having halogen atoms (method (xi)) and carboxyl groups (method (xiii)), such as 4-chlorobenzoic acid may be used.

In order to carry out the reactions efficiently, organic solvents may be used. Examples of organic solvents which may be used in the present invention include, but not limited to, hydrocarbon solvents, such as heptane, hexane, octane, cyclohexane, and mineral spirit; ester solvents, such as ethyl acetate, n-butyl acetate, isobutyl acetate, ethylene glycol monomethyl ether acetate, and diethylene glycol monobutyl ether acetate; ketone solvents, such as acetone, methyl ethyl ketone, methyl isobutyl ketone, diisobutyl ketone, and cyclohexanone; ether solvents, such as tetrahydrofuran, diethyl ether, di-n-butyl ether, dioxane, ethylene glycol dimethyl ether, and ethylene glycol diethyl ether; and aromatic petroleum solvents, such as toluene, xylene, Swasol 310 (manufactured by Cosmo Oil Co., Ltd.), Swasol 1000 (manufactured by Cosmo Oil Co., Ltd.), and Swasol 1500 (manufactured by Cosmo Oil Co., Ltd.). These solvents may be used alone or in combination. The reaction temperature is not particularly limited. In view of reactivity, the reaction temperature is preferably in the range of 0° C. to 200° C.

Examples of methacrylic ester monomers which may be used in the present invention include, but not limited to, methyl methacrylate, ethyl methacrylate, n-butyl methacrylate, isobutyl methacrylate, tert-butyl methacrylate, 2-ethylhexyl methacrylate, tridecyl methacrylate, stearyl methacrylate, cyclohexyl methacrylate, benzyl methacrylate, 2-hydroxyethyl methacrylate, 2-hydroxypropyl methacrylate, dimethylaminoethyl methacrylate, diethylaminoethyl methacrylate, glycidyl methacrylate, tetrahydrofurfuryl methacrylate, ethylene glycol dimethacrylate, triethylene glycol dimethacrylate, tetraethylene glycol dimethacrylate, 1,3-butylene glycol dimethacrylate, trimethylolpropane trimethacrylate, isopropyl methacrylate, pentyl methacrylate, hexyl methacrylate, heptyl methacrylate, octyl methacrylate, nonyl methacrylate, decyl methacrylate, dodecyl methacrylate, phenyl methacrylate, tolyl methacrylate, isobornyl methacrylate, 2-methoxyethyl methacrylate, 3-methoxybutyl methacrylate, 2-aminoethyl methacrylate, 2-methacryloyloxypropyltrimethoxysilane, 2-methacryloyloxypropyldimethoxymethylsilane, trifluoromethyl methacrylate, pentafluoroethyl methacrylate, and 2,2,2-trifluoroethyl methacrylate. These may be used alone or in combination. Among them, in view of availability, preferred are methyl methacrylate, ethyl methacrylate, n-butyl methacrylate, isobutyl methacrylate, tert-butyl methacrylate, 2-ethylhexyl methacrylate, dodecyl methacrylate, isobornyl methacrylate, cyclohexyl methacrylate, tridecyl methacrylate, stearyl methacrylate, benzyl methacrylate, 2-hydroxyethyl methacrylate, 2-hydroxypropyl methacrylate, 2-methoxyethyl methacrylate, dimethylaminoethyl methacrylate, diethylaminoethyl methacrylate, glycidyl methacrylate, and tetrahydrofurfuryl methacrylate. Because of satisfactory moldability, workability, and heat resistance, methyl methacrylate is preferable. In order to achieve a high glass-transition temperature, isobornyl methacrylate and cyclohexyl methacrylate are preferably used. As will be described later, in view of satisfactory compatibility with highly polar resins and highly polar rubbers, methacrylic esters having polar groups are preferably used.

Examples of acrylic ester monomers which may be used in the present invention include, but not limited to, methyl acrylate, ethyl acrylate, n-propyl acrylate, isopropyl acrylate, n-butyl acrylate, hexyl acrylate, 2-ethylhexyl acrylate, cyclohexyl acrylate, octyl acrylate, nonyl acrylate, decyl acrylate, dodecyl acrylate, phenyl acrylate, tolyl acrylate, benzyl acrylate, isobornyl acrylate, 2-methoxyethyl acrylate, 3-methoxybutyl acrylate, 2-hydroxyethyl acrylate, 2-hydroxypropyl acrylate, stearyl acrylate, glycidyl acrylate, 2-acryloyloxypropyldimethoxymethylsilane, 2-acryloyloxypropyltrimethoxysilane, trifluoromethyl acrylate, pentafluoroethyl acrylate, 2,2,2-trifluoroethyl acrylate, 3-dimethylaminoethyl acrylate, isobutyl acrylate, 4-hydroxybutyl acrylate, tert-butyl acrylate, ethoxy diethylene glycol acrylate, acrylate of alkyl-modified dipentaerythritol, ethylene oxide-modified bisphenol A diacrylate, Carbitol acrylate, acrylate of ε-caprolactone-modified dipentaerythritol, caprolactone-modified tetrahydrofurfuryl acrylate, diacrylate of caprolactone-modified neopentyl glycol hydroxypivalate, ditrimethylolpropane tetraacrylate, dipentaerythritol hexaacrylate, dipentaerythritol pentaacrylate, tetraethylene glycol acrylate, tetrahydrofurfuryl acrylate, tripropylene glycol acrylate, trimethylolpropane ethoxy triacrylate, trimethylolpropane triacrylate, neopentyl glycol diacrylate, diacrylate of neopentyl glycol hydroxypivalate, 1,9-nonanediol acrylate, 1,4-butanediol acrylate, 2-propenoic acid [2-[1,1-dimethyl-2-[(1-oxo-2-propenyl)oxy]ethyl]-5-ethyl-1,3-dioxane-5-yl]methyl ester, 1,6-hexanediol acrylate, pentaerythritol triacrylate, 2-acryloyloxypropylhydrogen phthalate, methyl 3-methoxyacrylate, and allyl acrylate. These may be used alone or in combination. In view of impact resistance and flexibility of molded objects produced by molding the compositions of the present invention, preferred are alkyl esters of acrylic acid, such as ethyl acrylate, n-butyl acrylate, isobornyl acrylate, isobutyl acrylate, 4-hydroxybutyl acrylate, tert-butyl acrylate, 2-methoxyethyl acrylate, dodecyl acrylate, ethoxy diethylene glycol acrylate, stearyl acrylate, 2-hydroxyethyl acrylate, 2-hydroxypropyl acrylate, and 2-ethylhexyl acrylate; and glycidyl acrylate. Among them, in view of the fact that proper polymerization reaction rates are achieved, more preferred are alkyl esters of acrylic acid with alkyl groups of 8 or less carbon atoms, such as ethyl acrylate, n-butyl acrylate, isobutyl acrylate, tert-butyl acrylate, and 2-ethylhexyl acrylate. Moreover, in view of availability and cost, most preferred are ethyl acrylate, n-butyl acrylate, and tert-butyl acrylate. In the applications which require oil resistance, 2-methoxhyethyl acrylate and 2-hydroxyethyl acrylate are preferably used.

In the block copolymer, which is the component (A) of the present invention, when a vinyl monomer copolymerizable with the methacrylic ester monomer or the acrylic ester monomer is also copolymerized in addition to the methacrylic ester monomer and the acrylic ester monomer, examples of vinyl monomers which may be used include, but not limited to, methacrylic ester monomers described above; acrylic ester monomers described above; aromatic alkenyl compounds, such as styrene, α-methylstyrene, p-methylstyrene, p-methoxystyrene, divinylbenzene, and vinylnaphthalene; vinyl cyanide compounds, such as acrylonitrile and methacrylonitrile; conjugated diene compounds, such as butadiene and isoprene; halogen-containing unsaturated compounds, such as vinyl chloride, vinylidene chloride, tetrafluoroethylene, hexafluoropropylene, vinylidene fluoride, and chloroprene; silicon-containing unsaturated compounds, such as vinyltrimethoxysilane and vinyltriethoxysilane; unsaturated dicarboxylic compounds or their derivatives, such as maleic anhydride, maleic acid, maleate monoesters, maleate diesters, fumaric acid, fumarate monoesters, and fumarate diesters; vinyl ester compounds, such as vinyl acetate, vinyl propionate, vinyl pivalate, vinyl benzoate, and vinyl cinnamate; maleimide compounds, such as maleimide, methylmaleimide, ethylmaleimide, propylmaleimide, butylmaleimide, hexylmaleimide, octylmaleimide, dodecylmaleimide, stearylmaleimide, phenylmaleimide, and cyclohexylmaleimide; acrylic acid; and methacrylic acid. These may be used alone or in combination. Among them, methacrylic acid, acrylic acid, methacrylonitrile, acrylonitrile, styrene, vinyl acetate, butadiene, and isoprene are preferred. When methacrylic acid or acrylic acid is copolymerized, oil resistance and heat resistance of the resultant composition are improved. When acrylonitrile or methacrylonitrile is used, oil resistance of the composition is improved, and in the case when a thermoplastic resin or rubber containing acrylonitrile is used as the component (B), compatibility with the component (B) is also improved. When vinyl acetate is used, in the case when a poly(vinyl chloride)-based thermoplastic resin is used as the component (B), compatibility with the component (B) is improved. When styrene, butadiene, or isoprene is used, in the case when an olefinic thermoplastic resin, olefinic polymer rubber, diene polymer rubber, or natural rubber is used as the component (B), compatibility with the component (B) is improved.

In the block copolymer, which is the component (A), the methacrylic ester polymer block is produced by polymerizing monomers containing a methacrylic ester monomer as a principal constituent, and is usually produced by polymerizing a methacrylic ester monomer in an amount of 50% by weight or more and a vinyl monomer copolymerizable with the methacrylic ester monomer in an amount of less than 50% by weight. In the block copolymer, which is the component (A) included in the composition of the present invention, in view of balance between cost and physical properties, the methacrylic ester polymer block is preferably produced by polymerizing methyl methacrylate in an amount of 50% by weight or more.

In the block copolymer, which is the component (A), in view of heat resistance and moldability of the resultant composition, the glass transition temperature of the methacrylic ester polymer block is preferably 20° C. or more, more preferably 40° C. or more, and most preferably 50° C. or more.

In the block copolymer, which is the component (A), the acrylic ester polymer block is produced by polymerizing monomers containing an acrylic ester monomer as a principal constituent, and is usually produced by polymerizing an acrylic ester monomer in an amount of 50% by weight or more and a vinyl monomer copolymerizable with the acrylic ester monomer in an amount of less than 50% by weight. In the block copolymer, which is the component (A) included in the composition of the present invention, in view of balance between cost and physical properties, the acrylic ester polymer block is preferably produced by polymerizing at least one acrylic ester monomer selected from the group consisting of ethyl acrylate, n-butyl acrylate, tert-butyl acrylate, 2-methoxyethyl acrylate, and 2-hydroxyethyl acrylate in an amount of 50% by weight or more.

In the block copolymer, which is the component (A), in view of impact resistance of the composition and effectiveness in improving flexibility, the glass transition temperature of the acrylic ester polymer block is preferably 30° C. or less, more preferably 0° C. or less, and most preferably −20° C. or less.

When a thermoplastic resin or rubber having relatively high polarity is used as the component (B), in view of compatibility and transparency, the block copolymer, which is the component (A), is preferably produced by copolymerizing at least one vinyl monomer selected from the group consisting of methacrylic ester monomers having hydroxyl groups, epoxy groups, amino groups, or carboxyl groups and acrylic ester monomers having hydroxyl groups, epoxy groups, amino groups, or carboxyl groups in an amount of less than 50% by weight. Examples of such vinyl monomers include, but not limited to, the following compounds among the vinyl monomers copolymerizable with methacrylic ester monomers or methacrylic ester monomers described above: dimethylaminoethyl acrylate, 4-hydroxybutyl acrylate, ethyl 3-(dimethylamino)acrylate, dipentaerythritol pentaacrylate, 2-hydroxyethyl acrylate, 2-hydroxypropyl acrylate, phthalic anhydride-2-hydroxypropyl acrylate adducts, glycidyl acrylate, 2-hydroxyethyl methacrylate, 2-hydroxypropyl methacrylate, dimethylaminoethyl methacrylate, diethylaminoethyl methacrylate, and glycidyl methacrylate. These may be used alone or in combination. Among them, in view of compatibility with the component (B) and excellent transparency and availability, glycidyl methacrylate, glycidyl acrylate, 2-hydroxyethyl methacrylate, and 2-hydroxyethyl acrylate are preferred. In particular, when glycidyl methacrylate or glycidyl acrylate is copolymerized, in the case when a thermoplastic resin or rubber having ester bonds, hydroxyl groups, or carboxylic groups is used as the component (B), superior compatibility with the component (B) is shown.

In the block copolymer, which is the component (A) included in the composition of the present invention, the composition ratio between the methacrylic ester polymer block and the acrylic ester polymer block is not particularly limited. The methacrylic ester polymer block content is preferably 5 to 90% by weight, and more preferably 10 to 80% by weight. If the methacrylic ester polymer block content is less than 5% by weight, mechanical strength of the molded object composed of the composition of the present invention may be decreased, or the surface of the molded object may become tacky. If the methacrylic ester polymer block content exceeds 90% by weight, the impact resistance-improving effect may become insufficient. In the composition of the present invention, by controlling the composition ratio between the methacrylic ester polymer block and the acrylic ester polymer block, hardness and working characteristics of the composition can be adjusted when the block copolymer is compounded with a thermoplastic resin or rubber. With respect to hardness, in general, when the methacrylic ester polymer block content is low, hardness is low, and when the methacrylic ester polymer block content is high, hardness is high. With respect to working characteristics, in general, when the methacrylic ester polymer block content is low, melt viscosity is low, and when the methacrylic ester polymer block content is high, melt viscosity is high.

The molecular weight of the block copolymer, which is the component (A) included in the composition of the present invention, is not particularly limited. The number-average molecular weight (Mn) determined by gel permeation chromatography (GPC) is preferably in the range of 3,000 to 500,000, and more preferably in the range of 5,000 to 400,000. If the number-average molecular weight is less than 3,000, melt viscosity is decreased, which may result in a difficulty in handling. If the number-average molecular weight exceeds 500,000, melt viscosity is increased, which may result in a difficulty in working.

The molecular-weight distribution of the block copolymer, which is the component (A) included in the composition of the present invention, is not particularly limited. The ratio (Mw/Mn) of the weight-average molecular weight (Mw) to the number-average molecular weight (Mn) determined by gel permeation chromatography (GPC) is preferably 2 or less, more preferably 1.8 or less, and most preferably 1.5 or less. If the molecular-weight distribution exceeds 2, effectiveness in improving physical properties may be decreased relative to the amount of addition, compatibility with the component (B) may be decreased, or transparency may be decreased when the block copolymer is mixed with the component (B).

As the thermoplastic resin, which is a component (B) used in the present invention, various thermoplastic resins which are conventionally used may be used without limitations. Examples of thermoplastic resins include, but not limited to, ionomer resins, such as SURLYN (manufactured by E. I. Du Pont de Nemours and Company), and HIMILAN (manufactured by Du Pont-Mitsui Polychemicals Co., Ltd.); ABS-vinyl chloride self-extinguishing resins, such as polyacrylic acid hydrazide, isobutylene-maleic anhydride copolymers, acrylonitrile-styrene-acrylic rubber copolymers (AAS), acrylonitrile-EPDM-styrene copolymers (AES), acrylonitrile-styrene copolymers (AS), acrylonitrile-butadiene-styrene copolymers (ABS), and Kaneka Enplex (manufactured by Kaneka Corporation); ABS heat-resistant resins, such as Kaneka MUH (manufactured by Kaneka Corporation); acrylonitrile-chlorinated polyethylene-styrene resins (ACS), methyl methacrylate-butadiene-styrene copolymers (MBS), methyl methacrylate-styrene copolymers, ethylene-vinyl chloride copolymers, ethylene-vinyl acetate copolymers (EVA), modified ethylene-vinyl acetate copolymers, chlorinated ethylene-vinyl acetate copolymers, ethylene-vinyl acetate-vinyl chloride graft copolymers, ethylene-vinyl alcohol copolymers (EVOH), chlorinated poly(vinyl chloride), chlorinated polyethylene, chlorinated polypropylene, carboxy vinyl polymers, ketone resins, norbornene resins, polytetrafluoroethylene (PTFE), ethylene fluoride-propylene copolymers, tetrafluoroethylene-perfluoroalkyl vinyl ether copolymers (PFA), polychlorotrifluoroethylene, ethylene-tetrafluoroethylene copolymers, low-melting-point ethylene-tetrafluoroethylene copolymers, poly(vinylidene fluoride) (PVDF), poly(vinyl fluoride), polyacetal, polyamide 6, polyamide 66, polyamide 610, polyamide 612, polyamide 11, polyamide 12, copolymerized polyamides, polyamide MXD6, polyamide 46, methoxymethylated polyamides, polyamideimides, polyarylates, thermoplastic polyimides, polyether imides, polyether ether ketones, polyethylene, poly(ethylene oxide), poly(ethylene terephthalate) (PET), poly(ethylene naphthalate), poly(vinylidene chloride), poly(vinyl chloride) (PVC), polycarbonate, poly(vinyl acetate), polystyrene, polysulfone, poly(ether sulfone), poly(amine sulfone), polyparavinylphenol, polyparamethylstyrene, polyallylamine, poly(vinyl alcohol) (PVA), polyvinyl ether, poly(vinyl butyral) (PVB), poly(vinyl formal) (PVF), polyphenylene ether, modified polyphenylene ether, poly(phenylene sulfide), polybutadiene, poly(butylene terephthalate) (PBT), polypropylene, polymethylpentene, poly(m-ethyl methacrylate), and various types of liquid crystal polymers. These may be used alone or in combination. Among them, in view of effectiveness in improving impact resistance, at least one resin selected from the group consisting of poly(vinyl chloride), poly(methyl methacrylate), acrylonitrile-styrene copolymers, acrylonitrile-butadiene-styrene copolymers, methyl methacrylate-styrene copolymers, methyl methacrylate-butadiene-styrene copolymers, polycarbonate, polyester resins, and polyamide resins is preferred.

As the rubber, which is a component (B) used in the present invention, at least one rubber selected from the group consisting of acrylic polymer rubbers, olefinic polymer rubbers, diene polymer rubbers, and natural rubber, or modified rubbers produced by graft-polymerizing unsaturated monomers thereto may be used. These rubbers may be used alone or in combination.

As the acrylic polymer rubber used in the present invention, any rubber produced by polymerizing monomers containing acrylic esters as principal constituents may be used without limitations. Examples of such acrylic esters include, but not limited to, the acrylic ester monomers described above. These may be used alone or in combination. Examples of acrylic polymer rubber include, but not limited to, acrylic rubbers produced by copolymerizing a small amount of at least one monomer, such as 2-chloroethyl vinyl ether, methyl vinyl ketone, acrylic acid, acrylonitrile, or butadiene, with ethyl acrylate, butyl acrylate, and mixed monomers of ethyl acrylate and butyl acrylate.

Examples of olefinic polymer rubbers which may be used in the present invention include, but not limited to, butyl rubber, ethylene-propylene-diene rubber, isobutylene polymer rubber, and ethylene-vinyl acetate copolymer rubber.

Examples of diene polymer rubbers which may be used in the present invention include, but not limited to, isoprene rubber, butadiene rubber, 1,2-polybutadiene, styrene-butadiene rubber, chloroprene rubber, nitrile rubber, and rubbers produced by hydrogenation of these rubbers.

Among them, when the elastomer composition requires oil resistance, acrylic rubber, chloroprene rubber, and nitrile rubber are preferable, and acrylic rubber is more preferable.

In the present invention, in view of improvement in compatibility with the block copolymer as the component (A), an unsaturated monomer is preferably graft-polymerized with the rubber as the component (B). Examples of unsaturated monomers which may be used include, but not limited to, the methacrylic ester monomers described above; the acrylic ester monomers described above; aromatic alkenyl compounds, such as styrene, α-methylstyrene, p-methylstyrene, p-methoxystyrene, divinylbenzene, and vinylnaphthalene; vinyl cyanide compounds, such as acrylonitrile and methacrylonitrile; conjugated diene compounds, such as butadiene and isoprene; halogen-containing unsaturated compounds, such as vinyl chloride, vinylidene chloride, tetrafluoroethylene, hexafluoropropylene, vinylidene fluoride, and chloroprene; silicon-containing unsaturated compounds, such as vinyltrimethoxysilane and vinyltriethoxysilane; unsaturated dicarboxylic compounds, such as maleic anhydride, maleic acid, maleate monoesters, maleate diesters, fumaric acid, fumarate monoesters, and fumarate diesters; vinyl ester compounds, such as vinyl acetate, vinyl propionate, vinyl pivalate, vinyl benzoate, and vinyl cinnamate; maleimide compounds, such as maleimide, methylmaleimide, ethylmaleimide, propylmaleimide, butylmaleimide, hexylmaleimide, octylmaleimide, dodecylmaleimide, stearylmaleimide, phenylmaleimide, and cyclohexylmaleimide; acrylic acid; and methacrylic acid. These may be used alone or in combination.

The amount of the unsaturated monomer to be graft-polymerized with the rubber is not particularly limited, and any amount may be selected in order to obtain necessary physical properties. In view of compatibility with the block copolymer as the component (A), and rubber elasticity, the amount of the unsaturated monomer is preferably 0 to 20 parts by weight based on 100 parts by weight of rubber.

As the component (B) of the present invention, either uncrosslinked rubber or crosslinked rubber may be used. In view of heat resistance and form retention, crosslinked rubber is preferable. Crosslinking of rubber may be carried out before the rubber is mixed with the block copolymer as the component (A), or dynamic crosslinking may be carried out when the rubber is melt-mixed with the block copolymer as the component (A).

The rubber which is crosslinked before being mixed with the block copolymer as the component (A) corresponds to rubber particles or bulk rubber. Examples of crosslinked rubber particles include, but not limited to, crosslinked rubber particles with graft chains, such as crosslinked rubber particles in which unsaturated monomers are graft-polymerized to the outer layers.

Examples of crosslinking methods include, but not limited to, a method in which a crosslinking agent, a vulcanization accelerator, etc. are incorporated when the rubber is melt-mixed with the block copolymer as the component (A); a method in which uncrosslinked rubber is kneaded together with a crosslinking agent and a vulcanization accelerator to produce crosslinked rubber; and a method in which unsaturated monomers together with polyfunctional monomers are polymerized by emulsion polymerization or suspension polymerization to produce crosslinked rubber.

Any known crosslinking agent may be used without limitations for crosslinking rubber. Examples of crosslinking agents include sulfur; thiuram-based organosulfur compounds, such as tetramethylthiuram disulfide and tetramethylthiuram monosulfide; organic peroxides, such as 2,4-dichlorobenzoyl peroxide, benzoyl peroxide, 1,1-di(tert-butylperoxy)-3,3,5-trimethylcyclohexane, n-butyl-4,4-bis(tert-butylperoxy)valerate, dicumyl peroxide, di-tert-butylperoxydiisopropylbenzene, 2,5-dimethyl-2,5-di(tert-butylperoxy)hexane, and 2,5-dimethyl-2,5-di(tert-butylperoxy)hexyne-3; oxime compounds, such as p-quinone dioxime and p,p'-dibenzoylquinone dioxime; alkylphenol resins, such as alkylphenol formaldehyde resins and brominated alkylphenol formaldehyde resins; polyamines, such as hexamethylenediamine carbamate; metal oxides; triazinethiol; polyols; selenium compounds; and tellurium compounds. These may be used alone or in combination. The amount of the crosslinking agent used is not particularly limited. In view of balance between crosslinking efficiency and rubber elasticity, the amount of the crosslinking agent used is preferably 0.1 to 30 parts by weight, and more preferably 0.5 to 20 parts by weight, based on 100 parts by weight of rubber.

When these crosslinking agents are used, in order to accelerate crosslinking, vulcanization accelerators may also be used. Examples of vulcanization accelerators include guanidine compounds, such as diphenylguanidine; thiuram compounds, such as tetramethylthiuram disulfide and tetramethylthiuram monosulfide; dithiocarbamate compounds, such as zinc dimethyldithio carbamate; thiazole compounds, such as 2-mercaptobenzothiazole and dibenzothiazyl sulfide; and sulfenamide compounds, such as N-cyclohexyl-2-benzothiazolsulfenamide and N-tert-butyl-2-benzothiazolsulfenamide. Zinc oxide and stearic acid may also be used. These vulcanization accelerators are effective when crosslinking is performed using sulfur, and are particularly effective for rubbers having double bonds, such as natural rubber, isoprene rubber, butadiene rubber, styrene-butadiene rubber, nitrile rubber, ethylene-propylene-diene rubber, butyl rubber, and chloroprene rubber. When an organosulfur compound is used as the crosslinking agent, preferably, a small amount of sulfur, the vulcanization accelerator, or zinc oxide is added thereto. When an organic peroxide is used as the crosslinking agent, preferably, zinc oxide is added thereto in order to improve heat resistance. Crosslinking by organic peroxides is effective for fluororubber, silicone rubber, ethylene-propylene-diene rubber, nitrile rubber, natural rubber, isoprene rubber, butadiene rubber, styrene-butadiene rubber, ethylene-propylene-diene rubber, chloroprene rubber, acrylic rubber, etc. When an oxime compound is used as the crosslinking agent, preferably, an activator is also used. Examples of activators which may be used include, but not limited to, lead oxide compounds, such as $PbO_2$ and $Pb_3O_4$, and dibenzothiazyl sulfide. Crosslinking by oxime compounds is effective for butyl rubber, natural rubber, isoprene rubber, butadiene rubber, styrene-butadiene rubber, nitrile rubber, ethylene-propylene-diene rubber, and chloroprene rubber. When an alkylphenol resin is used as the crosslinking agent, preferably, a crosslinking auxiliary, such as zinc oxide or tin chloride, is added thereto. Stearic acid may also be added thereto. Crosslinking by alkylphenol resins is effective for butyl rubber, etc. Crosslinking by polyamines can be applied to rubbers having halogen atoms, such as active chlorine-containing acrylic rubber and fluororubber.

Examples of crosslinked rubber particles in which unsaturated monomers are graft-polymerized to the outer layers include, but not limited to, methyl methacrylate-butadiene-styrene (MBS) copolymer resins produced by graft-copolymerizing methyl methacrylate and, as necessary, styrene, to butadiene or styrene-butadiene crosslinked rubber particles; and acrylic graft copolymer resins produced by graft-copolymerizing methyl methacrylate to butyl acrylate crosslinked rubber particles.

In the elastomer composition of the present invention, by adjusting the composition ratio between the block copolymer as the component (A) and the rubber as the component (B), the type and composition of the block copolymer as the component (A), and the type and composition of the rubber as the component (B), a variety of physical properties can be exhibited. For example, when an uncrosslinked rubber component is added to the block copolymer as the component (A), hardness and modulus can be decreased and elongation can be improved compared with the case in which the block copolymer as the component (A) is used alone, and loss and transfer of low-molecular components do not occur unlike the case when plasticizers are incorporated. When butyl rubber is used as the component (B), damping properties and gas-barrier properties can be imparted.

When the block copolymer as the component (A) and the rubber as the component (B) are dynamically crosslinked during melt-mixing, the balance between hardness and compression set of the elastomer composition can be improved. When acrylic rubber is used as the component (B), excellent oil resistance can be imparted.

When crosslinked rubber as the component (B) is added to the block copolymer as the component (A), hardness and modulus of the elastomer composition can be improved, and while retaining the properties of the rubber component, a composition with low tackiness can be obtained.

The contents of the component (B) and the block copolymer as the component (A) in the composition of the present invention are not particularly limited. In view of the effect of improving physical properties and moldability of a thermoplastic resin, acrylic polymer rubber, olefinic polymer rubber, diene polymer rubber, or natural rubber as the component (B), the content of the block copolymer as the component (A) is preferably 0.5 to 900 parts by weight, and more preferably 1 to 300 parts by weight, based on 100 parts by weight of the component (B). If the content of the block copolymer is less than 0.5 parts by weight, the effect of improving physical properties may not be clearly shown. If the content exceeds 900 parts by weight, moldability may be degraded.

In the composition of the present invention, besides the component (B) and the block copolymer as the component (A), in order to adjust various physical properties, at least one type of additives may be compounded as necessary. Examples of additives include (a) plasticizers, (b) thixotropy-improving agents, (c) heat resistance-improving agents, (d) stabilizers, (e) antioxidants, (f) ultraviolet absorbers, (g) hindered amine light stabilizers (HALSs), (h) antistatic agents, (i) fire retardants, (j) colorants, (k) blowing agents, (l) lubricants, (m) mildewproofing agents, (n) nucleating additives, (O) vulcanization accelerators, (p) aging resisters, (q) vulcanizing agents, (r) antiscorching agents, (s) peptizers, (t) tackifiers, (u) latex coagulants, (v) processing aids, (w) inorganic fillers, and (x) rubber materials. Optimum additives may be selected depending on the type and composition of the component (B), the composition of the block copolymer as the component (A), applications, etc.

Examples of (a) plasticizers include, but not limited to, dimethyl phthalate, diethyl phthalate, di-n-butyl phthalate, diheptyl phthalate, di(2-ethylhexyl) phthalate, diisononyl phthalate, diisodecyl phthalate, ditridecyl phthalate, butyl benzyl phthalate, dicyclohexyl phthalate, tetrahydrophthalic esters, tricresyl phosphate, triethyl phosphate, tributyl phosphate, tris(2-ethylhexyl) phosphate, tri(2-chloroethyl) phosphate, trisdichloropropyl phosphate, tributoxyethyl phosphate, tris(β-chloropropyl) phosphate, triphenyl phosphate, octyldiphenyl phosphate, tris(isopropylphenyl) phosphate, cresyldiphenyl phosphate, di-2-etylhexyl adipate, diisononyl adipate, diisodecyl adipate, di-n-alkyl adipate, dibutyl diglycol adipate, bis(2-ethylhexyl) azelate, dibutyl sebacate, di-2-ethylhexyl sebacate, acetyltriethyl citrate, acetyltributyl citrate, dibutyl maleate, di-2-ethylhexyl maleate, dibutyl fumarate, tris-2-ethylhexyl trimellitate, trialkyl trimellitate, polyester plasticizers, epoxy plasticizers, stearic acid-based plasticizers, and chlorinated paraffins. These may be used alone or in combination.

Examples of (b) thixotropy-improving agents include, but not limited to, sodium isethionate, potassium isethionate, ammonium isethionate, and sulfonate salts, such as sodium lauryl ethyl ester sulfonate, sodium myristyl ethyl ester sulfonate, and sodium stearyl ethyl ester sulfonate. These may be used alone or in combination.

Examples of (c) heat resistance-improving agents include, but not limited to, acidic compounds, such as phosphoric acid, phosphorous acid, sodium hydrogensulfate, potassium hydrogensulfate, chromic acid, hydrochloric acid, sulfuric acid, sulfurous acid, thiosulfuric acid, nitric acid, nitrous acid, iodic acid, acetic acid, chloroacetic acid, dichloroacetic acid, trichloroacetic acid, nicotinic acid, benzenesulfonic acid, benzoic acid, tartaric acid, malic acid, formic acid, butyric acid, citric acid, succinic acid, oxalic acid, picric acid, picolinic acid, phthalic acid, sulfamic acid, sulfamyl acid, aspartic acid, glycolic acid, glutamic acid, fumaric acid, maleic acid, malonic acid, lactic acid, oleic acid, salicylic acid, trimellitic acid, p-toluenesulfonic acid, and strong acid ion exchange resins; hydrotalcite compounds, such as natural hydrotalcite, synthetic hydrotalcite synthesized by methods disclosed in Japanese Examined Patent Application Publication Nos. 46-2280, 50-30039, and 61-174270, etc., hydrotalcite surface-treated with wax, such as a fatty acid ester, zinc-modified hydrotalcite, perchloric acid-treated hydrotalcite, modified hydrotalcite which is perchloric acid-treated zinc-modified hydrotalcite, and dry hydrotalcite produced by drying; zeolite compounds, such as zeolite A, zeolite X, zeolite Y, zeolite P, mordenite, aluminite, sodalite-group alminosilicates, clinoptilolite, erionite, and chabasite; and metal perchlorates, such as tin perchlorate, barium perchlorate, sodium perchlorate, and magnesium perchlorate. These may be used alone or in combination.

Examples of (d) stabilizers include, but not limited to, stabilizers for vinyl chloride, such as cadmium stearate, zinc stearate, barium stearate, calcium stearate, lead dibutyltin dilaurate, tris(nonylphenyl)phosphite, triphenyl phosphite, and diphenylisodecyl phosphite; organic tin stabilizers, such as di-n-octyltin bis(isooctylthioglycolate) salt, di-n-octyltin maleate polymers, di-n-octyltin dilaurate, di-n-octyltin maleate salt, di-n-butyltin bismaleate salt, di-n-butyltin maleate polymers, di-n-butyltin bis(octylthioglycolate) salt, di-n-butyltin β-mercaptopropionate polymers, di-n-butyltin dilaurate, di-n-methyltin bis(isooctylmercaptoacetate) salt, poly(thiobis-n-butyltin sulfide), monooctyltin tris(isooctylthioglycolate), dibutyltin maleate, di-n-butyltin maleate-carboxylate, and di-n-butyltin maleate-mercaptide; lead stabilizers, such as tribasic lead sulfate, dibasic lead phosphite, basic lead sulfite, bibasic lead phthalate, lead silicate, bibasic lead stearate, and lead stearate; and metallic soap stabilizers, such as cadmium soap, zinc soap, barium soap, lead soap, complex metallic soap, and calcium stearate. These may be used alone or in combination.

Examples of (e) antioxidants include, but not limited to, phenol antioxidants, such as 2,6-di-tert-butyl-p-cresol, butylated hydroxyanisole, 2,6-di-tert-butyl-4-ethylphenol, steary-β-(3,5-di-tert-butyl-4-hydroxyphenyl)propionate, 2,2'-methylenebis(4-methyl-6-tert-butylphenol), 2,2'-methylenebis(4-ethyl-6-tert-butylphenol), 4,4'-thiobis(3-methyl-6-tert-butylphenol), 4,4'-butylidenebis(3-methyl-6-tert-butylphenol), 3,9-bis[1,1-dimethyl-2-[β-(3-tert-butyl-4-hydroxy-5-methylphenyl)propionyloxy]ethyl]2,4,8,10-tetraoxaspiro[5,5]undecane, 1,3-tris(2-methyl-4-hydroxy-5-tert-butylphenyl)butane, 1,3,5-trimethyl-2,4,6-tris(3,5-di-tert-butyl-4-hydroxybenzyl)benzene, tetrakis-[methylene-3-(3',5'-di-tert-butyl-4'-hydroxyphenyl)propionate]methane, bis[3,3'-bis(4'-hydroxy-3'-tert-butylphenyl)butylic acid] glycol ester, 1,3,5-tris(3',5'-di-tert-butyl-4'-hydroxybenzyl)-S-triazine-2,4,6-(1H,3H,5H)trione, Topanol CA (manufactured by Lipre Co., Ltd.), and tocopherols; and sulfur-based antioxidants, such as dilauryl 3,3'-thiodipropionate, dimyristyl 3,3'-thiodipropionate, and distearyl 3,3'-thiodipropionate; and phosphorus-based antioxidants, such as triphenyl phosphite, diphenylisodecyl phosphite, 4,4'-butylidene-bis(3-methyl-6-tertbutylphenylditridecyl)phosphite, cyclicneopentanetetraylbis(octadecyl phosphite), tris(nonylphenyl)phosphite, tris(mononnonylphenyl)phosphite, tris(dinonylphenyl)phosphite, diisodecylpentaerythritol diphosphite, 9,10-dihydro-9-oxa-10-phosphaphenanthrene-10-oxide, 10-(3,5-di-tert-butyl-4-hydroxybenzyl)-9,10-dihydro-9-oxa-10-phosphaphenanthrene-10-oxide, 10-decyloxy-9,10-dihydro-9-oxa-10-phosphaphenanthrene, tris(2,4-di-tertbutylphenyl)phosphite, cyclicneopentanetetraylbis(2,4-di-tert-butylphenyl)phosphite, cyclicneopentanetetraylbis(2,6-di-tert-butyl-4-methylphenyl)phosphite, and 2,2-methylenebis(4,6-di-tert-butylphenyl)octylphosphite. These may be used alone or in combination.

Examples of (f) ultraviolet absorbers include, but not limited to, salicylic acid-based ultraviolet absorbers, such as phenyl salicylate, p-tert-butylphenyl salicylate, and p-octylphenyl salicylate; benzophenone-based ultraviolet absorbers, such as 2,4-dihydroxybenzophenone, 2-hydroxy-4-methoxybenzophenone, 2-hydroxy-4-octoxybenzophenone, 2-hydroxy-4-dodecyloxybenzophenone, 2,2'-dihydroxy-4-methoxybenzophenone, 2,2'-dihydroxy-4,4'-dimethoxybenzophenone, 2-hydroxy-4-methoxy-5-sulfobenzophenone, and bis(2-methoxy-4-hydroxy-5-benzoylphenyl)methane; benzotriazole-based ultraviolet absorbers, such as 2-(2'-hydroxy-5'-methylphenyl)benzotriazole, 2-(2'-hydroxy-5'-tert-butylphenyl)benzotriazole, 2-(2'-hydroxy-3',5'-di-tert-butylphenyl)benzotriazole, 2-(2'-hydroxy-3'-tert-butyl-5'-methylphenyl)-5-chlorobenzotriazole, 2-(2'-hydroxy-3',5'-di-tert-butylphenyl)-5-chlorobenzotoriazole, 2-(2'-hydroxy-3',5'-di-tert-amylphenyl) benzotriazole, 2-(2'-hydroxy-4'-octoxyphenyl) benzotriazole, 2-[2'-hydroxy-3'-(3",4",5",6"-tetrahydrophthalimidemethyl)-5'-methylphenyl] benzotriazole, 2,2-methylenebis[4-(1,1,3,3,-tetramethylbutyl)-6-(2H-benzotriazole-2-yl)phenol], [2-(2'-hydroxy-5'-methacryloxyphenyl)-2H-benzotriazole], and [2,2'-methylenebis[4-(1,1,3,3-tetramethylbutyl)-6-[(2H-benzotriazole-2-yl)phenol]]]; cyano acrylate-based ultraviolet absorbers, such as 2-ethylhexyl-2-cyano-3,3'-diphenyl acrylate, and ethyl-2-cyano-3,3'-diphenyl acrylate; and nickel-based ultraviolet absorbers, such as nickelbis(octylphenyl) sulfide, [2,2'-thiobis(4-tert-octylphenolate)]-n-butylaminenickel, nickel complex-3,5-di-tert-butyl-4-hydroxybenzyl-monoethylate phosphate, and nickel-dibutyldithiocarbamate. These may be used alone or in combination.

Examples of (g) hindered amine light stabilizers (HALSs) include, but not limited to, bis(2,2,6,6,-tetramethyl-4-piperidyl)sebacate, Sanol LS-770 (manufactured by Sankyo Co., Ltd.), Adekasutabu LA-77 (manufactured by Asahi Denka Co., Ltd.), Sumisorb 577 (manufactured by Sumitomo Chemical Co., Ltd.), Biosorb 04 (manufactured by Kyodo Chemical Co., Ltd.), Chimassorb 944LD (manufactured by Ciba Specialty Chemicals), Tinuvin 144 (manufactured by Ciba Specialty Chemicals), Adekasutabu LA-52 (manufactured by Asahi Denka Co., Ltd.), Adekasutabu LA-57 (manufactured by Asahi Denka Co., Ltd.), Adekasutabu LA-67 (manufactured by Asahi Denka Co., Ltd.), Adekasutabu LA-68 (manufactured by Asahi Denka Co., Ltd.), Adekasutabu LA-77 (manufactured by Asahi Denka Co., Ltd.), Adekasutabu LA-87 (manufactured by Asahi Denka Co., Ltd.), Adekasutabu PEP-36 (manufactured by Asahi Denka Co., Ltd.), and Goodrite UV-3034 (manufactured by Goodrich Corporation). These may be used alone or in combination.

Examples of (h) antistatic agents include, but not limited to, nonionic antistatic agents, such as poly(oxyethylene)alkylamine, poly(oxyethylene)alkylamide, poly(oxyethylene)alkyl ether, poly(oxyethylene)alkylphenyl ether, glycerin fatty acid ester, and sorbitan fatty acid ester; anionic antistatic agents, such as alkylsulfonate, alkylbenzene-sulfonate, alkylsulfate, and alkylphosphate; cationic antistatic agents, such as quaternary ammonium chloride, quaternary ammonium sulfate, and quaternary ammonium nitrate; amphoteric antistatic agents, such as alkyl betaine compounds, alkyl imidazoline compounds, and alkyl alanine compounds; and conductive resin antistatic agents, such as polyvinylbenzyl-type cationic compounds and poly(acrylic acid)-type cationic compounds. These may be used alone or in combination.

Examples of (i) fire retardants include, but not limited to, halogen fire retardants, such as tetrabromobisphenol A, 2,2-bis(4-hydroxy-3,5-dibromophenyl)propane, hexabromobenzene, tris(2,3-dibromopropyl)isocyanurate, 2,2-bis(4-hydroxyethoxy-3,5-dibromophenyl)propane, decabromodiphenyl oxide, and halogen-containing polyphosphate; phosphorus fire retardants, such as ammonium phosphate, tricresyl phosphate, triethyl phosphate, tris(β-chloroethyl) phosphate, trichloroethyl phosphate, trisdichloropropyl phosphate, cresyldiphenyl phosphate, xylenyldiphenyl phosphate, acidic phosphate ester, and nitrogen-containing phosphorus compounds; inorganic fire retardants, such as red phosphorus, tin oxide, antimony trioxide, zirconium hydroxide, barium metaborate, aluminum hydroxide, and magnesium hydroxide; and siloxane fire retardants, such as poly(dimethoxysiloxane), poly(diethoxysiloxane), poly(diphenoxysiloxane), poly(methoxyphenoxysiloxane), methyl silicate, ethyl silicate, and phenyl silicate. These may be used alone or in combination.

Examples of (j) colorants include, but not limited to, powdery colorants, granular colorants, liquid colorants, and masterbatch including colorants. Pigments, such as titanium oxide, may also be used. These may be used alone or in combination.

Examples of (k) blowing agents include, but not limited to, organic blowing agents, such as azodicarbon amide, azobis(isobutyronitrile), N,N'-nitrosopentamethylenetetramine, p-toluenesulfonylhydrazine, and p,p'-oxybis(benzenesulfohydrazide). These may be used alone or in combination.

Examples of (l) lubricants include, but not limited to, aliphatic hydrocarbon lubricants, such as liquid paraffin, microcrystalline wax, natural paraffin, synthetic paraffin, polyolefin wax, partial oxides thereof, fluorides thereof, and chlorides thereof; higher aliphatic alcohol and higher fatty acid lubricants, such as animal oil, e.g., beef tallow and fish oil, vegetable oil, e.g., coconut oil, soybean oil, rape oil, and rice bran wax, refined products thereof, and montan wax; aliphatic amide lubricant, such as amides of higher fatty acids, and bisamides of higher fatty acids; metallic soap lubricants, such as barium stearate, calcium stearate, zinc stearate, aluminum stearate, magnesium stearate, zinc stearate-barium stearate complex, and zinc stearate-calcium stearate complex; fatty acid ester lubricants, such as higher fatty acid esters of monohydric alcohol, higher fatty acid ester of polyhydric alcohol, higher fatty acid partial esters of polyhydric alcohol, montan wax-type long-chain esters, and partial hydrolyzates of montan wax-type long-chain esters;

and Hoechst Wax E (manufactured by Hoechst Japan Ltd.). These may be used alone or in combination.

Examples of (m) mildewproofing agents include, but not limited to, Vinyzene, Preventol, and thiabendazole. These may be used alone or in combination.

Examples of (n) nucleating additives include, but not limited to, sodium 2,2'-methylenebis(4,6-di-tertbutylphenyl) phosphate, sodium bis(4-tert-butylpheny)phosphate, bis(p-methylbenzylidene) sorbitol, alkyl-substituted dibenzylidene sorbitol, and bis(p-ehtylbenzilidene) sorbitol. These may be used alone or in combination.

Examples of (o) vulcanization accelerators include, but not limited to, hexamethylenetetramine, n-butylaldehydeaniline, 1,3-diphenylguanidine, di-o-tolylguanidine, 1-o-tolylbiguanide, di-o-tolylguanidine salt of dicatechol borate, N,N'-diphenylthiourea, 2-mercaptoimidazoline, N,N'-diethylthiourea, dibutylthiourea, dilaurylthiourea, 2-mercaptobenzothiazole, dibenzothiazyl disulfide, sodium salt of 2-mercaptobenzothiazole, zinc salt of 2-mercaptobenzothiazole, cyclohexylamine salt of 2-mercaptobenzothiazole, 2-(4'-morpholinodithio)benzothiazole, N-cyclohexyl-2-benzothiazolyl-sulfenamide, N-oxydiethylene-2-benzothiazolyl-sulfenamide, N-tert-butyl-2-benzothiazolyl-sulfenamide, tetramethylthiuram disulfide, tetraethylthiuram disulfide, tetrabutylthiuram disulfide, tetramethylthiuram monosulfide, dipentamethylenethiuram tetrasulfide, piperidine pentamethylenedithio carbamate, pipecoline pipecolyldithio carbamate, sodium dimethyldithio carbamate, sodium diethyldithio carbamate, sodium dibutyldithio carbamate, zinc dimethyldithio carbamate, zinc diethyldithio carbamate, zinc dibutyldithio carbamate, zinc N-ethyl-N-phenyldithio carbamate, and tellurium diethyldithio carbamate. These may be used alone or in combination.

Examples of (p) aging resisters include, but not limited to, poly(2,2,4-trimethyl-1,2-dihydroquinoline), 6-ethoxy-1,2-dihydro-2,2,4-trimethylquinoline, 1-(N-phenylamino)-naphthalene, styrenated diphenylamine, dialkyldiphenylamine, N,N'-diphenyl-p-phenylenediamine, N-phenyl-N'-isopropyl-p-phenylenediamine, N,N'-di-2-naphthyl-p-phenylenediamine, 2,6-di-tert-butyl-4-methylphenol, mono (α-methylbenzyl)phenol, di(α-methylbenzyl)phenol, tri(α-methylbenzyl)phenol, 2,2'-methylenebis(4-methyl-6-tert-butylphenol), 2,2'-methylenebis(4-ethyl-6-tert-butylphenol), 4,4'-butylidenebis(6-tert-butyl-3-methylphenol), 4,4'-thiobis(6-tert-butyl-3-methylphenol), 1,1-bis(4-hydroxyphenyl)cyclohexane, 2,5-di-tert-butylhydroquinone, 2,5-di-tert-amylhydroquinone, 2-mercaptobenzimidazole, zinc salt of 2-mercaptobenzimidazole, 2-mercaptomethylbenzimidazole, nickel dibutyldithio carbamate, tris (nonylphenyl)phosphite, dilauryl thiodipropionate, distearyl thiodipropionate, Sunnoc (manufactured by Ouchishinko Chemical Industrial Co., Ltd.), Suntight (manufactured by Seiko Chemical Co., Ltd.), and Ozoneguard G (manufactured by Kawaguchi Chemical Co., Ltd.). These may be used alone or in combination.

Examples of (q) vulcanizing agents include, but not limited to, p-quinone dioxime, p,p'-dibenzoylquinone dioxime, 4,4'-dithiodimorpholine, poly p-dinitrosobenzene, 2-di-n-butylamino-4,6-dimercapto-1,3,5-triazine, 2,4,6-trimercapto-s-triazine, Tackirol 201 (manufactured by Taoka Chemical Co., Ltd.), Hitanol 2501 (manufactured by Hitachi Chemical Co., Ltd.), and brominated alkylphenolformaldehyde resins. These may be used alone or in combination.

Examples of (r) antiscorching agents include, but not limited to, N-nitrosodiphenylamine and phthalic anhydride. These may be used alone or in combination.

Examples of (s) peptizers include, but not limited to, O,O'-dibenzamidediphenyl disulfide, zinc salt of 2-benzamidethiophenol, and Pepter 3S (manufactured by Kawaguchi Chemical Co., Ltd.). These may be used alone or in combination.

Examples of (t) tackifiers include, but not limited to, Tackirol 101 (manufactured by Taoka Chemical Co., Ltd.), Hitanol 1501 (manufactured by Hitachi Chemical Co., Ltd.), modified-alkylphenolformaldehyde resins, and Hitanol 5501 (manufactured by Hitachi Chemical Co., Ltd.). These may be used alone or in combination.

Examples of (u) latex coagulants include, but not limited to, cyclohexylamine salt of acetic acid. The latex coagulants may be used alone or in combination.

Examples of (v) processing aids include, but not limited to, Ekusuton K1 and Ekusuton L-2 (manufactured by Kawaguchi Chemical Co., Ltd.), and PA-20 (manufactured by Kaneka Corporation). These may be used alone or in combination.

Examples of (w) inorganic fillers include, but not limited to, fine silica powder containing water, calcium silicate, furnace black, channel black, thermal lamp black, gas black, oil black, acetylene black, calcium carbonate, clay, talc, titanium oxide, zinc white, diatomaceous earth, barium sulfate, and zinc oxide. These may be used alone or in combination.

As (x) rubber materials, natural rubber and synthetic rubbers may be used. Examples of synthetic rubbers include, but not limited to, styrene-butadiene rubber (SBR), butadiene rubber (BR), isoprene rubber (IR), ethylene-propylene copolymers (EPM), ethylene-propylene-diene copolymers (EPDM), acrylonitrile-butadiene copolymers (NBR), chloroprene rubber (CR), butyl rubber (IIR), urethane rubber, silicone rubber, polysulfide rubber, hydrogenated nitrile rubber, fluororubber, ethylene tetrafluoride-propylene rubber, ethylene tetrafluoride-propylene-vinylidene fluoride rubber, acrylic rubber (ACM), chlorosufonated polyethylene rubber, epichlorohydrin rubber, ethylene-acrylic rubber, liquid polysulfide rubber, liquid silicone rubber, liquid urethane rubber, liquid diene rubber, modified silicone liquid rubber, norbornene rubber, styrene-based thermoplastic elastomers, olefinic thermoplastic elastomers, urethane-based thermoplastic elastomers, polyester-based thermoplastic elastomers, polyamide-based thermoplastic elastomers, 1,2-polybutadiene-based thermoplastic elastomers, vinyl chloride-based thermoplastic elastomers, and fluorine-containing thermoplastic elastomers. These may be used alone or in combination.

When a thermoplastic resin is used as the component (B), and when the thermoplastic resin and a block copolymer as the component (A) are mixed with each other, the mixing method is not particularly limited. Production methods for thermoplastic resin compositions which are conventionally employed, for example, in the resin industry, rubber industry, elastomer industry, pressure sensitive adhesive industry, adhesive industry, and paint industry, may be employed. For example, the thermoplastic resin, the block copolymer as the component (A), and, if necessary, rubber and additives are mixed by a tumbler, Henschel mixer, revolving blender, or the like, and then are kneaded with an extruder, Bambury mixer, roller, or the like. The kneading temperature is not particularly limited and may be appropriately set depending on the type and composition of the thermoplastic resin, the composition of the block copolymer as the component (A), the compounding ratio between the thermoplastic resin and the block copolymer as the component (A), the types and amounts of the additives to be mixed, etc. The kneading temperature is usually set in the range from room temperature to 300° C. In particular, preferably, melt-mixing is performed at temperatures equal to or higher than the glass transition temperatures of the thermoplastic resin and the block copolymer as the component (A). Consequently, mixing can be performed in a short time. At this stage, at least one of the thermoplastic resin, the block copolymer as the component (A), rubber materials used as additives, etc. may be dynamically vulcanized.

With respect to the mixing method for the thermoplastic resin and the block copolymer as the component (A), as described above, both components may be mixed after they are produced. Alternatively, during or after the polymerization of one component, the other component may be mixed therewith. For example, the block copolymer as the component (A) may be dissolved in a solution prepared by solution polymerization of the thermoplastic resin. Alternatively, the thermoplastic resin may be dispersed and mixed into an emulsion prepared by emulsion polymerization of the block copolymer as the component (A). If additives do not adversely affect polymerization, the additives may be added to the mixture before or during polymerization.

The thermoplastic resin compositions of the present invention may be used for molded objects, coating materials, pressure sensitive adhesives, adhesives, hot melt adhesives, compatibilizers, paint additives, resin modifiers, rubber modifiers, etc. Various molding methods commonly used may be used for molding of the compositions of the present invention. Examples thereof are extrusion molding, compression molding, blow molding, calender molding, vacuum molding, and injection molding. Depending on the application, an appropriate molding method may be selected. The molded objects produced by molding the compositions of the present invention may be used in various applications, such as pipes, joints, flat plates, corrugated plates, sheets, films, pillars, wall materials, floor materials, toys, grips, shoe soles, sporting goods, window frames, doors, containers, automobile components, electric appliance cases, lenses, optical components, electric circuit boards, electronic components, bottles, bottle caps, packings, gaskets, and wire coverings.

The method for producing the elastomer composition of the present invention is not particularly limited. For example, in the rubber industry, any known method for producing rubber compositions may be employed. For example, a block copolymer as the component (A), a rubber as the component (B), and if necessary, crosslinking agents, vulcanization accelerators, additives, etc., are mixed by a tumbler, Henschel mixer, revolving blender, or the like, and then are kneaded with an extruder, Bambury mixer, roller, or the like. In such a case, the kneading temperature is preferably set in the range from room temperature to 230° C. In particular, when the glass transition temperature of the methacrylic ester polymer block in the block copolymer as the component (A) is 100° C. or more and when the weight ratio of the block copolymer in the elastomer composition is high, if the temperature is below room temperature, the individual components are not mixed sufficiently. Consequently, in the elastomer composition, when the amount of the block copolymer as the component (A) is less than 50 parts by weight based on 100 parts by weight of the rubber as the component (B), the kneading temperature is preferably from room temperature to 100° C. When the amount of the block copolymer is 50 to 100 parts by weight, the kneading temperature is preferably from 80° C. to 150° C. When the amount of the block copolymer exceeds 100 parts by weight, the kneading temperature is preferably from 150° C. to 210° C. However, if the kneading temperature exceeds 210° C., the block copolymer or the rubber component may be decomposed, which is not desirable. When the rubber component is dynamically vulcanized, in view of balance between the vulcanizing rate and moldability, the kneading temperature is preferably from 50° C. to 210° C.

The elastomer compositions of the present invention may be formed into molded objects by various known methods. In order to produce molded objects, for example, extrusion molding, compression molding, blow molding, calender molding, vacuum molding, and injection molding may be employed, but the method is not limited thereto.

The molded objects produced by molding the elastomer compositions of the present invention may be used in various applications. Examples of use of such molded objects include, but not limited to, sealing materials, gaskets, oil-resistant hoses, and coating sheets.

Among the molded objects of the present invention, with respect to sealing materials, in view of gas-barrier properties, preferably, butyl rubber is used as the rubber component, and more preferably, uncrosslinked butyl rubber or dynamically crosslinked butyl rubber is used. In view of heat resistance and durability, the methacrylic ester polymer block of the block copolymer as the component (A) is preferably a methyl methacrylate polymer, and the acrylic ester polymer block is preferably an ethyl acrylate polymer, butyl acrylate polymer, or ethyl acrylate-butyl acrylate-2-methoxyethyl acrylate copolymer. By copolymerizng at least one monomer selected from methacrylic acid, acrylic acid, methacrylonitrile, and acrylonitrile, heat resistance and oil resistance can be imparted. With respect to the weight ratio of the block copolymer as the component (A) to the rubber as the component (B), when the component (B) is an unvulcanized rubber, preferably, (A):(B)=90:10 to 50:50, and more preferably, (A):(B)=80:20 to 60:40. When the weight ratio of the component (B) exceeds 50% by weight, tackiness, etc. may occur during processing. When the component (B) is dynamically crosslinked, preferably, (A):(B)=90:10 to 20:80, and more preferably, (A):(B)=80:20 to 20:80. The sealing materials of the present invention may be used, for example, as sealing materials for the openings of glass bottles and PET bottles. In such cases, the elastomer compositions are formed into disks or cylinders by press molding and are put in the openings of the bottles or inserted into the lids.

Among the molded objects of the present invention, with respect to gaskets, in view of heat resistance and durability, the methacrylic ester polymer block of the block copolymer as the component (A) is preferably a methyl methacrylate polymer, and the acrylic ester polymer block is preferably an ethyl acrylate polymer or an ethyl acrylate-butyl acrylate-2-methoxyethyl acrylate copolymer. By copolymerizng at least one monomer selected from methacrylic acid, acrylic acid, methacrylonitrile, and acrylonitrile, heat resistance and oil resistance can be imparted. As the rubber component, in view of oil resistance and durability, acrylic rubber, chloroprene rubber, and nitrile rubber are preferable, and acrylic rubber is more preferable. The rubber component is preferably dynamically crosslinked. With respect to the weight ratio of the block copolymer as the component (A) to the rubber as the component (B), preferably, (A):(B)=90:10 to 20:80, and more preferably, (A):(B)=80:20 to 20:80. The gaskets of the present invention may be used, for example, as gaskets for syringes, gaskets for sealing glass, and gaskets for automobiles.

Among the molded objects of the present invention, with respect to oil resistant hoses, in view of oil resistance and heat resistance, the methacrylic ester polymer block of the block copolymer as the component (A) is preferably a methyl methacrylate polymer, and the acrylic ester polymer block is preferably an ethyl acrylate polymer or an ethyl acrylate-butyl acrylate-2-methoxyethyl acrylate copolymer. More preferably, at least one monomer selected from methacrylic acid, acrylic acid, methacrylonitrile, and acrylonitrile is copolymerized. Consequently, heat resistance and oil resistance are improved. As the rubber component, acrylic rubber, chloroprene rubber, and nitrile rubber are preferable, and acrylic rubber and nitrile rubber are more preferable. Most preferably, the rubber component is dynamically crosslinked. With respect to the weight ratio of the block copolymer as the component (A) to the rubber as the component (B), in view of balance between oil resistance or heat resistance and moldability, preferably, (A):(B)=90:10 to 20:80, and more preferably, (A):(B)=80:20 to 20:80. Such oil-resistant hoses may be produced, for example, by extrusion molding, and may be used as hoses for vehicles, such as automobiles.

Among the molded objects of the present invention, with respect to coating sheets, in view of wetherability and heat resistance, the methacrylic ester polymer block of the block copolymer as the component (A) is preferably a methyl methacrylate polymer, and the acrylic ester polymer block is preferably butyl acrylate. As the rubber component, graft-crosslinked rubber particles in which methyl methacrylate is graft-polymerized to crosslinked rubber particles of butyl acrylate are preferable. With respect to the weight ratio of the block copolymer as the component (A) to the rubber as the component (B), in view of balance between weatherability, heat resistance, or the like and moldability, preferably, (A):(B)=90:10 to 20:80, and more preferably, (A):(B)=80:20 to 50:50. The coating sheets of the present invention may be formed by molding the elastomer composition by any method, such as extrusion molding, compression molding, blow molding, calender molding, vacuum molding, or injection molding. In view of productivity and cost, extrusion molding is preferable. Additionally, simultaneously with or after extrusion, the sheets may be uniaxially or biaxially drawn.

BEST MODE FOR CARRYING OUT THE INVENTION

While the present invention will be described based on the examples below, it is to be understood that the invention is not limited thereto.

In the production examples in the examples, the weight-average molecular weight (Mw), number-average molecular weight (Mn), and molecular-weight distribution (Mw/Mn) were determined by gel permeation chromatography (GPC). In the GPC, unless otherwise described, chloroform was used as an eluent, and a polystyrene gel column (Shodex K-804 manufactured by Showa Denko K.K.) was used. The analysis was carried out on the basis of polystyrene.

In the examples, Izod impact strength was measured according to ASTM D256-56, using V-notched specimens, and average values measured at n=5 were calculated. Gardner strength was measured according to ASTM D3029-84-GB, using a 700 g weight, at 23° C., and at n=40. Melt viscosity, which is an index of moldability, was measured according to JIS K7199, using a capillary rheometer, at a shear rate of 1,216 s$^{-1}$. In a spiral flow test, square spirals with a thickness of 3 mm were injection-molded at a cylinder temperature of 250° C., a die temperature of 70° C., and an injection pressure of 608 kgf/cm$^2$, and molding fluidity was evaluated based on the length (mm) of each spiral.

In the examples, with respect to hardness, according to JIS K6253, hardness (JIS A) at 23° C. was measured. Tensile strength at break and elongation at break were measured according to JIS K6251, at 25° C. With respect to compression set, according to JIS K6301, columnar molded objects were held at 70° C. for 22 hours with a compression ratio of 25%, and was left to stand at room temperature for 30 minutes. The thickness of each molded object was then measured, and residual strain was calculated. With respect to oil resistance, according to JIS C232, molded objects were immersed in transformer oil B at 70° C. for 4 hours, and the oil resistance was measured based on rates of change in weight. In order to obtain the gel fraction, 1 g of a molded object was immersed in 50 mL of toluene at room temperature for 72 hours, the toluene-soluble fraction was fractionated, and the insoluble fraction was dried under reduced pressure and weighed.

Production Example 1

Synthesis of methyl methacrylate-n-butyl Acrylate Diblock Copolymer

Into a 2 L reactor equipped with an agitator, a thermometer, a nitrogen gas inlet tube, a dropping funnel, and a reflux condenser, was placed 490 g of distilled water and 0.56 g of sodium dodecyl sulfate as an emulsifier, and the reactor was nitrogen-purged while the reaction mixture was being stirred at 80° C. Into the reactor was added a mixed solution of 16.5 g of methyl methacrylate as a methacrylic ester monomer and 1.09 g of a thiocarbonylthio group-containing compound represented by the following structural formula:

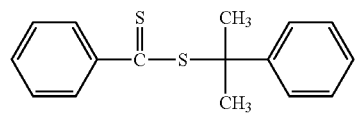

and the reaction mixture was stirred at 80° C. for 20 minutes under nitrogen flow. As a polymerization initiator, 0.93 g of 4,4'-azobis(4-cyanovaleric acid) together with 25 g of distilled water was added into the reactor. Stirring was performed at 80° C. for 1 hour, and then 85.0 g of methyl methacrylate was dripped from the dropping funnel for over 2 hours. After dripping was completed, the mixture was heated for 2 hours, and sampling was performed. Production of poly(methyl methacrylate)(conversion rate=90.1%, number-average molecular weight (Mn)=20,300, molecular-weight distribution (Mw/Mn)=1.23) was confirmed.

Next, as an acrylic ester monomer, 20.0 g of n-butyl acrylate was added into the reactor, and as a polymerization initiator, 0.40 g of 4,4'-azobis(4-cyanovaleric acid) together with 10 g of distilled water was further added thereinto. Stirring was performed at 80° C. for 1 hour, and then 80.0 g of n-butyl acrylate was dripped from the dropping funnel for over 1 hour. After dripping was completed, the mixture was stirred at 80° C. for 4 hours and then cooled to room temperature. A calcium chloride aqueous solution was added into the mixture to perform a salting-out method, followed by water washing and drying. Thereby, 155 g of methyl methacrylate-n-butyl acrylate diblock copolymer was produced. In the methyl methacrylate-n-butyl acrylate diblock copolymer, Mn=44,600 and Mw/Mn=1.34. $^1$H NMR analysis confirmed that the thiocarbonylthio groups were introduced into the copolymer with an introduction rate of 85%, and the weight ratio of methyl methacrylate to n-butyl acrylate was 46:54.

Production Example 2

Synthesis of methyl methacrylate-n-butyl acrylate-methyl methacrylate Triblock Copolymer Into a 2 L reactor equipped with an agitator, a thermometer, a nitrogen gas inlet tube, a dropping funnel, and a reflux condenser, was placed 490 g of distilled water and 0.56 g of sodium dodecyl sulfate as an emulsifier, and the reactor was nitrogen-purged while the reaction mixture was being stirred at 80° C. Into the reactor was added a mixed solution of 16.5 g of methyl methacrylate as a methacrylic ester monomer, and 1.09 g of a thiocarbonylthio group-containing compound represented by the following structural formula:

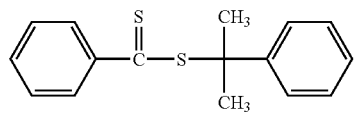

and the reaction mixture was stirred at 80° C. for 20 minutes. As a polymerization initiator, 0.93 g of 4,4'-azobis(4-cyanovaleric acid) together with 25 g of distilled water was added into the reactor. Stirring was performed at 80° C. for 1 hour, and then 85.0 g of methyl methacrylate was dripped from the dropping funnel for over 2 hours. After dripping was completed, the mixture was heated for 2 hours, and sampling was performed. Production of poly(methyl methacrylate)(conversion rate=91.2%, Mn=21,000, Mw/Mn=1.35) was confirmed.

Next, as an acrylic ester monomer, 20.0 g of n-butyl acrylate was added into the reactor, and as a polymerization initiator, 0.40 g of 4,4'-azobis(4-cyanovaleric acid) together with 10 g of distilled water was further added thereinto. Stirring was performed at 80° C. for 1 hour, and then 80.0 g of n-butyl acrylate was dripped from the dropping funnel for over 1 hour. After dripping was completed, the mixture was stirred at 80° C. for 4 hours and then cooled to room temperature. A calcium chloride aqueous solution was added into the mixture to perform a salting-out method, followed by water washing and drying. Thereby, 150 g of methyl methacrylate-n-butyl acrylate diblock copolymer was produced. In the methyl methacrylate-n-butyl acrylate diblock copolymer, Mn=46,600 and Mw/Mn=1.58. $^1$H NMR analysis confirmed that the thiocarbonylthio groups were introduced into the copolymer with an introduction rate of 88%, and the weight ratio of methyl methacrylate to n-butyl acrylate was 45:55.

The diblock copolymer (140 g), which was dissolved in 1,000 mL of toluene, was placed into a 2 L reactor equipped with an agitator, a thermometer, a nitrogen gas inlet tube, and a reflux condenser, and the reactor was nitrogen-purged. Into the reactor was added 9.8 g of diethylamine as a secondary amine compound, and by heating the mixture at 80° C. for 5 hours, the thiocarbonylthio groups at the ends of the n-butyl acrylate polymer blocks were quantitatively converted into mercapto groups. After the remaining diethylamine was removed by distillation, 0.22 g of hexamethylene diisocyanate as a compound having at least two isocyanato groups in each molecule used in method (ii) and 0.03 g of dibutyltin bis(isooctyl thioglycolate) as a urethane formation reaction catalyst were added into the mixture. By heating at 80° C. for 2 hours, and further heating at 100° C. for 3 hours, a methyl methacrylate-n-butyl acrylate-methyl methacrylate triblock copolymer was produced at a yield of 80%. In the triblock copolymer, Mn=70,800 and Mw/Mn=1.89.

Production Example 3

Synthesis of methyl methacrylate-n-butyl acrylate-methyl methacrylate Triblock Copolymer Into a 2 L reactor equipped with an agitator, a thermometer, a nitrogen gas inlet tube, a dropping funnel, and a reflux condenser, was placed 500 mL of toluene, 100 g of methyl methacrylate as a methacrylic ester monomer, and 3.19 g of a thiocarbonylthio group-containing compound represented by the following structural formula:

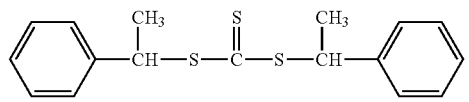

and the reactor was nitrogen-purged. As a polymerization initiator, 0.82 g of 2,2'-azobis(isobutyronitrile) was added into the reactor. Stirring was performed at 70° C. for 20 hours, and sampling was performed. Analysis confirmed that poly(methyl methacrylate)(Mn=9,600, Mw/Mn=1.32) was produced. $^1$H NMR analysis confirmed that the trithiocarbonate groups were introduced into the polymer main chain with an introduction rate of 89%.

Next, 0.25 g of 2,2'-azobis(isobutyronitrile) as a polymerization initiator was further added into the reactor, and 400 g of n-butyl acrylate as an acrylic ester monomer was dripped from the dropping funnel for over 2 hours while stirring was performed at 70° C. After dripping was completed, stirring under heat was further performed for 10 hours, and the mixture was then cooled to room temperature. The reaction liquid was gradually poured into 3 L of methanol and the copolymer was precipitated. The precipitate was filtrated, and washing was performed with ethanol, followed by drying. Thereby, 750 g of powder was produced. As a result of analysis, it was confirmed that the product was a methyl methacrylate-n-butyl acrylate-methyl methacrylate triblock copolymer, in which Mn=39,500 and Mw/Mn=1.71. $^1$H NMR analysis confirmed that the weight ratio of methyl methacrylate to n-butyl acrylate was 26:74 and that the trithiocarbonate groups were present.

Production Example 4

Synthesis of methyl methacrylate-(n-butyl acrylate/ethyl acrylate/2-methoxyethyl acrylate)-methyl methacrylate Triblock Copolymer Into a 500 mL reactor equipped with an agitator, a thermometer, a nitrogen gas inlet tube, a reflux condenser tube, and a dropping funnel, was placed 100 g of methyl methacrylate as a methacrylic ester monomer, 421 mg of dimethyl 2,2'-azobis(isobutylate) as a polymerization initiator, 796 mg of a thiocarbonylthio group-containing compound represented by the following structural formula:

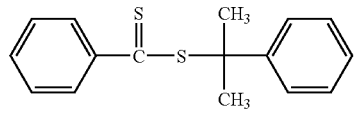

and 100 mL of toluene, and the reactor was nitrogen-purged. The reaction liquid was stirred at 80° C. for 2 hours, and a methyl methacrylate polymer (Mw=38,400, Mn=34,200, Mw/Mn=1.12) was thereby produced. Next, a mixed liquid of 89.6 g of n-butyl acrylate, 88.0 g of ethyl acrylate, and 54.7 g of 2-methoxyethyl acrylate as acrylic ester monomers was dripped from the dropping funnel for over 1 hour, followed by stirring at 80° C. for 5 hours. The reaction liquid was cooled to room temperature and poured into 1.5 L of methanol. A methyl methacrylate-(n-butyl acrylate/ethyl acrylate/2-methoxyethyl acrylate) diblock copolymer (Mn=104,000, Mw/Mn=1.44) was thereby produced. The composition ratio of the individual constituents was as follows: methyl methacrylate:n-butyl acrylate:ethyl acrylate:2-methoxyethyl acrylate=33:24:28:15 (weight ratio).

The diblock copolymer (300 g) was dissolved into 300 mL of toluene and placed into a 1 L reactor, and 100 g of diethylamine as a secondary amine compound was added thereinto, followed by stirring at room temperature for 8 hours. Diethylamine and toluene were removed by distillation under reduced pressure, and 295 g of a methyl methacrylate-(n-butyl acrylate/ethyl acrylate/2-methoxyethyl acrylate) diblock copolymer having mercapto groups at ends was thereby produced. Next, 300 mL of toluene was added to dissolve the diblock copolymer, and 200 mg of lead dioxide as an oxidizing agent was added thereinto, followed by stirring at 60° C. for 20 hours. After the reaction liquid was filtrated, the solvent was removed by distillation under reduced pressure, and reprecipitation was carried out with toluene/methanol. Coupling was performed by disulfide bonds, and a methyl methacrylate-(n-butyl acrylate/ethyl acrylate/2-methoxyethyl acrylate)-methyl methacrylate triblock copolymer (Mn=208,000, Mw/Mn=1.56) was produced. The composition ratio of the individual constituents was as follows: methyl methacrylate:n-butyl acrylate:ethyl acrylate:2-methoxyethyl acrylate=33:24:28:15 (weight ratio)

Production Example 5

Synthesis of methyl methacrylate-n-butyl acrylate-methyl methacrylate Triblock Copolymer Into a 2 L reactor equipped with an agitator, a thermometer, a nitrogen gas inlet tube, a dropping funnel, and a reflux condenser, was placed 490 g of distilled water and 0.56 g of sodium dodecyl sulfate as an emulsifier, and the reactor was nitrogen-purged while the reaction mixture was being stirred at 80° C. Into the reactor was added a mixed solution of 16.5 g of methyl methacrylate as a methacrylic ester monomer and 1.09 g of a thiocarbonylthio group-containing compound represented by the following structural formula:

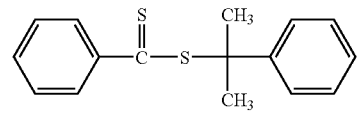

and the reaction mixture was stirred at 80° C. for 20 minutes. As a polymerization initiator, 0.93 g of 4,4'-azobis(4-cyanovaleric acid) together with 25 g of distilled water was added into the reactor. Stirring was performed at 80° C. for 0.5 hours, and then 85.0 g of methyl methacrylate was dripped from the dropping funnel for over 2 hours. After dripping was completed, the mixture was heated for 2 hours, and sampling was performed. Production of poly(methyl methacrylate)(conversion rate=90.1%, Mn=20,100, Mw/Mn=1.19) was confirmed.

Next, as an acrylic ester monomer, 20.0 g of n-butyl acrylate was added into the reactor, and as a polymerization initiator, 0.40 g of 4,4'-azobis(4-cyanovaleric acid) together with 10 g of distilled water was further added thereinto. Stirring was performed at 80° C. for 1 hour, and then 80.0 g of n-butyl acrylate was dripped from the dropping funnel for over 1 hour. After dripping was completed, the mixture was stirred at 80° C. for 4 hours and then cooled to room temperature. A calcium chloride aqueous solution was added into the mixture to perform a salting-out method, followed by water washing, filtration, and drying. Thereby, 155 g of methyl methacrylate-n-butyl acrylate diblock copolymer was produced. In the methyl methacrylate-n-butyl acrylate diblock copolymer, Mn=44,300 and Mw/Mn=1.44. The weight ratio of the individual constituents was as follows: methyl methacrylate:n-butyl acrylate=45:55.

The methyl methacrylate-n-butyl acrylate diblock copolymer (150 g) was dissolved into 240 mL of toluene and placed into a 1 L reactor equipped with an agitator, a thermometer, a nitrogen gas inlet tube, a dropping funnel, and a reflux condenser. In a nitrogen atmosphere, 15 g of n-butylamine as a primary amine compound and 9 g of bis(2,2,6,6,-tetramethyl-4-piperidyl)sebacate as a HALS were added into the reactor, and stirring was performed at 50° C. for 5 hours. $^1$H NMR measurement and IR measurement confirmed that the thiocarbonylthio groups were converted into mercapto groups at a yield of 91%. The toluene solution of the polymer was poured into 1 L of methanol to precipitate the polymer, followed by filtration, washing with methanol, and drying. Next, the polymer was dissolved into 240 mL of toluene, and 264 mg of dichloride succinate as a polyvalent acyl halide used in method (vii) was added thereinto, followed by stirring at 60° C. for 6 hours. $^1$H NMR and GPC measurement confirmed that the mercapto groups were coupled at a yield of 94% by acylation. In the resultant methyl methacrylate-n-butyl acrylate-methyl methacrylate triblock copolymer, Mn=85,200 and Mw/Mn=1.66. The weight ratio of the individual constituents was the same as that before the coupling reaction.

Production Example 6

Synthesis of methyl methacrylate-(n-butyl acrylate/ethyl acrylate) Star Block Copolymer Into a 1 L reactor equipped with an agitator, a thermometer, a nitrogen gas inlet tube, a dropping funnel, and a reflux condenser tube, was placed 330 mg of sodium dodecyl sulfate as an emulsifier and 300 g of distilled water, and the reactor was nitrogen-purged while the reaction mixture was being stirred at 80° C. Into the reactor was added 651 mg of a thiocarbonylthio group-containing compound represented by the following structural formula:

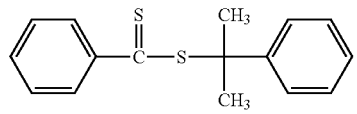

which had been dissolved into 9.0 g of methyl methacrylate as a methacrylic ester monomer, and after 20 minutes, as a polymerization initiator, 555 mg of 4,4'-azobis(4-cyanovaleric acid) together with 12 g of distilled water was added into the reactor. Stirring was performed at 80° C. for 20 minutes, and then 52.5 g of methyl methacrylate was dripped from the dropping funnel for over 90 minutes. After 30 minutes, as acrylic ester monomers, a mixed liquid of 30.0 g of n-butyl acrylate and 23.4 g of ethyl acrylate was dripped from the dropping funnel for over 1 hour. After stirring was performed at 80° C. for 5 hours, the emulsion was salted out with sodium chloride, followed by washing with distilled water, filtration, and drying. Thereby, 94.9 g of methyl methacrylate-(n-butyl acrylate/ethyl acrylate) diblock copolymer was produced. GPC measurement confirmed that Mn=44,300 and Mw/Mn=1.46. $^1$H NMR measurement confirmed that the thiocarbonylthio groups were introduced into the ends of the acrylic ester copolymer blocks, and the introduction rate was 92% on the single-end basis.

The resultant polymer (80 g) was dissolved into 400 mL of toluene, and 1.2 g of sodium hydride as a base was added thereinto, followed by stirring at room temperature for 2 hours and at 50° C. for 3 hours. The excess of sodium hydride was removed by filtration in a nitrogen atmosphere.

Next, into the methyl methacrylate-(n-butyl acrylate/ethyl acrylate) diblock copolymer having the mercaptide group at the acrylic ester block end thus obtained, was added 120 mg of 1,3,5-trichlorobenzene as a compound having at least two halogen atoms in each molecule used in method (xi) in a nitrogen atmosphere, followed by stirring at 80° C. for 20 hours. After devolatilization was performed under reduced pressure, the resultant polymer was subjected to $^1$H NMR and GPC measurement. As a result, production of a methyl methacrylate-(n-butyl acrylate/ethyl acrylate) star block copolymer (Mn=116,000, Mw/Mn=1.99) was confirmed.

Production Example 7

Synthesis of (methylmethacrylate/glycidyl methacrylate)-n-butyl acrylate Diblock Copolymer Into a 3 L reactor equipped with an agitator, a thermometer, a nitrogen gas inlet tube, a dropping funnel, and a reflux condenser tube, was placed 545 g of methyl methacrylate as a methacrylic ester monomer, 45 g of glycidyl methacrylate as an epoxy-group containing monomer, 6.0 g of a thiocarbonylthio group-containing compound represented by the following structural formula:

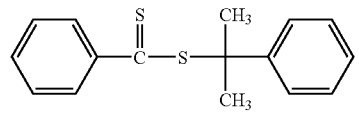

1.1 L of toluene as a solvent, and 0.7 g of 2,2'-azobis (isobutyronitrile) as a polymerization initiator, and the reactor was nitrogen-purged. Stirring was performed at 70° C. for 12 hours, and sampling was performed. GPC analysis and NMR analysis confirmed that Mw=29,900, Mn=23,700, and Mw/Mn=1.26, and that a methyl-methacrylate/glycidyl methacrylate copolymer having 15.4 epoxy groups and one thiocarbonylthio group in each molecule was produced.

Next, 490 g of n-butyl acrylate was dripped from the dropping funnel for over 2 hours while being stirred at 70° C. After dripping was completed, stirring was further performed at 70° C. for 12 hours, and the reaction liquid was poured into 5 L of methanol to precipitate a polymer. GPC analysis and NMR analysis confirmed that Mw=54,500, Mn=38,200, and Mw/Mn=1.43, and that the polymer was a (methyl-methacrylate/glycidyl methacrylate)-n-butyl acrylate diblock copolymer having 14.1 epoxy groups and 0.9 thiocarbonylthio groups in each molecule.

Production Example 8

Synthesis of methyl methacrylate-(n-butyl acrylate/acrylonitrile) Diblock Copolymer Into a 2 L reactor equipped with an agitator, a thermometer, a nitrogen gas inlet tube, a dropping funnel, and a reflux condenser tube, was placed 490 g of distilled water and 0.55 g of sodium dodecyl sulfate as an emulsifier, and the reactor was nitrogen-purged while the reaction mixture was being stirred at 80° C. Into the reactor was added a mixed solution of 16.3 g of methyl methacrylate as a methacrylic ester monomer and 1.10 g of a thiocarbonylthio group-containing compound represented by the following structural formula:

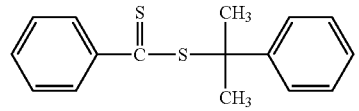

and the reaction mixture was stirred at 80° C. for 20 minutes under nitrogen flow. As a polymerization initiator, 0.95 g of 4,4'-azobis(4-cyanovaleric acid) together with 25 g of distilled water was added into the reactor. Stirring was performed at 80° C. for 2 hours, and then 85.0 g of methyl methacrylate was dripped from the dropping funnel for over 3 hours. After dripping was completed, the mixture was heated for 2 hours, and sampling was performed. Production of poly(methyl methacrylate)(conversion rate=89.6%, Mn=19,600, Mw/Mn=1.29) was confirmed.

Next, as an acrylic ester monomer, 20.0 g of n-butyl acrylate was added into the reactor, and as a polymerization initiator, 0.35 g of 4,4'-azobis(4-cyanovaleric acid) together with 10 g of distilled water was further added thereinto. Stirring was performed at 80° C. for 1 hour, and then a mixed solution of 45 g of n-butyl acrylate and 35 g of acrylonitrile was dripped from the dropping funnel for over 2.5 hours. After dripping was completed, the reaction liquid was stirred at 80° C. for 8 hours and then cooled to room temperature. A calcium chloride aqueous solution was added into the reaction liquid to perform a salting-out method, followed by filtration, water washing, and drying. Thereby, 139 g of methyl methacrylate-(n-butyl acrylate/acrylonitrile) diblock copolymer was produced. GPC analysis and NMR analysis confirmed that, in the copolymer, Mn=41,500 and Mw/Mn=1.50, and the weight ratio of the individual constituents was as follows: methyl methacrylate:n-butyl acrylate:acrylonitrile=45:32:23, and that the copolymer had 0.85 thiocarbonylthio groups in each molecule.

Production Example 9

(Synthesis of (methyl methacrylate/methacrylic acid)-n-butyl acrylate Diblock Copolymer Into a 1 L reactor equipped with an agitator, a thermometer, a nitrogen gas inlet tube, and a reflux condenser tube, was placed 103 g of methyl methacrylate as a methacrylic ester monomer, 91 g of methacrylic acid as a monomer copolymerizable with the methacrylic ester, 2.0 g of a thiocarbonylthio group-containing compound represented by the following structural formula:

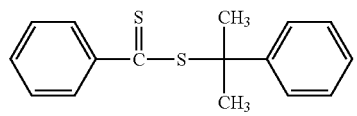

238 g of ethanol as a solvent, and 0.51 g of 2,2'-azobis (isobutyronitrile) as a polymerization initiator, and the reactor was nitrogen-purged. Stirring was performed at 70° C. for 7 hours, and the reaction solution was poured into 3.0 L of n-hexane to precipitate a polymer, followed by filtration and drying. The conversion rate of methyl methacrylate was 62% and the conversion rate of methacrylic acid was 67%. GPC analysis (in which tetrahydrofuran was used as an eluent) and NMR analysis confirmed that the resultant polymer was a (methyl methacrylate/methacrylic acid) copolymer, that the weight ratio of the individual constituents was as follows: methyl methacrylate:methacrylic acid=51:49, that Mn=20,000 and Mw/Mn=1.34, and that the copolymer had 0.92 thiocarbonylthio groups in each molecule.

The resultant (methyl methacrylate/methacrylic acid) copolymer (100 g) was dissolved in 300 mL of ethanol and placed into a 1 L reactor equipped with an agitator, a thermometer, a nitrogen gas inlet tube, a dropping funnel, and a reflux condenser tube. As an acrylic ester monomer, 120 g of n-butyl acrylate, and as a polymerization initiator, 0.35 g of 2,2'-azobis(isobutyronitrile) were added thereinto, and the reactor was nitrogen-purged. The reaction liquid was stirred at 70° C. for 10 hours and was poured into 2.5 L of n-hexane to precipitate a polymer, followed by filtration, washing, and drying. The conversion rate of n-butyl acrylate was 60%. GPC analysis (in which tetrahydrofuran was used as an eluent) and NMR analysis of the resultant polymer (154 g) confirmed that the polymer was a (methyl methacrylate/methacrylic acid)-n-butyl acrylate diblock copolymer, that the weight ratio of the individual constituents was as follows: methyl methacrylate:methacrylic acid:n-butyl acrylate=32:31:37, that Mn=33,300 and Mw/Mn=1.55, and that the copolymer had 0.90 thiocarbonylthio groups in each molecule.

Production Example 10

(Synthesis of (Methyl methacrylate/methacrylic acid)-n-butyl acrylate-(methyl methacrylate/methacrylic acid) Triblock Copolymer A (methyl methacrylate/methacrylic acid)-n-butyl acrylate diblock copolymer having 0.95 thiocarbonylthio groups in each molecule (Mn=31,700, Mw/Mn=1.47) was synthesized in the same reactions as those in Production Example 9. The weight ratio of the individual constituents was as follows: methyl methacrylate:methacrylic acid:n-butyl acrylate=35:30:35. The diblock copolymer (300 g) was dissolved in a mixed solvent including 600 mL of ethanol and 400 mL of ethyl acetate, and placed in a 2 L reactor equipped with an agitator, a thermometer, a nitrogen gas inlet tube, and a reflux condenser tube. As a secondary amine compound, 40 g of diethylamine was added thereinto, followed by stirring at 40° C. for 5 hours, and 20 g of 1 N HCl aqueous solution was then added thereinto, followed by stirring at 70° C. for 3 hours. The reaction solution was cooled to room temperature, concentrated, and poured into 3 L of n-hexane to precipitate a polymer. By filtration, washing, and drying, 271 g of (methyl methacrylate/methacrylic acid)-n-butyl acrylate diblock copolymer having 0.91 mercapto groups in each molecule was produced.

The mercapto group-containing diblock copolymer (271 g) was dissolved in a mixed solvent including 400 mL of ethanol and 400 mL of ethyl acetate, and 100 mL of 30% hydrogen peroxide solution as an oxidizing agent was added thereinto, followed by stirring at 30° C. for 8 hours. The reaction solution was poured into 2 L of n-hexane to precipitate a polymer, followed by filtration, washing, and drying. 255 g of polymer was thereby produced. GPC analysis (in which tetrahydrofuran was used as an eluent) and NMR analysis confirmed that the polymer was a (methyl methacrylate/methacrylic acid)-n-butyl acrylate-(methyl methacrylate/methacrylic acid) triblock copolymer in which coupling was performed by disulfide bonds, and that Mn=56,200 and Mw/Mn=1.87. The weight ratio of the individual constituents was the same as that before coupling.

Comparative Production Example 1

Attempt to Synthesize methyl methacrylate-n-butyl acrylate Diblock Copolymer without Using a Thiocarbonylthio Group-containing Compound An attempt was made to synthesize a methyl methacrylate-n-butyl acrylate diblock copolymer without adding a thiocarbonylthio group-containing compound. Into a 2 L reactor equipped with an agitator, a thermometer, a nitrogen gas inlet tube, a dropping funnel, and a reflux condenser, was placed 490 g of distilled water and 0.55 g of sodium dodecyl sulfate as an emulsifier, and the reactor was nitrogen-purged while the reaction mixture was being stirred at 80° C. As a methacrylic ester monomer, 16.4 g of methyl methacrylate was added into the reactor, followed by stirring at 80° C. for 20 minutes. As a polymerization initiator, 0.93 g of 4,4'-azobis(4-cyanovaleric acid) together with 25 g of distilled water was further added thereinto, followed by stirring at 80° C. for 1 hour. 85.0 g of methyl methacrylate was then dripped from the dropping funnel for over 2 hours. After dripping was completed, the mixture was heated for 2 hours, and sampling was performed. Production of poly(methyl methacrylate)(conversion rate=96.5%, number-average molecular weight (Mn)=21,400, molecular-weight distribution (Mw/Mn)=2.11) was confirmed.

Next, as an acrylic ester monomer, 20.0 g of n-butyl acrylate was added into the reactor, and as a polymerization initiator, 0.41 g of 4,4'-azobis(4-cyanovaleric acid) together with 10 g of distilled water was further added thereinto. Stirring was performed at 80° C. for 1 hour, and then 80.0 g of n-butyl acrylate was dripped from the dropping funnel for over 1 hour. After dripping was completed, the mixture was stirred at 80° C. for 2 hours and then cooled to room temperature. Hydrochloric acid was added into the mixture to perform a salting-out method, followed by water washing and drying. Thereby, 180 g of methyl methacrylate-n-butyl acrylate diblock copolymer was produced. In the methyl methacrylate-n-butyl acrylate diblock copolymer, the number-average molecular weight (Mn) of the methyl methacrylate portion was 21,400 and the number-average molecular weight (Mn) of the n-butyl acrylate portion was 31,600. The molecular-weight distribution (Mw/Mn) was 3.75. However, homopolymers of poly(methyl methacrylate) and poly(n-butyl acrylate) were partially included therein.

EXAMPLE 1

A mixture of 100 parts by weight of vinyl chloride resin (S1008, manufactured by Kaneka Corporation) as a thermoplastic resin, 2.5 parts by weight of dibutyltin maleate as a stabilizer, 0.5 parts by weight of Hoechst Wax E (manufactured by Hoechst Japan Ltd.) as a lubricant, 2.0 parts by weight of PA-20 (manufactured by Kaneka Corporation) as a processing aid, and 3.0 parts by weight of titanium oxide as a coloring agent (pigment) was compounded with 12 parts by weight of the methacrylic ester-acrylic ester block copolymer produced in Production Example 1. The resultant composition was roll-kneaded at a preset temperature of 180° C. for 5 minutes and formed into a sheet. The resultant sheet was thermopress-molded at a preset temperature of 190° C. to form a molded object with a thickness of 5 mm for evaluating physical properties. The Izod impact strength measured at 23° C. is shown in Table 1 below.

EXAMPLES 2 TO 10

Molding was performed as in Example 1 except that the methacrylic ester-acrylic ester block copolymer produced in each of Production Examples 2 to 10 was used instead of the methacrylic ester-acrylic ester block copolymer produced in Production Example 1. The Izod impact strength measured at 23° C. is shown in Table 1.

Comparative Example 1

Molding was performed as in Example 1 except that the methacrylic ester-acrylic ester block copolymer produced in Comparative Production Example 1 was used instead of the methacrylic ester-acrylic ester block copolymer produced in Production Example 1. The Izod impact strength measured at 23° C. is shown in Table 1.

Comparative Example 2

In Comparative Example 1, instead of the block copolymer produced in Comparative Production Example 1, a methyl methacrylate-butyl acrylate graft copolymer, FM-21 (manufactured by Kaneka Corporation), was used. Molding was performed as in Comparative Example 1. The Izod impact strength measured at 23° C. is shown in Table 1.

Comparative Example 3

In Comparative Example 1, a molded object was formed without compounding a block copolymer. The Izod impact strength measured at 23° C. is shown in Table 1.

TABLE 1

| | Block copolymer | Izod impact strength (kJ/m$^2$) |
|---|---|---|
| Example 1 | Production Example 1 | 11.8 |
| Example 2 | Production Example 2 | 14.7 |
| Example 3 | Production Example 3 | 13.5 |
| Example 4 | Production Example 4 | 14.8 |
| Example 5 | Production Example 5 | 12.6 |
| Example 6 | Production Example 6 | 14.0 |
| Example 7 | Production Example 7 | 16.1 |
| Example 8 | Production Example 8 | 15.0 |
| Example 9 | Production Example 9 | 14.4 |
| Example 10 | Production Example 10 | 17.2 |
| Comparative Example 1 | Comparative Production Example 1 | 9.7 |
| Comparative Example 2 | FM-21 | 9.6 |
| Comparative Example 3 | — | 2.9 |

As is evident from Table 1, the molded objects produced using the compositions of the present invention have excellent impact resistance.

EXAMPLE 11

84 parts by weight of methacrylic resin, PARAPET G1000 (manufactured by Kuraray Co., Ltd.), as a thermoplastic resin, was compounded with 16 parts by weight of the methacrylic ester-acrylic ester block copolymer produced in Production Example 1. Using a vent-type twin-screw extruder (32 mm, L/D=25.5), the resultant composition was extrusion-kneaded at a preset temperature of 230° C. and pelletized. The resultant pellets were dried at 80° C. for 15 hours, and injection molding was then performed at a preset temperature of 230° C. A molded plate object (120×120×3 mm) for evaluating physical properties was produced. The Gardner strength of the molded object is shown in Table 2 below.

EXAMPLE 12 TO 20

In Example 11, molding was performed except that the methacrylic ester-acrylic ester block copolymer produced in each of Production Examples 2 to 10 was used instead of the methacrylic ester-acrylic ester block copolymer produced in Production Example 1. The Gardner strength of the molded object is shown in Table 2.

Comparative Example 4

Molding was performed as in Comparative Example 11 except that the methacrylic ester-acrylic ester block copolymer produced in Comparative Production Example 1 was used instead of the methacrylic ester-acrylic ester block copolymer produced in Production Example 1. The Gardner strength of the resultant molded object is shown in Table 2.

Comparative Example 5

In Comparative Example 4, without using a block copolymer, a molded object composed of a methacrylic resin, PARAPET G1000, alone was produced in the same manner. The measured Gardner strength is shown in Table 2.

TABLE 2

|  | Block copolymer | Gardner strength (J) |
|---|---|---|
| Example 11 | Production Example 1 | 1.6 |
| Example 12 | Production Example 2 | 2.2 |
| Example 13 | Production Example 3 | 2.0 |
| Example 14 | Production Example 4 | 2.0 |
| Example 15 | Production Example 5 | 1.9 |
| Example 16 | Production Example 6 | 2.0 |
| Example 17 | Production Example 7 | 2.9 |
| Example 18 | Production Example 8 | 1.8 |
| Example 19 | Production Example 9 | 2.2 |
| Example 20 | Production Example 10 | 2.8 |
| Comparative Example 4 | Comparative Production Example 1 | 1.3 |
| Comparative Example 5 | — | 0.9 |

As is evident from Table 2, the molded objects produced using the compositions of the present invention have excellent impact resistance.

EXAMPLE 21

95 parts by weight of polycarbonate resin, LEXAN 141R-111 (manufactured by GE Plastics Japan, Ltd.), as a thermoplastic resin, 0.3 parts by weight of Topanol CA (manufactured by Lipre Co., Ltd.) as a phenolic antioxidant, and 0.3 parts by weight of Adekasutabu PEP-36 (manufactured by Asahi Denka Co., Ltd.) as a HALS were compounded with 5 parts by weight of the methacrylic ester-acrylic ester block copolymer produced in Production Example 1. Using a vent-type twin-screw extruder (32 mm, L/D=25.5), the resultant composition was extrusion-kneaded at a preset temperature of 280° C. and pelletized. The resultant pellets were dried at 80° C. for 15 hours, and injection molding was then performed at a preset temperature of 280° C. to form a molded object (¼ inch thick) for evaluating physical properties. The Izod impact strength of the resultant molded object at 0° C. and the melt viscosity of the pellets at 280° C. are shown in Table 3 below. The results of visual evaluation of transparency are also shown in Table 3, wherein ⊙ represents being highly transparent, ○ represents being ordinarily transparent, Δ represents being slightly opaque, and x represents being opaque.

EXAMPLES 22 TO 30

Molding was performed as in Example 21 except that the methacrylic ester-acrylic ester block copolymer produced in each of Production Examples 2 to 10 was used instead of the methacrylic ester-acrylic ester block copolymer produced in Production Example 1. The Izod impact strength of the resultant molded object at 0° C., the melt viscosity of the pellets at 280° C., and the result of visual evaluation of transparency for each Example are shown in Table 3.

Comparative Example 6

Molding was performed as in Example 21 except that the methacrylic ester-acrylic ester block copolymer produced in Comparative Production Example 1 was used instead of the methacrylic ester-acrylic ester block copolymer produced in Production Example 1. The Izod impact strength of the resultant molded object at 0° C., the melt viscosity of the pellets at 280° C., and the result of visual evaluation of transparency are shown in Table 3.

Comparative Example 7

In Comparative Example 6, a molded object was produced without compounding a block copolymer. The Izod impact strength of the resultant molded object at 0° C., the melt viscosity of the pellets at 280° C., and the result of visual evaluation of transparency are shown in Table 3.

TABLE 3

|  | Block copolymer | Izod impact strength (kJ/m$^2$) | Melt viscosity (poise) | Transparency |
|---|---|---|---|---|
| Example 21 | Production Example 1 | 11.8 | 2800 | Δ |
| Example 22 | Production Example 2 | 15.7 | 3800 | ○ |
| Example 23 | Production Example 3 | 14.0 | 3900 | ○ |
| Example 24 | Production Example 4 | 15.1 | 3300 | ⊙ |
| Example 25 | Production Example 5 | 12.9 | 4400 | ○ |
| Example 26 | Production Example 6 | 13.8 | 3500 | ○ |
| Example 27 | Production Example 7 | 18.5 | 4600 | ⊙ |
| Example 28 | Production Example 8 | 11.9 | 3100 | ○ |
| Example 29 | Production Example 9 | 16.2 | 4100 | ⊙ |
| Example 30 | Production Example 10 | 19.5 | 4400 | ⊙ |
| Comparative Example 6 | Comparative Production Example 1 | 9.7 | 4700 | x |
| Comparative Example 7 | — | 2.9 | 5000 | ⊙ |

As is evident from Table 3, with respect to the molded objects produced using the compositions of the present invention, it is possible to improve impact resistance and moldability with transparency not being impaired.

EXAMPLE 31

80 parts by weight of poly(butylene terephthalate) resin, DURANEX 2002 (manufactured by Polyplastic Co., Ltd.), as a thermoplastic resin, 0.3 parts by weight of Topanol CA (manufactured by Lipre Co., Ltd.) as a phenolic antioxidant, and 0.3 parts by weight of Adekasutabu PEP-36 (manufactured by Asahi Denka Co., Ltd.) as a HALS were compounded with 20 parts by weight of the methacrylic ester-acrylic ester block copolymer produced in Production Example 1. Using a vent-type twin-screw extruder (32 mm, L/D=25.5), the resultant composition was extrusion-kneaded at a preset temperature of 245° C. and pelletized. The resultant pellets were dried at 80° C. for 15 hours, and injection molding was then performed at a preset temperature of 250° C. to form a molded object (⅛ inch thick) for evaluating physical properties. The Izod impact strength at 23° C., the spiral flow, and the result of visual evaluation of transparency of the resultant molded object are shown in Table 4 below.

EXAMPLES 32 TO 40

Molding was performed as in Example 31 except that the methacrylic ester-acrylic ester block copolymer produced in each of Production Examples 2 to 10 was used instead of the methacrylic ester-acrylic ester block copolymer produced in Production Example 1. The Izod impact strength at 23° C., the spiral flow, and the result of visual evaluation of transparency are shown in Table 4.

Comparative Example 8

Molding was performed as in Example 31 except that the methacrylic ester-acrylic ester block copolymer produced in Comparative Production Example 1 was used instead of the methacrylic ester-acrylic ester block copolymer produced in Production Example 1. The Izod impact strength at 23° C., the spiral flow, and the result of visual evaluation of transparency are shown in Table 4.

Comparative Example 9

In Comparative Example 8, a molded object was produced without compounding a block copolymer. The Izod impact strength at 23° C., the spiral flow, and the result of visual evaluation of transparency are shown in Table 4.

TABLE 4

| | Block copolymer | Izod impact strength (kJ/m$^2$) | Spiral flow (mm) | Transparency |
|---|---|---|---|---|
| Example 31 | Production Example 1 | 14.7 | 510 | Δ |
| Example 32 | Production Example 2 | 19.8 | 470 | ⊚ |
| Example 33 | Production Example 3 | 20.0 | 450 | ⊚ |
| Example 34 | Production Example 4 | 20.5 | 480 | ⊚ |
| Example 35 | Production Example 5 | 18.7 | 410 | ○ |
| Example 36 | Production Example 6 | 19.6 | 420 | ⊚ |
| Example 37 | Production Example 7 | 21.7 | 290 | ⊚ |
| Example 38 | Production Example 8 | 13.1 | 550 | ○ |
| Example 39 | Production Example 9 | 15.3 | 370 | ⊚ |
| Example 40 | Production Example 10 | 19.6 | 370 | ⊚ |
| Comparative Example 8 | Comparative Production Example 1 | 8.7 | 300 | x |
| Comparative Example 9 | — | 2.8 | 110 | ⊚ |

As is evident from Table 4, with respect to the molded objects produced using the compositions of the present invention, it is possible to improve impact resistance and moldability with transparency not being impaired.

Production Example 11

Synthesis of methyl methacrylate-n-butyl acrylate-methyl methacrylate Triblock Copolymer Into a 500 mL reactor equipped with an agitator, a thermometer, a nitrogen gas inlet tube, a reflux condenser tube, and a dropping funnel, was placed 100 g (0.999 mol) of methyl methacrylate, 150 mg (0.913 mmol) of azobis (isobutyronitrile), 633 mg (1.83 mmol) of a thiocarbonylthio group-containing compound represented by the following structural formula:

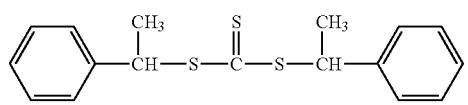

and 100 mL of toluene, and the reactor was nitrogen-purged. The reaction liquid was heated at 70° C. for 6 hours while being stirred, and a methyl methacrylate polymer (Mw=67,800, Mn=55,900, Mw/Mn=1.21) was thereby produced. Next, 210 g (1.64 mol) of n-butyl acrylate was dripped from the dropping funnel for over 2 hours, and heating was further performed at 70° C. for 4 hours. The reaction solution was then cooled to room temperature, and poured into 1.2 L of methanol. A methyl methacrylate-n-butyl acrylate-methyl methacrylate triblock copolymer (Mn=155,000, Mw/Mn=1.28) was thereby produced. The ratio of the individual constituents was as follows: methyl methacrylate: n-butyl acrylate=31:69 (weight ratio).

Production Example 12

Synthesis of methyl methacrylate-(n-butyl acrylate/ethyl acrylate/2-methoxyethyl Acrylate) Diblock Copolymer Into a 500 mL reactor equipped with an agitator, a thermometer, a nitrogen gas inlet tube, a reflux condenser tube, and a dropping funnel, was placed 100 g (0.999 mol) of methyl methacrylate, 421 mg (1.83 mmol) of dimethyl 2,2'-azobis(isobutylate), 796 mg (2.92 mmol) of a thiocarbonylthio group-containing compound represented by the following structural formula:

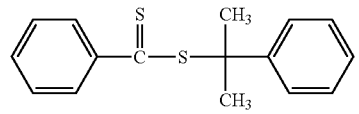

and 100 mL of toluene, and the reactor was nitrogen-purged. The reaction liquid was stirred at 80° C. for 2 hours. A methyl methacrylate polymer (Mw=38,400, Mn=34,200, Mw/Mn=1.12) was thereby produced. A mixed liquid of 89.9 g (0.699 mol) of n-butyl acrylate, 88.0 g (0.879 mol) of ethyl acrylate, and 54.7 g (0.420 mol) of 2-methoxyethyl acrylate was dripped from the dropping funnel for over 1 hour, and stirring was further performed at 80° C. for 5 hours. The reaction solution was cooled to room temperature and poured into 1.5 L of methanol. A methyl methacrylate-(n-butyl acrylate/ethyl acrylate/2-methoxyethyl acrylate) diblock copolymer (Mn=104,000, Mw/Mn=1.44) was thereby produced. The composition ratio of the individual constituents was as follows: methyl methacrylate:n-butyl acrylate:ethyl acrylate:2-methoxyethyl acrylate=33:24:28:15 (weight ratio).

Production Example 13

Synthesis of methyl methacrylate-(n-butyl acrylate/ethyl acrylate/2-methoxyethyl acrylate)-methyl methacrylate Triblock Copolymer In the same method as that in Production Example 12, a methyl methacrylate-(n-butyl acrylate/ethyl acrylate/2-methoxyethyl acrylate) diblock copolymer (Mn=104,000, Mw/Mn=1.44) was synthesized. The diblock copolymer (300 g) was dissolved in 300 mL of toluene and the solution was placed into a 1 L reactor. As a secondary amine compound, 100 g (1.37 mol) of diethylamine was added thereinto, and stirring was performed at room temperature for 20 hours. After diethylamine and toluene were removed by distillation under reduced pressure, reprecipitation was carried out with toluene/methanol, and 295 g of methyl methacrylate-(n-butyl acrylate/ethyl acrylate/2-methoxyethyl acrylate) diblock copolymer having mercapto groups at the ends was produced. Next, 300 mL of toluene was added to dissolve the copolymer, and 200 mg (0.837 mmol) of lead dioxide was added thereinto, followed by stirring at 60° C. for 30 hours. After the reaction solution was filtrated, the solvent was removed by distillation under reduced pressure, and reprecipitation was carried out with toluene/methanol. A methyl methacrylate(n-butyl acrylate/ethyl acrylate/2-methoxyethyl acrylate)methyl methacrylate triblock copolymer (Mw=325,000, Mn=208,000, Mw/Mn=1.56) was produced by coupling by disulfide bonds. The composition ratio of the individual constituents was as follows: methyl methacrylate:n-butyl acrylate:ethyl acrylate:2-methoxyethyl acrylate=33:24:28:15 (weight ratio).

Production Example 14

Synthesis of methyl methacrylate-n-butyl acrylate-methyl methacrylate Triblock Copolymer Into a 1 L reactor equipped with an agitator, a thermometer, a nitrogen gas inlet tube, a reflux condenser tube, and a dropping funnel, was placed 410 mg (1.42 mmol) of sodium dodecyl sulfate and 400 g of distilled water, and the reactor was nitrogen-purged while the reaction mixture was being stirred at 80° C. Into the reactor was added a mixed solution of 800 mg (2.31 mmol) of a thiocarbonylthio group-containing compound represented by the following structural formula:

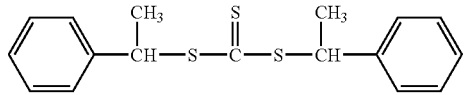

and 20 g (0.200 mol) of methyl methacrylate as a methacrylic ester monomer, followed by stirring at 80° C. for 20 minutes. As a polymerization initiator, 432 mg (1.54 mmol) of 4,4'-azobis(4-cyanovaleric acid) together with 25 g of distilled water was added into the reactor. Stirring was performed at 80° C. for 30 minutes, and then 80 g (0.799 mol) of methyl methacrylate was dripped from the dropping funnel for over 1.5 hours. After dripping was completed, the mixture was further heated at 80° C. for 2 hours. A methyl methacrylate polymer (Mn=43,300, Mw/Mn=1.17) was thereby produced. Next, as an acrylic ester monomer, 230 g (1.79 mol) of n-butyl acrylate was dripped from the dropping funnel for over 2 hours, and heating was further performed at 80° C. for 14 hours. The emulsion was cooled to room temperature, and a calcium chloride aqueous solution was added thereinto to perform a salting-out method, followed by filtration and washing. A methyl methacrylate-n-butyl acrylate-methyl methacrylate triblock copolymer (Mn=155,000, Mw/Mn=1.28) was thereby produced. The composition ratio of the individual constituents was as follows: methyl methacrylate:n-butyl acrylate=31:69 (weight ratio).

Production Example 15

Synthesis of Crosslinked Rubber Particles (without Graft)

Into a 1 L reactor equipped with an agitator, a thermometer, a nitrogen gas inlet tube, a reflux condenser tube, and a dropping funnel, was placed 500 g of pure water, 1.5 g (5.2 mmol) of sodium tridecylsulfate, 10 mg (0.02 mmol) of tetrasodium ethylenediaminetetraacetate, 2.5 mg (0.009 mmol) of ferroussulfate heptahydrate, and 0.875 g of 5% sodium formaldehyde sulfoxylate aqueous solution, and the mixture was stirred at 40° C. under nitrogen flow. A mixed liquid of 250 g (2.50 mol) of n-butyl acrylate, 3.75 g (29.7 mmol) of allyl methacrylate, and 75 mg (0.48 mmol) of cumene hydroperoxide was dripped from the dropping funnel for over 5 hours. 1 hour after dripping was started, 0.75 g (2.6 mmol) of sodium tridecylsulfate was added, and 3 hours after dripping was started, 0.75 g (2.6 mmol) was further added into the dropping funnel. After dripping was completed, the liquid was further stirred for 1 hour at 40° C. and cooled to room temperature. In the resultant internally crosslinked acrylic ester polymer latex, the average particle size was 100 nm (measured by a light scattering method with a wavelength of 546 μm), and the monomer reaction rate was 98%. The latex was salted out and solidified with a calcium chloride aqueous solution, followed by heat treatment and drying. Butyl acrylate-based crosslinked rubber particles, which were white and powdery, were thereby produced.

Production Example 16

Synthesis of Crosslinked Rubber Particles (with Graft)

In the same manner as that in Production Example 15, a rubbery polymer latex was produced. The rubbery polymer latex was kept at 60° C. and 0.25 g of 5% sodium formaldehyde sulfoxylate aqueous solution was added thereinto. A mixed liquid of 26.25 g (0.262 mol) of methyl methacrylate, 1.5 g (11.7 mmol) of n-butyl acrylate, and 82.5 mg (0.915 mmol) of tert-butyl hydroperoxide was dripped from the dropping funnel for over 1 hour. After dripping was completed, the mixture was stirred at 60° C. for 1 hour and then cooled to room temperature. The resultant graft copolymer had an average particle size of 110 nm, and the monomer reaction rate was 99%. The latex was salted out and solidified with a calcium chloride aqueous solution, followed by heat treatment and drying. Metyl methacrylate-butyl acrylate-based graft crosslinked rubber particles, which were white and powdery, were thereby produced.

EXAMPLES 41 AND 42

In each Example, acrylic rubber (AR42W manufactured by ZEON Corporation) and the methyl methacrylate-(n-butyl acrylate/ethyl acrylate/2-methoxyethyl acrylate)-methyl methacrylate triblock copolymer produced in Production Example 13 in the weight ratio shown in Table 5 were melt-kneaded with a Laboplastomill (manufactured by Toyo Seiki Seisaku-sho, Ltd.) set at 190° C. As a crosslinking agent, ammonium benzoate in the amount shown in Table 5 was added thereinto, and melt-kneading was performed with the Laboplastomill set at 190° C. The resultant sample block was thermopress-molded at a preset temperature of 190° C., and a molded object with a thickness of 2 mm for evaluating physical properties and a columnar molded object (30 mm in diameter×12 mm thick) for evaluating compression set were formed. These molded objects were vulcanized by heating at 150° C. for 2 hours. With respect to the molded objects, hardness, tensile strength at break, elongation at break, compression set, oil resistance, and gel fraction were measured, and the results thereof are shown in Table 5.

EXAMPLES 43 TO 46

In each Example, molded objects were formed and their physical properties were evaluated in the same manner as that in Example 41, in the weight ratio shown in Table 5, except that the block copolymer produced in Production Example 7 or 10 was used instead of the methacrylic ester-acrylic ester-methacrylic ester triblock copolymer used in Example 41. The results thereof are shown in Table 5.

Comparative Example 10

The methyl methacrylate-(n-butyl acrylate/ethyl acrylate/2-methoxyethyl acrylate)-methyl methacrylate triblock copolymer produced in Production Example 13 was melt-kneaded with a Laboplastomill (manufactured by Toyo Seiki Seisaku-sho, Ltd.) set at 190° C. The resultant sample block was thermopress-molded at a preset temperature of 190° C., and a molded object with a thickness of 2 mm for evaluating physical properties and a columnar molded object (30 mm in diameter×12 mm thick) for evaluating compression set were formed. With respect to the molded objects, hardness, tensile strength at break, elongation at break, compression set, oil resistance, and gel fraction were measured, and the results thereof are shown in Tables 5 and 6.

EXAMPLES 47 TO 53

In each Example, butyl rubber (Butyl 365 manufactured by JSR Corporation) and the methyl methacrylate-(n-butyl acrylate/ethyl acrylate/2-methoxyethyl acrylate)-methyl methacrylate triblock copolymer produced in Production Example 13, the methyl methacrylate-n-butyl acrylate-methyl methacrylate triblock copolymer produced in Production Example 14, the (methyl-methacrylate/glycidyl methacrylate)-n-butyl acrylate diblock copolymer produced in Production Example 7, or the (methyl methacrylate/methacrylic acid)-n-butyl acrylate-(methyl methacrylate/methacrylic acid) triblock copolymer produced in Production Example 10 in the weight ratio shown in Table 6 were melt-kneaded with a Laboplastomill (manufactured by Toyo Seiki Seisaku-sho, Ltd.) set at 190° C. At this stage, 5 parts by weight of zinc oxide and 1 part by weight of stearic acid based on 100 parts by weight of butyl rubber were added into the mixture. As a crosslinking agent, brominated alkylphenol formaldehyde in the amount shown in Table 6 was added thereinto, and melt-kneading was performed with the Laboplastomill set at 190° C. The resultant sample block was thermopress-molded at a preset temperature of 190° C., and a molded object with a thickness of 2 mm for evaluating

TABLE 5

| Example | \multicolumn{6}{c}{Composition (weight ratio)} | Comparative Example 10 |
|---|---|---|---|---|---|---|---|
|  | 41 | 42 | 43 | 44 | 45 | 46 |  |
| Copolymer (Production Example 7) | — | — | 20 | 50 | — | — | — |
| Copolymer (Production Example 10) | — | — | — | — | 20 | 50 | — |
| Copolymer (Production Example 13) | 20 | 50 | — | — | — | — | 100 |
| Acrylic rubber | 80 | 50 | 80 | 50 | 80 | 50 | — |
| Crosslinking agent | 1.5 | 1.5 | 1.5 | 1.5 | 1.5 | 1.5 | — |
| Hardness (JIS A) | 15 | 18 | 21 | 28 | 29 | 30 | 22 |
| Tensile strength at break (MPa) | 1.4 | 2.6 | 3.5 | 5.1 | 4.0 | 6.5 | 6.2 |
| Elongation at break (%) | 500 | 480 | 450 | 380 | 400 | 370 | 630 |
| Compression set (%) | 66 | 54 | 40 | 37 | 34 | 29 | 78 |
| Oil resistance (%) | 2 | 1 | 19 | 10 | 2 | 1 | 24 |
| Gel fraction (%) | 68 | 49 | 79 | 85 | 88 | 90 | 5 |

As is evident from Table 5, the molded objects produced using the compositions of the present invention maintain an excellent balance between hardness and compression set. The molded objects produced using the compositions of the present invention have excellent oil resistance and high gel fractions, thereby exhibiting excellent solvent resistance.

physical properties and a columnar molded object (30 mm in diameter×12 mm thick) for evaluating compression set were formed. These molded objects were vulcanized by heating at 150° C. for 2 hours. With respect to the molded objects, hardness, tensile strength at break, elongation at break, compression set, oil resistance, and gel fraction were measured, and the results thereof are shown in Table 6.

TABLE 6

| Example | \multicolumn{7}{c}{Composition (weight ratio)} | Comparative Example 10 |
|---|---|---|---|---|---|---|---|---|
|  | 47 | 48 | 49 | 50 | 51 | 52 | 53 |  |
| Copolymer (Production Example 13) | 20 | — | — | — | — | — | — | 100 |
| Copolymer (Production Example 14) | — | 20 | 50 | — | — | — | — | — |
| Copolymer (Production Example 7) | — | — | — | 20 | 50 | — | — | — |

TABLE 6-continued

| | | | Composition (weight ratio) | | | | | |
|---|---|---|---|---|---|---|---|---|
| Example | 47 | 48 | 49 | 50 | 51 | 52 | 53 | Comparative Example 10 |
| Copolymer (Production Example 10) | — | — | — | — | — | 20 | 50 | — |
| Butyl rubber | 80 | 80 | 50 | 80 | 50 | 80 | 50 | — |
| Crosslinking agent | 80 | 8 | 5 | 8 | 5 | 8 | 5 | — |
| Hardness (JIS A) | 27 | 22 | 21 | 36 | 30 | 29 | 27 | 22 |
| Tensile strength at break (MPa) | 2.8 | 1.9 | 3.0 | 5.9 | 7.1 | 7.7 | 7.7 | 6.2 |
| Elongation at break (%) | 450 | 440 | 550 | 430 | 350 | 340 | 300 | 630 |
| Compression set (%) | 49 | 43 | 46 | 29 | 30 | 35 | 37 | 78 |
| Oil resistance (%) | 108 | 112 | 71 | 91 | 55 | 30 | 19 | 24 |
| Gel fraction (%) | 79 | 78 | 53 | 80 | 80 | 77 | 57 | 5 |

As is evident from Table 6, the molded objects of the present invention maintain an excellent balance between hardness, compression set, and strength. The molded objects of the present invention also have high gel fractions and excellent solvent resistance.

EXAMPLE 54

The methyl methacrylate-n-butyl acrylate-methyl methacrylate triblock copolymer produced in Production Example 14 and the crosslinked rubber particles (without graft) produced in Production Example 15 in the ratio shown in Table 7 were melt-kneaded with a Laboplastomill set at 200° C. The resultant sample block was thermopress-molded at a preset temperature of 200° C., and a molded object with a thickness of 2 mm for evaluating physical properties and a columnar molded object (30 mm in diameter×12 mm thick) for evaluating compression set were formed. With respect to the molded objects, hardness, tensile strength at break, elongation at break, and compression set were measured, and the results thereof are shown in Table 7.

EXAMPLE 55

The methyl methacrylate-n-butyl acrylate-methyl methacrylate triblock copolymer produced in Production Example 14 and the crosslinked rubber particles (with graft) produced in Production Example 16 in the ratio shown in Table 7 were melt-kneaded with a Laboplastomill set at 200° C. The resultant sample block was thermopress-molded at a preset temperature of 200° C., and a molded object with a thickness of 2 mm for evaluating physical properties and a columnar molded object (30 mm in diameter×12 mm thick) for evaluating compression set were formed. With respect to the molded objects, hardness, tensile strength at break, elongation at break, and compression set were measured, and the results thereof are shown in Table 7.

TABLE 7

| | | Example | |
|---|---|---|---|
| | | 54 | 55 |
| Composition (weight ratio) | Block (Production Example 14) | 30 | 30 |
| | Crosslinked rubber (Production Example 15) | 70 | — |
| | Crosslinked rubber (Production Example 16) | — | 70 |

TABLE 7-continued

| | | Example | |
|---|---|---|---|
| | | 54 | 55 |
| Physical properties | Hardness (JIS A) | 77 | 91 |
| | Tensile strength at break (MPa) | 4.3 | 10.5 |
| | Elongation at break (%) | 21 | 77 |
| | Compression set (%) | 86 | 85 |

It is evident that the compounds of the methacrylic ester-acrylic ester block copolymers and crosslinked rubber particles, which are the compositions of the present invention, are excellent in mechanical characteristics.

EXAMPLE 56

Into a 2 L reactor equipped with an agitator, a thermometer, a nitrogen gas inlet tube, a dropping funnel, and a reflux condenser, was placed 490 g of distilled water and 0.56 g of sodium dodecyl sulfate as an emulsifier, and the reactor was nitrogen-purged while the reaction mixture was being stirred at 80° C. Into the reactor was added a mixed solution of 16.5 g of methyl methacrylate as a methacrylic ester monomer and 1.09 g of a thiocarbonylthio group-containing compound represented by the following structural formula:

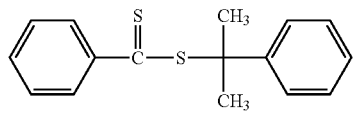

and the reaction mixture was stirred at 80° C. for 20 minutes. As a polymerization initiator, 0.93 g of 4,4'-azobis(4-cyanovaleric acid) together with 25 g of distilled water was added into the reactor. Stirring was performed at 80° C. for 0.5 hours, and then 85.0 g of methyl methacrylate was dripped from the dropping funnel for over 2 hours. After dripping was completed, the mixture was heated for 2 hours, and sampling was performed. Production of poly(methyl methacrylate)(conversion rate=90.1%, Mn=20,100, Mw/Mn=1.37) was confirmed.

Next, as an acrylic ester monomer, 20.0 g of n-butyl acrylate was added into the reactor, and as a polymerization initiator, 0.40 g of 4,4'-azobis(4-cyanovaleric acid) together with 10 g of distilled water was further added thereinto. Stirring was performed at 80° C. for 1 hour, and then 80.0 g of n-butyl acrylate was dripped from the dropping funnel for over 1 hour. After dripping was completed, the mixture was stirred at 80° C. for 4 hours and then cooled to room temperature. A calcium chloride aqueous solution was added into the mixture to perform a salting-out method, followed by water washing, filtration, and drying. Thereby, 155 g of methyl methacrylate-n-butyl acrylate diblock copolymer was produced. The methyl methacrylate-n-butyl acrylate diblock copolymer had the thiocarbonylthio groups at the ends of the n-butyl acrylate blocks, in which Mn=44,300 and molecular-weight distribution Mw/Mn=1.55. The weight ratio of the individual constituents was as follows: methyl methacrylate: n-butyl acrylate=44:56. The diblock copolymer was divided into three groups, 50 g each. The individual groups were used for this Example, Example 57, and Example 58, respectively.

The diblock copolymer (50 g) was dissolved in 80 mL of toluene and placed into a 300 mL reactor equipped with an agitator, a thermometer, a nitrogen gas inlet tube, a dropping funnel, and a reflux condenser. In a nitrogen atmosphere, 30 g of diethylamine as a secondary amine compound was added into the reactor, and stirring was performed at room temperature for 8 hours. $^1$H NMR measurement and IR measurement confirmed that the thiocarbonylthio groups were quantitatively converted into mercapto groups. Toluene and excess diethylamine were removed by distillation under reduced pressure. The resultant diblock copolymer was reprecipitated with toluene/methanol, followed by drying under reduced pressure. 80 mL of toluene was added to dissolve the diblock copolymer, and in a nitrogen atmosphere, 95 mg of hexamethylene diisocyanate as a compound having at least two isocyanato groups in each molecule and 3 mg of dibutyltin bis(isooctyl thioglycolate) as a urethane formation catalyst were added thereinto, followed by stirring at 80° C. for 5 hours. $^1$H NMR and GPC measurement confirmed that the mercapto groups were converted into thiourethane bonds at a yield of 89%, and that a methyl methacrylate-n-butyl acrylate-methyl methacrylate triblock copolymer (Mn=84,000, Mw/Mn=1.84) was produced. The weight ratio of the individual constituents was the same as that before coupling.

EXAMPLE 57

The thiocarbonylthio group-containing methyl methacrylate-n-butyl acrylate diblock copolymer diblock copolymer (50 g) produced in Example 56 was dissolved in 80 mL of toluene, and the solution was placed into a 300 mL reactor equipped with an agitator, a thermometer, a nitrogen gas inlet tube, a dropping funnel, and a reflux condenser. Stirring was performed at room temperature for 5 hours while ammonia gas was injected into the system. $^1$H NMR measurement and IR measurement confirmed that the thiocarbonylthio groups were quantitatively converted into mercapto groups. Next, the atmosphere of the system was replaced with air, and 10 mg of lead dioxide as an oxidizing agent was added thereinto, followed by stirring at 60° C. for 16 hours. $^1$H NMR and GPC measurement confirmed that the mercapto groups were converted into disulfide bonds at a yield of 94%, and that diblock copolymers were coupled to each other. In the resultant methyl methacrylate-n-butyl acrylate-methyl methacrylate triblock copolymer, Mn=85,700 and Mw/Mn=1.92. The weight ratio of the individual constituents was the same as that before coupling.

EXAMPLE 58

The thiocarbonylthio group-containing methyl methacrylate-n-butyl acrylate diblock copolymer (50 g) produced in Example 56 was dissolved in 80 mL of toluene, and the solution was placed into a 300 mL reactor equipped with an agitator, a thermometer, a nitrogen gas inlet tube, a dropping funnel, and a reflux condenser. In a nitrogen atmosphere, 5 g of butylamine as a primary amine compound and 3 g of bis(2,2,6,6,-tetramethyl-4-piperidyl)sebacate as a HALS were added thereinto, followed by stirring at 50° C. for 5 hours. $^1$H NMR measurement and IR measurement confirmed that the thiocarbonylthio groups were converted into mercapto groups at a yield of 91%. Next, as a compound having at least two halogen atoms in each molecule, 88 mg of dichloride succinate was added thereinto, and stirring was performed at 60° C. for 6 hours. $^1$H NMR and GPC measurement confirmed that the mercapto groups were coupled by acylation at a yield of 94%. In the resultant methyl methacrylate-n-butyl acrylate-methyl methacrylate triblock copolymer, Mn=85,200 and Mw/Mn=1.88. The weight ratio of the individual constituents was the same as that before coupling.

EXAMPLE 59

Into a 2 L reactor equipped with an agitator, a thermometer, a nitrogen gas inlet tube, a dropping funnel, and a reflux condenser, was placed 490 g of distilled water and 0.56 g of sodium dodecyl sulfate as an emulsifier, and the reactor was nitrogen-purged while the reaction mixture was being stirred at 80° C. Into the reactor was added a mixed solution of 16.5 g of methyl methacrylate as a methacrylic ester monomer and 1.09 g of a thiocarbonylthio group-containing compound represented by the following structural formula:

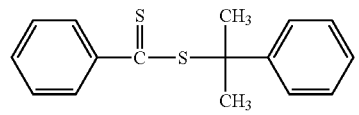

and the reaction mixture was stirred at 80° C. for 20 minutes. Next, as a polymerization initiator, 0.93 g of 4,4'-azobis(4-cyanovaleric acid) together with 25 g of distilled water was added into the reactor. Stirring was performed at 80° C. for 1 hour, and then 85.0 g of methyl methacrylate was dripped from the dropping funnel for over 2 hours. After dripping was completed, the mixture was heated for 2 hours, and sampling was performed. Production of poly(methyl methacrylate)(conversion rate=91.2%, Mn=20,800, Mw/Mn=1.35) was confirmed.

Next, as an acrylic ester monomer, 20.0 g of n-butyl acrylate was added into the reactor, and as a polymerization initiator, 0.40 g of 4,4'-azobis(4-cyanovaleric acid) together with 10 g of distilled water was further added thereinto. Stirring was performed at 80° C. for 1 hour, and then 80.0 g of n-butyl acrylate was dripped from the dropping funnel for over 1 hour. After dripping was completed, the mixture was stirred at 80° C. for 4 hours and then cooled to room temperature. A calcium chloride aqueous solution was added into the mixture to perform a salting-out method, followed by water washing, filtration, and drying. Thereby, 150 g of methyl methacrylate-n-butyl acrylate diblock copolymer was produced. The diblock copolymer had the thiocarbonylthio groups at the ends of the n-butyl acrylate blocks, in which Mn=46,100 and molecular-weight distribution Mw/Mn=1.67. $^1$H NMR analysis confirmed that the thiocarbonylthio groups were introduced into the copolymer at a yield of 88%, and the weight ratio of the individual constituents was as follows: methyl methacrylate:n-butyl acrylate=45:55.

The diblock copolymer (140 g) was dissolved into 1,000 mL of toluene and placed into a 2 L reactor equipped with an agitator, a thermometer, a nitrogen gas inlet tube, and a reflux condenser, and the reactor was nitrogen-purged. As a secondary amine compound, 9.8 g of diethylamine was added into the reactor, and by heating the mixture at 80° C. for 5 hours, the thiocarbonylthio groups at the ends of the n-butyl acrylate were quantitatively converted into mercapto groups. Next, 0.22 g of hexamethylene diisocyanate as a compound having at least two isocyanato groups in each molecule and 0.03 g of dibutyltin bis(isooctyl thioglycolate) as a catalyst were added into the mixture, followed by heating at 80° C. for 2 hours and at 100° C. for 3 hours. Thereby, a methyl methacrylate-n-butyl acrylate-methyl methacrylate triblock copolymer (Mn=89,300, Mw/Mn=1.79) was produced at a yield of 80%.

EXAMPLE 60

Into a 300 mL reactor equipped with an agitator, a thermometer, a nitrogen gas inlet tube, a dropping funnel, and a reflux condenser tube, was placed 110 mg of sodium dodecyl sulfate as an emulsifier and 100 g of distilled water, and the reactor was nitrogen-purged while the reaction mixture was being stirred at 80° C. Into the reactor was added 217 mg of a thiocarbonylthio group-containing compound represented by the following structural formula:

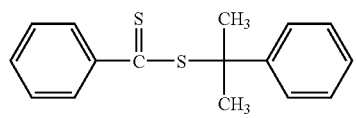

which had been dissolved into 3.0 g of methyl methacrylate as a methacrylic ester monomer, and after 20 minutes, as a polymerization initiator, 185 mg of 4,4'-azobis(4-cyanovaleric acid) together with 4 g of distilled water was added into the reactor. Stirring was performed at 80° C. for 20 minutes, and then 17.5 g of methyl methacrylate was dripped from the dropping funnel for over 90 minutes. After 30 minutes, as an acrylic ester monomer, a mixed liquid of 10.0 g of n-butyl acrylate and 7.8 g of ethyl acrylate was dripped from the dropping funnel for over 1 hour. After the reaction liquid was stirred at 80° C. for 5 hours, the emulsion was salted out with sodium chloride, followed by washing with distilled water, filtration, and drying. Thereby, 31.2 g of methyl methacrylate-(n-butyl acrylate/ethyl acrylate) diblock copolymer was produced. GPC measurement of the diblock copolymer confirmed that Mn=44,300 and Mw/Mn=1.49. $^1$H NMR measurement confirmed that the thiocarbonylthio groups were introduced into the ends of the acrylic ester blocks of the diblock copolymer, and the introduction rate was 92% on the single-end basis. The weight ratio of the individual constituents was as follows: methyl methacrylate: n-butyl acrylate:ethyl acrylate=55:23:22.

The resultant polymer (20 g) was dissolved into 100 mL of toluene, and 300 mg of sodium hydride as a base was added thereinto, followed by stirring at room temperature for 2 hours and at 50° C. for 3 hours. The excess of sodium hydride was removed by filtration in a nitrogen atmosphere.

Thereby, a methyl methacrylate-(n-butyl acrylate/ethyl acrylate) diblock copolymer having the mercaptide group at the acrylic ester block end was produced. Into the diblock copolymer was added 30 mg of 1,3,5-trichlorobenzene as a compound having at least two halogen atoms in each molecule in a nitrogen atmosphere, followed by stirring at 80° C. for 20 hours. After the solvent was removed by distillation, reprecipitation was carried out with toluene/methanol. $^1$H NMR and GPC measurement confirmed that a methyl methacrylate-(n-butyl acrylate/ethyl acrylate) star block copolymer (Mn=116,000, Mw/Mn=1.99) was produced.

INDUSTRIAL APPLICABILITY

In accordance with the production process of the present invention, it is possible to produce a methacrylic ester-acrylic ester-methacrylic ester block copolymer which requires hardly any purification, which is excellent in heat resistance and weatherability, and in which the molecular weight and the molecular-weight distribution are controlled. Acrylic block copolymers of the present invention, as novel materials, are advantageously used in various applications, for example, as various types of molded objects, as pressure sensitive adhesives or adhesives, as paints, and as modifiers or additives. Thermoplastic resin compositions of the present invention and molded objects produced using the thermoplastic resin compositions are excellent in oil resistance, heat resistance, weatherability, impact resistance, transparency, and moldability. Production costs can also be minimized. Elastomer compositions of the present invention have low hardness and high tensile strength and are excellent in compression set, to which oil resistance, gas-barrier properties, etc., can be easily imparted. The elastomer compositions can be used as molded objects, such as various sealing materials, gaskets, oil-resistant hoses, and coating sheets.

The invention claimed is:

1. A composition comprising the following two components (A) and (B):

(A) a block copolymer comprising a methacrylic ester polymer block and an acrylic ester polymer block, the block copolymer being formed by radical polymerization in the presence of a thiocarbonylthio group-containing compound, the thiocarbonylthio group-containing compound being at least one compound selected from the group consisting of a compound represented by general formula (1):

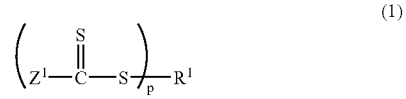

(1)

(wherein $R^1$ is a p-valent organic group of 1 or more carbon atoms which may contain one of nitrogen, oxygen, sulfur, halogen, silicon, phosphorus, and metal atoms, and which may be a polymer; $Z^1$ is a hydrogen atom, halogen atom, or monovalent organic group of 1 or more carbon atoms which may contain one of nitrogen, oxygen, sulfur, halogen, silicon, and phosphorus atoms, and which may be a polymer; when plural $Z^1$'s are present, the plural $Z^1$'s may be the same or different; and p is an integer of 1 or more), and a compound represented by general formula (2):

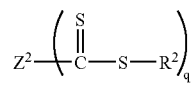
(2)

(wherein $R^2$ is a monovalent organic group of 1 or more carbon atoms which may contain one of nitrogen, oxygen, sulfur, halogen, silicon, phosphorus, and metal atoms, and which may be a polymer; $Z^2$ is an oxygen atom (when q=2), sulfur atom (when q=2), nitrogen atom (when q=3), or q-valent organic group of 1 or more carbon atoms which may contain one of nitrogen, oxygen, sulfur, halogen, silicon, and phosphorus atoms, and which may be a polymer; plural $R^2$'s may be the same or different; and q is an integer of 2 or more); and (B) at least one resin or rubber selected from the group consisting of thermoplastic resins, acrylic polymer rubbers, olefinic polymer rubbers, diene polymer rubbers, and natural rubber, wherein the component (A) is a methacrylic ester-acrylic ester-methacrylic ester block copolymer produced by a process, the process comprising the steps of:

radically polymerizing monomers containing a methacrylic ester monomer as a principal constituent in the presence of at least one thiocarbonylthio group-containing compound, thiocarbonylthio group-containing compound being selected from the group consisting of the compounds represented by general formulae (1) and (2);

adding monomers containing an acrylic ester monomer as a principal constituent to the mixture and further performing radical polymerization to produce thiocarbonylthio group-containing methacrylic ester-acrylic ester block copolymers;

converting the thiocarbonylthio groups of the copolymers into mercapto groups or mercaptide groups; and coupling the copolymers by using the mercapto groups or the mercaptide groups.

2. The composition according to claim 1, wherein the block copolymer as the component (A) is a methacrylic ester-acrylic ester block copolymer produced by a method in which, after the radical polymerization in the presence of the thiocarbonylthio group-containing compound, the thiocarbonylthio groups of the copolymer are converted into mercapto groups or mercaptide groups by a reaction with a processing agent comprising at least one compound selected from the group consisting of bases and acids.

3. The composition according to claim 1, wherein the block copolymer as the component (A) is a methacrylic ester-acrylic ester block copolymer produced by a method in which, after the radical polymerization in the presence of the thiocarbonylthio group-containing compound, the thiocarbonylthio groups of the copolymer are converted into mercapto groups or mercaptide groups by a reaction with a processing agent comprising at least one compound selected from the group consisting of ammonia, hydrazine, primary amine compounds, and secondary amine compounds.

4. The composition according to claim 3, wherein the processing agent comprises at least one compound selected from the group consisting of primary amine compounds with a boiling point of 100° C. or less, secondary amine compounds with a boiling point of 100° C. or less, and hindered amine light stabilizers (HALSs).

5. The composition according to claim 1, wherein said coupling is performed by the formation of disulfide bonds using an oxidizing agent.

6. The composition according to claim 1, wherein said coupling is performed using a compound having at least two isocyanato groups in each molecule.

7. The composition according to claim 1, wherein said coupling is performed using at least one compound selected from the group consisting of a compound represented by the general formula (7),

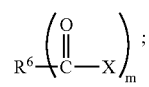
(7)

a compound represented by the general formula (8),

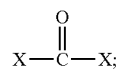
(8)

and a compound represented by the general formula (9),

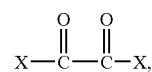
(9)

wherein $R^6$ is an m-valent organic group of 1 or more carbon atoms which may contain one of nitrogen, oxygen, sulfur, halogen, silicon, phosphorus, and metal atoms, or $R^6$ is a polymeric group; m is an integer of 2 or more; and the groups represented by X are independently a halogen atom, hydroxyl group, or alkoxyl group.

8. The composition according to claim 1, wherein the block copolymer as the component (A) includes the methacrylic ester polymer block in an amount of 5 to 90% by weight.

9. The composition according to claim 1, wherein the methacrylic ester monomer is at least one methacrylic ester monomer selected from the group consisting of methyl methacrylate, ethyl methacrylate, n-butyl methacrylate, isobutyl methacrylate, tert-butyl methacrylate, 2-ethylhexyl methacrylate, dodecyl methacrylate, isobornyl methacrylate, cyclohexyl methacrylate, tridecyl methacrylate, stearyl methacrylate, benzyl methacrylate, 2-hydroxyethyl methacrylate, 2-hydroxypropyl methacrylate, 2-methoxyethyl methacrylate, dimethylaminoethyl methacrylate, diethylaminoethyl methacrylate, glycidyl methacrylate, and tetrahydrofurfuryl methacrylate; and the acrylic ester monomer is at least one acrylic ester monomer selected from the group consisting of ethyl acrylate, n-butyl acrylate, isobornyl acrylate, isobutyl acrylate, 4-hydroxybutyl acrylate, tert-butyl acrylate, 2-methoxyethyl acrylate, dodecyl acrylate, ethoxy diethylene glycol acrylate, stearyl acrylate, 2-hydroxyethyl acrylate, and 2-hydroxypropyl acrylate.

10. The composition according to claim 1, wherein the methacrylic ester monomer is methyl methacrylate, and the acrylic ester monomer is at least one acrylic ester monomer selected from the group consisting of ethyl acrylate, n-butyl acrylate, tert-butyl acrylate, 2-methoxyethyl acrylate, and 2-hydroxyethyl acrylate.

11. The composition according to claim 1, wherein at least one of said monomers containing the methacrylic ester monomer as a principal constituent and said monomers containing the acrylic ester monomer as a principal constituent further contains a vinyl monomer radically copolymerizable with the methacrylic ester monomer or the acrylic ester monomer in an amount of less than 50% by weight.

12. The composition according to claim 11, wherein the vinyl monomer radically copolymerizable with the methacrylic ester monomer or the acrylic ester monomer is at least one vinyl monomer selected from the group consisting of methacrylic acid, acrylic acid, methacrylonitrile, acrylonitrile, styrene, vinyl acetate, butadiene, and isoprene.

13. The composition according to claim 1, wherein the number-average molecular weight (Mn) of the block copolymer as the component (A) is in the range of 3,000 to 500,000, the number-average molecular weight (Mn) being determined by gel permeation chromatography.

14. The composition according to claim 1, wherein the molecular-weight distribution (Mw/Mn) of the block copolymer as the component (A) is 2 or less, the molecular-weight distribution (Mw/Mn) being determined by gel permeation chromatography.

15. The composition according to claim 1, wherein the content of the block copolymer as the component (A) is 0.5 to 900 parts by weight based on 100 parts by weight of the component (B).

16. The composition according to claim 1, wherein the thermoplastic resin as the component (B) is at least one resin selected from the group consisting of poly(vinyl chloride) resins, poly(methyl methacrylate) resins, acrylonitrile-styrene copolymer resins, acrylonitrile-butadiene-styrene copolymer resins, methyl methacrylate-styrene copolymer resins, methyl methacrylate-butadiene-styrene copolymer resins, polycarbonate resins, polyester resins, and polyamide resins.

17. The composition according to claim 1, wherein the component (B) is a modified rubber produced by graft-polymerizing unsaturated monomers to at least one rubber selected from the group consisting of acrylic polymer rubbers, olefinic polymer rubbers, diene polymer rubbers, and natural rubber.

18. The composition according to claim 1, wherein the block copolymer as the component (A) is compounded with at least one rubber selected from the group consisting of acrylic polymer rubbers, olefinic polymer rubbers, diene polymer rubbers, and natural rubber as the component (B) by melt-mixing so that the rubber as the component (B) is dynamically crosslinked.

19. The composition according to claim 1, wherein the component (B) corresponds to rubber particles having graft chains.

20. The composition according to claim 1, further comprising at least one additive selected from the group consisting of plasticizers, thixotropy-improving agents, heat resistance-improving agents, stabilizers, antioxidants, ultraviolet absorbers, hindered amine light stabilizers (HALSs), antistatic agents, fire retardants, colorants, blowing agents, lubricants, mildewproofing agents, nucleating additives, vulcanization accelerators, aging resisters, vulcanizing agents, antiscorching agents, peptizers, tackifiers, latex coagulants, processing aids, inorganic fillers, and rubber materials.

21. A molded object produced by molding the composition according to claim 1.

* * * * *

UNITED STATES PATENT AND TRADEMARK OFFICE
CERTIFICATE OF CORRECTION

PATENT NO.        : 7,211,625 B2
APPLICATION NO.   : 10/472141
DATED             : May 1, 2007
INVENTOR(S)       : Tsuji et al.

It is certified that error appears in the above-identified patent and that said Letters Patent is hereby corrected as shown below:

Column 7, line 50-55,

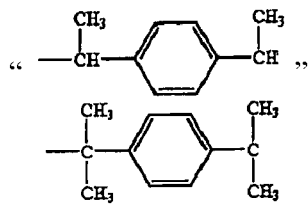

should be changed to

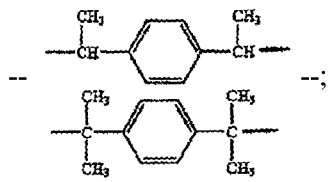

Column 24, line 30, "1,2-dichlroethane" should be changed to --1,2-dichloroethane--;

Column 27, line 2, "2-methoxhethyl" should be changed to --2-methoxyethyl--;

Column 33, line 55, "di-2-etylhexyl" should be changed to --di-2-ethylhexyl--;

Column 37, line 10, "bis(p-ehtylbenzilidene)" should be changed to --bis(p-ethylbenzilidene--;

Column 41, line 22, "wetherability" should be changed to --weatherability--;

Columns 61-62, Table 7, the heading "Example" should be to the left of "54" and "55", instead of above; and

UNITED STATES PATENT AND TRADEMARK OFFICE
CERTIFICATE OF CORRECTION

PATENT NO. : 7,211,625 B2
APPLICATION NO. : 10/472141
DATED : May 1, 2007
INVENTOR(S) : Tsuji et al.

It is certified that error appears in the above-identified patent and that said Letters Patent is hereby corrected as shown below:

Column 63, line 49, "diblock copolymer diblock copolymer" should be changed to --diblock copolymer--.

Signed and Sealed this

Thirtieth Day of September, 2008

JON W. DUDAS
*Director of the United States Patent and Trademark Office*